United States Patent [19]
Okazaki et al.

[11] Patent Number: 5,790,620
[45] Date of Patent: Aug. 4, 1998

[54] UNDERWATER LASER PROCESSING METHOD AND APPARATUS

[75] Inventors: Kouki Okazaki, Higashimurayama; Arata Ito, Yokohama; Yuji Sano, Yokosuka; Naruhiko Mukai, Yokohama; Nobutada Aoki, Chigasaki; Chikara Konagai; Muneyoshi Kikunaga, both of Yokohama, all of Japan

[73] Assignee: Kabushiki Kaisha Toshiba, Kawasaki, Japan

[21] Appl. No.: 593,970

[22] Filed: Jan. 30, 1996

[30] Foreign Application Priority Data

Jan. 31, 1995 [JP] Japan .................. 7-013880
Feb. 6, 1995 [JP] Japan .................. 7-018087

[51] Int. Cl.$^6$ .................. G21C 19/00; G21C 13/087; B23K 26/12
[52] U.S. Cl. .................. 376/305; 376/310; 376/326; 148/525; 134/1
[58] Field of Search .................. 376/260, 305, 376/463, 310, 326; 148/525, 565; 134/1

[56] References Cited

U.S. PATENT DOCUMENTS

| | | | |
|---|---|---|---|
| 4,035,691 | 7/1977 | Altman et al. | 372/70 |
| 4,054,852 | 10/1977 | Nicolai | 372/70 |
| 4,395,746 | 7/1983 | Tanaka et al. | 361/143 |
| 4,398,966 | 8/1983 | Kelly et al. | 148/525 |
| 4,401,477 | 8/1983 | Clauer et al. | 148/525 |
| 5,333,161 | 7/1994 | Thompson et al. | 376/305 |

FOREIGN PATENT DOCUMENTS

| | | |
|---|---|---|
| 0 091 646 | 10/1983 | European Pat. Off. . |
| 0 507 641 | 10/1992 | European Pat. Off. . |
| 0 520 847 | 12/1992 | European Pat. Off. . |
| 2 692 712 | 12/1993 | France . |
| 1-45039 | 10/1989 | Japan . |
| 5-138377 | 6/1993 | Japan . |
| 6-13725 | 2/1994 | Japan . |
| 6-269975 | 9/1994 | Japan . |

OTHER PUBLICATIONS

Journal De Physique IV, vol. 1, pp. C3–487–C3–494, Oct. 1991, P. Ballard, et al., "Residual Stresses Induced by Laser–Shocks".

*Primary Examiner*—Daniel D. Wasil
*Attorney, Agent, or Firm*—Oblon, Spivak, McClelland, Maier & Neustadt, P.C.

[57] ABSTRACT

An underwater laser processing method is carried out by irradiating, through a laser beam irradiation apparatus, a laser beam having a high output, a short pulse and a visible wavelength to a surface of a structure immersed in a water to improve residual stress of a material of the surface of the structure and remove a crack or a CRUD thereof. The laser beam irradiation apparatus comprises a pulse laser device suspended into a water in which a metal material is accommodated from an upper side thereof for irradiating a laser beam having a visible wavelength to a processing position, a beam strength adjusting device for adjusting an output per 1 pulse of a laser beam generated by the pulse laser device and a mechanism for adjusting a spot diameter and a multiplexing ratio of an irradiated beam.

5 Claims, 33 Drawing Sheets

① PLASMA GENERATION

② WATER-ENCLOSURE HIGH-PRESSURIZATION

③ SHOCK-WAVE PROPAGATION

UNDERWATER LASER PROCESSING METHOD AND APPARATUS

BACKGROUND OF THE INVENTION

The present invention relates to preventive maintenance and repairing technology in, for example, a nuclear power plant and the like, and more specifically, to an underwater laser processing, such as inspecting, repairing or maintaining, method and an apparatus suitable for the improvement of residual stress, removal of a crack, removal of a CRUD (Chalk River Unidentified Deposite) and the like on a surface of a material constituting a metal structure.

Reactor components in a light-water reactor is composed of, for example, a material having sufficient corrosion resistance and strength against high temperature in the environment of high temperature and high pressure such as, for example, austenitic stainless steel, nickel base alloy or the like.

However, components in the reactor inner structure which are difficult to be replaced involve a problem that materials constituting the components are deteriorated because the materials are exposed to the environment of high temperature and high pressure for a long period of time as the plant is operated for a long time and further core materials constituting a core shroud and the like are subjected to the irradiation of neutron.

In particular, portions in the vicinity pf welding area of the reactor inner structure has a potential danger of the occurrence of stress corrosion cracking due to the sensitization of a material and residual tensile stress caused by welding heat input.

Recently, various material surface improving or modifying technologies have been developed as countermeasures in preventive maintenance so as to cope with the prolonged operation period of plants. As one of the countermeasures, there is examined a countermeasure for preventing stress corrosion cracking by positively changing residual stress on a surface of a material from tensile stress to compressive stress and, for example, there has been developed a material surface residual stress improving or modifying technology by, for example, a method of shot-peening, water-jet peening and the like.

The shot-peening is a technology for forming compressive residual stress on the material surface of a portion to be worked by plastical deformation of the material surface by kinetic energy of steel balls which is produced when the steel balls each having a diameter of about 0.3 mm–1.2 mm are accelerated making use of high-pressure air, high-pressure water or a centrifugal force, and then collide against the material surface.

The water-jet peening is a technology for forming compressive stress on the material surface by a water collisional action and a shock wave which is caused when cavitation is broken by injecting ultra-high pressure water of about 1000 atm. from the extreme end of a nozzle.

It has been proved that the shot-peening technology is effective to prevent stress corrosion cracking.

There is a possibility that portions in the vicinity of welds of the reactor internal structure and a structure in the environment of vibration are subjected to the occurrence and progress of stress corrosion cracking and cracks due to fatigue which are caused while a plant is operated for a long time and further to increased sensitiveness to breakage resulting from them. Thus, a countermeasure against them have been studied.

For example, when a crack is generated on a surface of a structure, there has been studied such a countermeasure that the cracked portion is removed by electric discharge machining so that stress concentration is relieved in a material of the structure and the progress of the crack is suppressed. The electric discharging is a processing method of generating electric discharge between an electrode and a material to be processed to thereby melt and blow off the material being processed.

It is known that a clad containing Fe, Cu, Ni etc. is deposited on a surface of the reactor internal structure. Since the CRUD traps radioactive materials, there is possibility that an amount of exposure to radioactivity of workers who carry out repair and preventive maintenance is increased by the presence of the CRUD. In particular, there is possibility that the CRUD deposited to a fuel element prevents the cooling effect of the fuel element effected by water, accelerates oxidation and further may destroy the fuel.

At present, the CRUD deposited on the surface of the reactor inner structure is removed at irregular intervals by a method of making use of high-pressure water flow such as water-jet peening and the like. In addition, there are also studied a method of tearing off the CRUD by the electric discharge processing or the irradiation of an ultrasonic wave or a method of removing the CRUD by weakening a shock wave generated by the steel balls by applying the shot-peening technology.

Incidentally, in the method of using the steel balls such as the shot-peening method and the like, it is necessary to arrange high-pressure piping for conveying the steel balls by means of the high-pressure water or high-pressure air, and when processing is carried out to a structure in a narrow portion such as an annular portion between an core shroud and a reactor pressure vessel or inner surfaces of fine pipes or tubes, it is difficult to perfectly achieve such processing. In addition, when the structure is worked in the atmosphere, this method is accompanied by a problem of the generation of dusts.

In the method of using high-pressure water such as the water-jet peening and the like, a load on peripheral equipment is increased by a reaction force resulting from jetted water and it is difficult to develop an automatic machine for carrying out precise processing in a narrow portion by a remote control manner.

The electric discharging technology has a problem that a material to be processed is greatly affected by heat and the ultrasonic method is difficult to be applied to a narrow portion where an ultrasonic wave is difficult to reach.

That is, any of the above processing methods has problems in simplicity, applicability to a narrow portion, effect on peripheral equipment and quality, and it is difficult to say that all of these conditions are satisfied. Further, it is very difficult to apply these methods to the three types of technologies, that is, the improvement of the residual stress, removal of cracks and removal of a CRUD relating to the preventive maintenance and repair.

SUMMARY OF THE INVENTION

An object of the present invention is to substantially eliminate defects or drawbacks encountered in the prior art described above and to provide an underwater laser processing method and an apparatus therefor capable of simply carrying out operations for improving surface residual stress, removing a crack, removing a CRUD and the like which relate to preventive maintenance and repair of a reactor internal structure with high quality without adversely affecting peripheral equipment and further being excellent in the applicability to a narrow portion to be processed.

Further, it is to be noted that the term "processing" used herein positively includes inspecting, repairing or maintaining process.

This and other objects can be achieved according to the present invention in one aspect by providing an underwater laser processing method, comprising steps of preparing a laser beam generating means and irradiating, through the laser beam generating means, a laser beam having a high output, a short pulse and a visible wavelength to a surface of a structure immersed in a water to improve residual stress of a material of the surface of the structure and remove a crack or a CRUD thereof.

In preferred embodiments, the structure is a reactor internal structure and a laser beam having a pulse width of 100 nsec. or less and a visible light wavelength is irradiated to a material of a surface of the reactor internal structure under conditions of a peak output of 0.1 –10 GW/cm$^2$ per 1 pulse and a coverage factor of an irradiated beam of 100% or higher to improve residual stress on the surface of the material of the reactor internal structure and change the residual stress to compressive stress.

A crack generated on the surface of the material of the reactor internal structure filled with a water is sensed, a laser beam having a pulse width of 100 nsec. or less and a visible wavelength is irradiated to a portion near the cracked portion under conditions of a peak output of 0.1–10 GW/cm$^2$ per 1 pulse while monitoring a state that the cracked portion is removed by ablation to thereby remove the crack.

The underwater laser processing method further comprises the step of removing of a crack generated to a surface of a material of a reactor internal structure and then performing the irradiation step for improving stress on the surface of the material from which the crack was removed.

The stress improvement is done while performing the removal of the CRUD accumulated on the surface of the material of the reactor internal structure filled with by irradiating the laser beam.

An entire processing region, a unit processing region and processing conditions are automatically controlled according to a map made on the basis of a crack searching examination and a surface state examination which were previously carried out and based on drawings of the reactor internal structure filled with the water when the improvement of stress on the surface of the material and the removal of the crack or the removal of the CRUD are carried out by irradiating the laser beam to the surface of the material of the structure in water.

In another aspect, according to the present invention there is provided an underwater laser processing apparatus, comprising a pulse laser device suspended into a water in which a metal material is accommodated from an upper side thereof for irradiating a laser beam having a visible wavelength to a processing position, a beam strength adjusting device for adjusting an output per 1 pulse of a laser beam generated by the pulse laser device and a mechanism for adjusting a spot diameter and a coverage factor of an irradiated beam.

According to the characters and structures of the present invention described above, since the laser beam having the visible wavelength has high permeability with small energy loss in water, it can be directly irradiated to a material to be processed in water. In a manner shown in FIG. 35, when the laser beam having the visible wavelength, high output and short pulse is irradiated to a surface of a metal material, the surface layer of the material is instantly evaporated and plasma is then generated.

The thus generated plasma has a very high pressure because its expansion is suppressed by the inertia of water, and shock wave generated and propagates inside from the surface of the material. As a result, the surface of the material is plastically deformed and compressive stress remains thereon. FIG. 36 shows a result of the measurement of the distribution in the residual stress depth direction before and after the irradiation of the laser beam. This measurement is performed by irradiating a frequency doubled an Nd-YAG laser having a wavelength of 532 nm to a material to be examined. The residual stress measurement is carried out through an X-ray analysis method ($2\theta-\sin^2\psi$ method). From the graph it will be found that before the irradiation, a tensile stress condition is observed on the surface of the material, but after the irradiation, a compressive stress condition is observed in a region having a depth of 200 μm or more. Stress corrosion cracking can be prevented by the compressive stress remaining on the surface of the material, by which surface residual stress on the surface of the reactor internal structure can be improved.

When a crack is generated on the surface of the material of the reactor internal structure, the crack can be removed by repeatedly irradiating the laser beam having the visible wavelength, high output and short pulse to the portion where the crack is generated, gradually removing the material of that portion and completely removing the crack. The removal of the crack can relieve stress concentrated upon the material of the structure and suppress the progress of the crack.

When a CRUD is accumulated on the surface of the reactor internal structure, high pressure plasma is generated on the surface of the material to which the clad is accumulated by irradiating the laser beam having the visible wavelength, high output and short pulse and the clad can be torn off and removed from the surface of the material by a shock force generated at the time.

Therefore, the use of the aforesaid method enables the surface stress of the reactor internal structure to be improved and a crack and a CRUD, and the like thereof to be removed.

Since the processing method using the aforesaid laser beam transmits high energy through an optical fiber, the method can be simply carried out because it need not use a high-pressure piping for transferring steel balls by high-pressure water or high-pressure air, different from shot-peening.

Since the laser beam as the visible light can be directly transmitted with a small loss in water as described above, the processing can be directly carried out in the water. As a result, the water such as cooling water in the reactor need not be drained prior to the processing operation. Since water is very effective to shield radioactivity, it is expected that an amount of exposure of workers to radioactivity is reduced.

Since no mechanical reaction force is generated when the laser beam is irradiated, the apparatus can be easily controlled, and the processing can be carried out with a pinpoint accuracy. Further, when a pulse width of the laser beam is shortened, the processing can be carried out with a small amount of thermal influence on a material to be processed.

Since particles and clads of a surface layer constituting material which are discharged from the surface of the material when the laser beam is irradiated is sucked into a processing head and trapped, an adverse affect to the quality of water can be prevented. Note, since a water flow generated by the suction of them or a water flow generated to remove bubbles on the light path of the laser beam are weak, they have a less amount of influence on peripheral equipment. When the laser beam is transmitted through the optical fiber, the processing head can be reduced in size and applied to a narrow portion and an inner surface of a fine small distance pipe or tube.

Consequently, there can be provided an underwater processing method and apparatus which are simple, have high quality and excellent applicability to a narrow portion and do not adversely affect peripheral equipment.

The nature and further features of the present invention will be made more clear through the following descriptions made by way of various preferred embodiments and modifications with reference to the accompanying drawings.

BRIEF DESCRIPTION OF THE DRAWINGS

In the accompanying drawings:

FIGS. 22 to 25 are views showing a ninth modification of the embodiment 6, in which FIG. 22 is a front elevational view showing a laser peening operation unit using a polygon mirror, FIG. 23 is a view taken along the line XXIII—XXIII of FIG. 22, FIG. 24 is a view showing a laser spot scanning mechanism using a polygon mirror, and FIG. 25 is a view taken along the line XXV—XXV of FIG. 24;

DESCRIPTION OF THE PREFERRED EMBODIMENTS

Preferred embodiments of the present invention will be described below with reference to the accompanying drawings.

In the followings, it is first to be noted that a term "processing" is used as a process including inspecting, repairing or maintaining process.

Embodiment 1 (FIG. 1–FIG. 6)

This embodiment relates to an underwater laser processing method of improving residual stress on a material surface of a reactor inner structure filled with water and changing the residual stress to compressing stress by irradiating a laser beam having a pulse width of 100 nsec. or less and a visible length to a surface of a material constituting the reactor internal structure under the conditions that a peak output per 1 pulse is 0.1–10 GW/cm$^2$ and a multiplexing ratio of an irradiated beam is 100% or higher.

Figure 1:
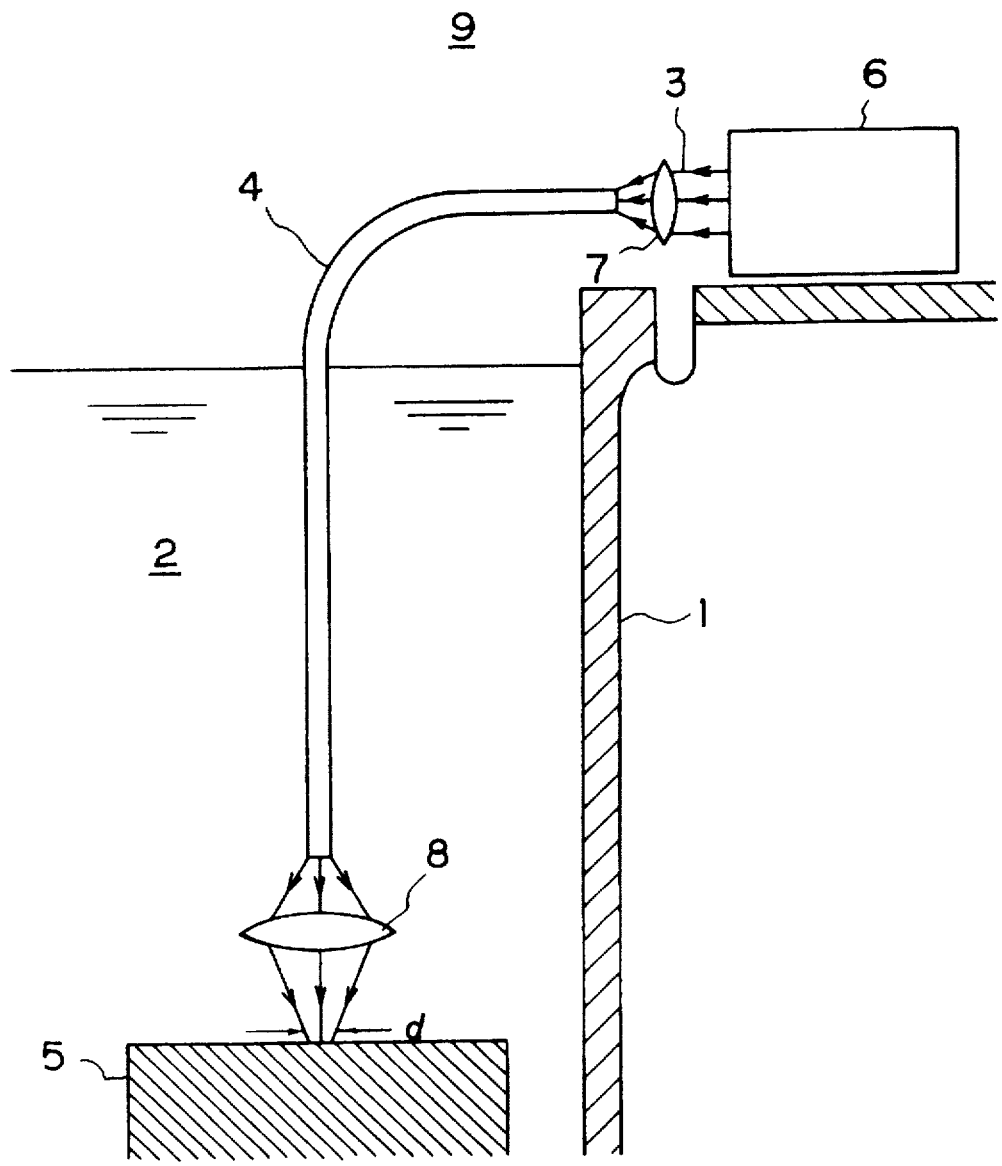
FIG. 1 is a schematic view showing laser repairing apparatus according to an embodiment 1 of the present invention.

As shown in FIG. 1, a reactor pressure vessel 1 is filled with water 2. When a laser beam 3 is guided into a nuclear power plant through an optical fiber 4 so as to improve residual stress on a material surface of a reactor inner structure 5.

That is, a pulse laser device 6 is disposed externally of the reactor pressure vessel 1 and the pulse laser device 6 is composed of a laser device having a visible wavelength pulse such as copper vapor laser, frequency doubled YAG laser and the like and a laser beam generated thereby has a pulse width of 100 nsec. or less.

The laser beam 3 is guided into the reactor pressure vessel 1 filled with the water 2 such as cooling water through an incident lens 7 and an optical fiber 4, converged to lights (diameter; d) having a peak output per 1 pulse of 0.1–10 GW/cm$^2$ by a converging lens 8 and irradiated to a surface (in particular, welded line portion and the like) of a material of the reactor internal structure 5 in the atmosphere in the water 2.

Figure 2:
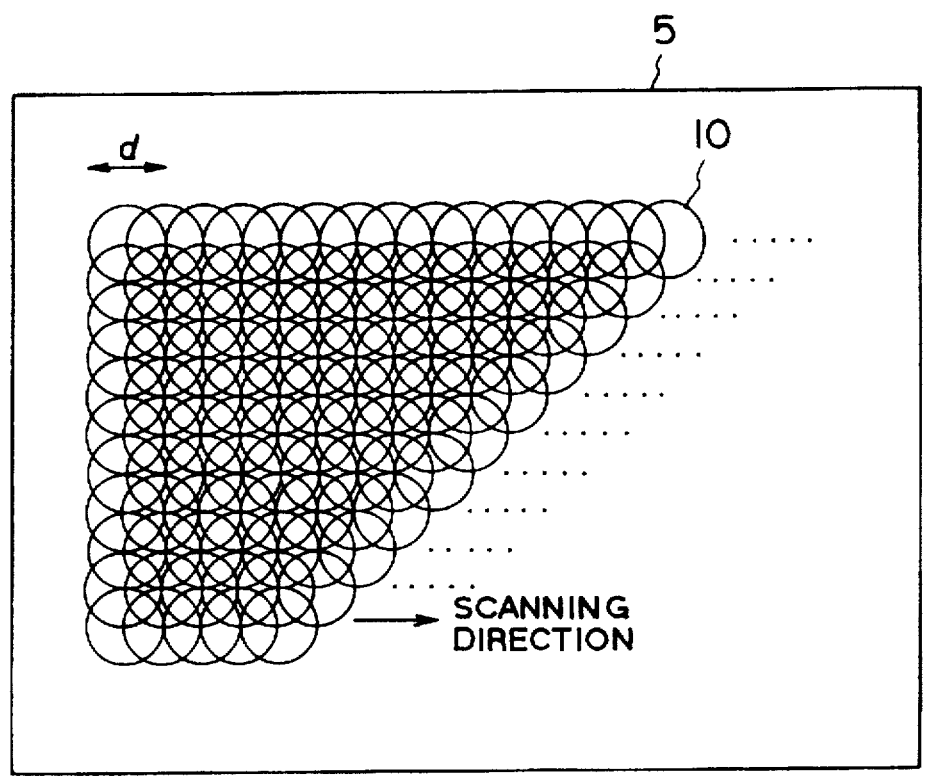
FIG. 2 is view showing a concept of a laser beam irradiating method according to the embodiment 1.

FIG. 2 is a view showing a method of irradiating the laser beam 3 according to the embodiment 1. That is, as shown in the drawing, processing is carried out such that the laser beam 3 is continuously irradiated by scanning the surface of the reactor internal structure 5 so that the irradiated spots 10 of the laser beam 3 are overlapped each other. At the time, the laser beam 3 is irradiated to remain no region on a surface to be processed where it is not irradiated and the irradiation thereof is carried out to provide the irradiated spots 10 of the laser beam 3 with an average multiplexing ratio (i.e. coverage factor) of 100% or higher by changing the diameters of the respective irradiated spots 10.

According to the method of the embodiment 1, the following operation and advantages will be achieved.

When the laser beam 3 having the visible wavelength, the pulse width of 100 nsec. or less and the peak output of 0.1–10 GW/cm$^2$ is irradiated to the surface of the material of the reactor inner structure 5, the uppermost surface layer of the material is scattered and plasma is then generated. The thus generated plasma has a very high pressure because its expansion is suppressed by the inertia of water in the atmosphere of the water 2 and reaches several hundreds of MPa to several tens of GPa. The surface of the material is plastically deformed by the shock high pressure and compressive stress remains thereon. According to the residual compressive stress, stress corrosion or cracks of the material surface of the reactor internal structure 5 can be effectively prevented from causing.

The reason why the laser beam 3 having the visible wavelength is that it is excellent in underwater permeability and suitable for the processing to be carried out in water. The reason why the pulse width is set to 100 nsec. or less is that when the pulse width exceeds 100 nsec., there is a possibility that the corrosion resistance of the material is lowered because the laser beam applies a thermal influence upon a material, and the tension stress will remain on the surface layer to which thermal influence is applied. The reason why the peak output is set to 0.1–10 GW/cm$^2$ is that when the peak output is less than 0.1 GW/cm$^2$, there is a possibility that the laser beam 3 insufficiently scatters the surface layer of the material and insufficiently generates plasma, whereas when the peak output exceeds 10 GW/cm$^2$, there is a possibility that the laser beam 3 is difficult to be converged because water is ionized by a strong electric field.

The continuous irradiation of the laser beam 3 effected by scanning it to overlap the irradiated spots 10 of the laser beam 3 can cause compressive stress to remain effectively and homogeneously on the entire surface to be processed. Further, since this embodiment has an effect for preventing a portion being irradiated from being rapidly cooled, there is a less possibility of causing a crack, which would be conventionally produced to a material being processed by rapid cooling.

In the processing using the laser beam as described above, since high energy is transmitted through the optical fiber 4, a high pressure piping for transferring steel balls by high-pressure water or high-pressure air need not be used, different from the shot-peening technology, thus the handling thereof is simplified. Further, since the visible light laser can be directly transmitted with small loss in water, the processing works can be directly carried out in the water 2. Thus, it is not necessary to remove the water 2 in the reactor prior to working. Since water has a high radioactive ray shielding effect, it can be expected that an amount of exposure of workers to radioactivity is reduced.

Moreover, since there is no mechanical reaction force when the laser beam is irradiated, an apparatus can be easily controlled and processing can be carried out with a pinpoint accuracy. Since the laser beam has the short pulse width, processing can be carried out with a small amount of the thermal influence on a material to be processed. Further, since the laser beam 3 is transmitted through the optical fiber 4, the processing head can be reduced in size to thereby enable works to be carried out in a narrow portion.

Consequently, according to the method of the embodiment 1 as described above, there can be achieved the advantage that processings such as preventive maintenance and repair of the reactor internal structure can be simply carried out with high quality and, moreover, the method has excellent applicability to a narrow portion.

Next, a first modification of the embodiment 1 will be described. This modification relates to an underwater laser processing method of controlling a value of residual stress on a surface of a material and a depth where the compressive stress in the material remains by adjusting the conditions of the diameter d of the irradiated spots 10 and the multiplexing ratio of an irradiated beam.

The first modification adjusts the diameter d of the irradiated spots 10 and the multiplexing ratio of the irradiated beam for the purpose of arbitrarily controlling the value of residual stress on the surface of the material and the depth where the compressive stress in the material remains.

When the laser beam 3 is converged and irradiated to a surface of a material, an areal density of power per 1 pulse (GW/cm$^2$) can be changed by changing the diameter d of the irradiated spots 10. Then, the value of residual stress on the surface of the material and the depth where the compressive stress in the material remains strongly depend on the areal density of power per 1 pulse. On the other hand, these two physical values also strongly depend upon the multiplexing ratio of an irradiated beam.

Therefore, the two amounts, i.e. the value of residual stress on the surface of the material and the depth where the compressive stress remains can be controlled by adjusting the two conditions, i.e. the diameters of the irradiated spots 10 and the multiplexing ratio of the irradiated beam.

Next, a second modification of the embodiment 1 will be described with reference to FIG. 3 and FIG. 4. This modification relates to an underwater laser processing method of irradiating a laser beam only in one direction in such a manner that a laser beam 1 having the predetermined number of pulses is irradiated in a train in a unit working region 11 to which the laser beam 3 is to be irradiated, and when the irradiation of the laser beam 3 is shifted to a next train, a scanning speed of the beam is increased so that the shift is finished between the pulses of the irradiated laser beam.

Figure 3:
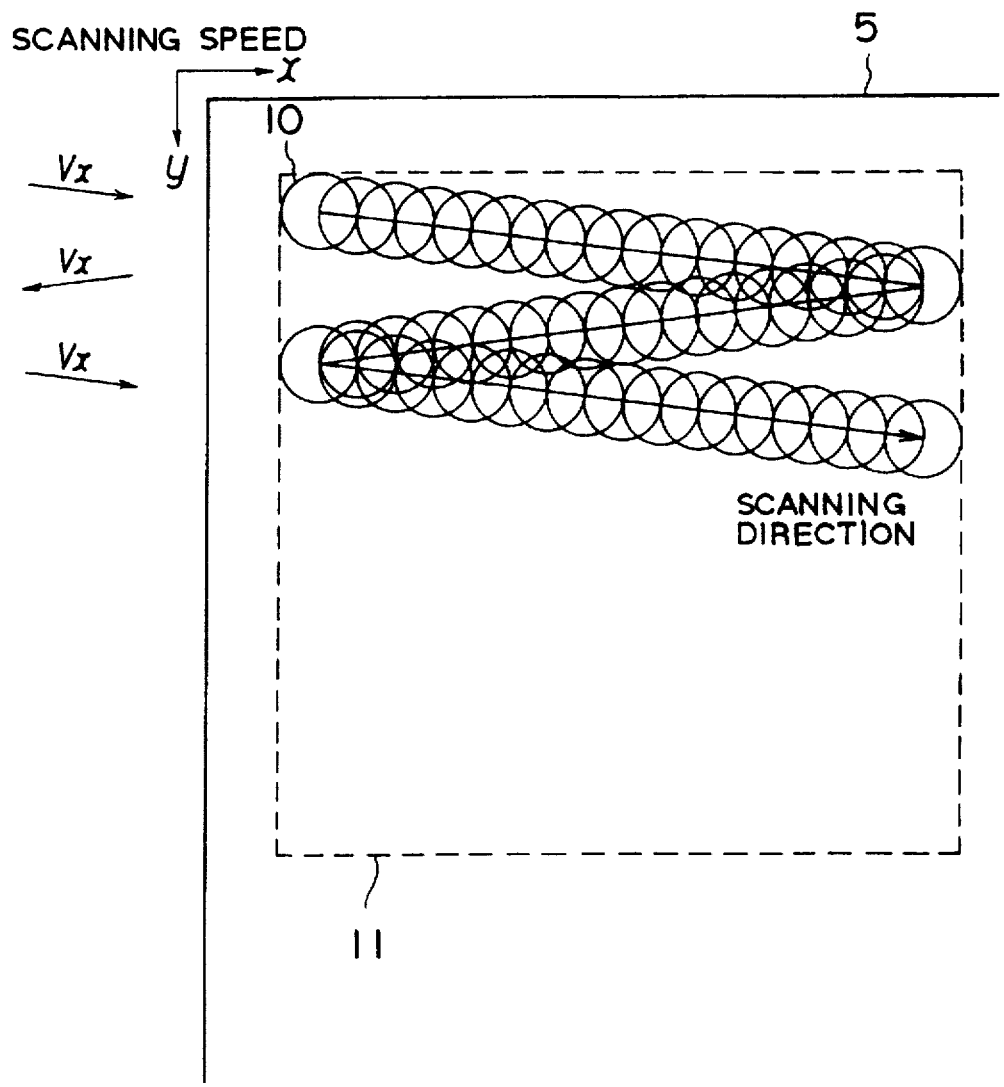
FIG. 3 is a view showing a typical laser beam irradiating method.

FIG. 3 shows a typical method of irradiating the laser beam 3 which has been known up to now. A scanning process is performed in one direction (y-direction) at a predetermined scanning speed Vy, and in a direction normal to that one direction (x-direction), scanning process is performed in this and reverse directions every predetermined time intervals at the scanning speed Vx. Usually, since laser pulses are generated at a certain cycle, the pulse laser beam is irradiated even while it is shifted to a next train as shown.

Figure 4:
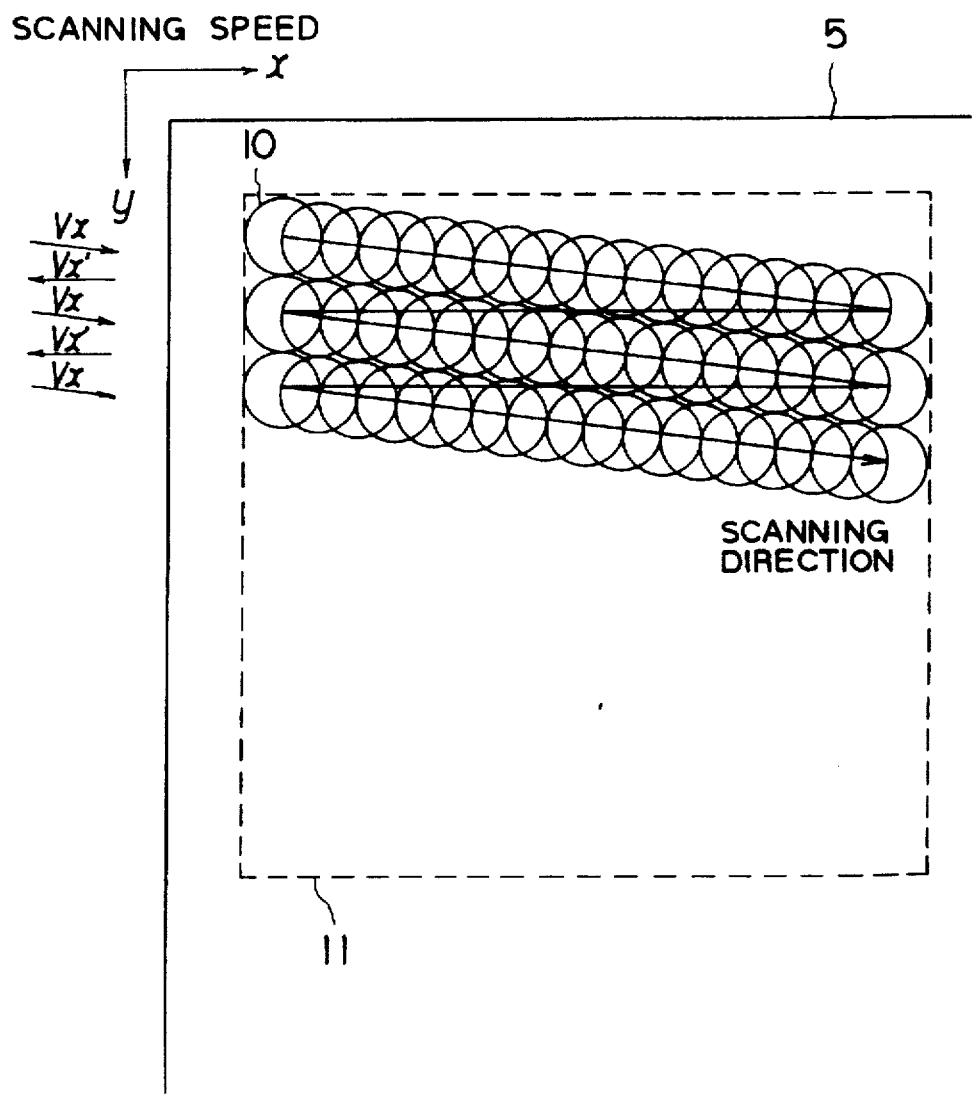
FIG. 4 is a view showing an improved laser beam irradiating method.

On the other hand, FIG. 4 shows a method according to the second modification, wherein a scanning speed V'x in the x-direction at which the irradiation of the pulse laser beam shifts to a next train is set to a very high speed so that the shift is finished between irradiated laser pulses.

The typical irradiation method of the laser beam 3 shown in FIG. 3 has a possibility that the distribution of the multiplexing ratios of the irradiated beam is deflected at the portion of the irradiated spots 10 where a scanning direction changes. Whereas, according to the second modification of FIG. 4, the scanning speed at which the irradiation of the pulse laser beam shifts to the next train is set to a very high speed so that the shift is finished between the pulses of the irradiated laser beam and the number of irradiation carried out during the shift is set to zero, as shown in FIG. 4. As a result, the distribution of the multiplexing ratios of the irradiated beam is not deflected at the portion where the scanning direction changes, whereby the ununiformity of the multiplexing ratios of the irradiated beam can be reduced.

Since the ununiformity of the multiplexing ratio of the irradiated beam can be reduced in the modification as described above, the compressive stress can be caused to remain uniformly on a surface to be processed.

Figure 5:
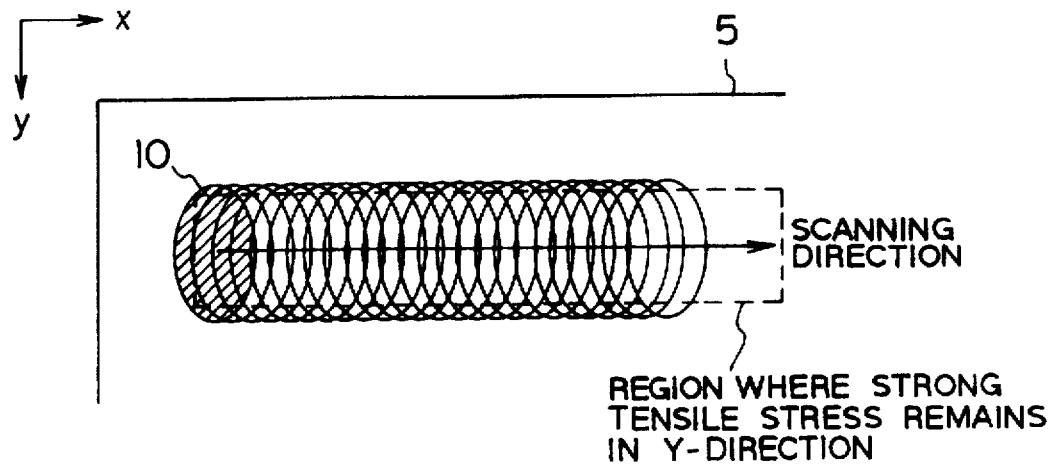
FIGS. 5 and 6 are views each showing an irradiating method in a case where a configuration of irradiated spots is changed.
Figure 6:
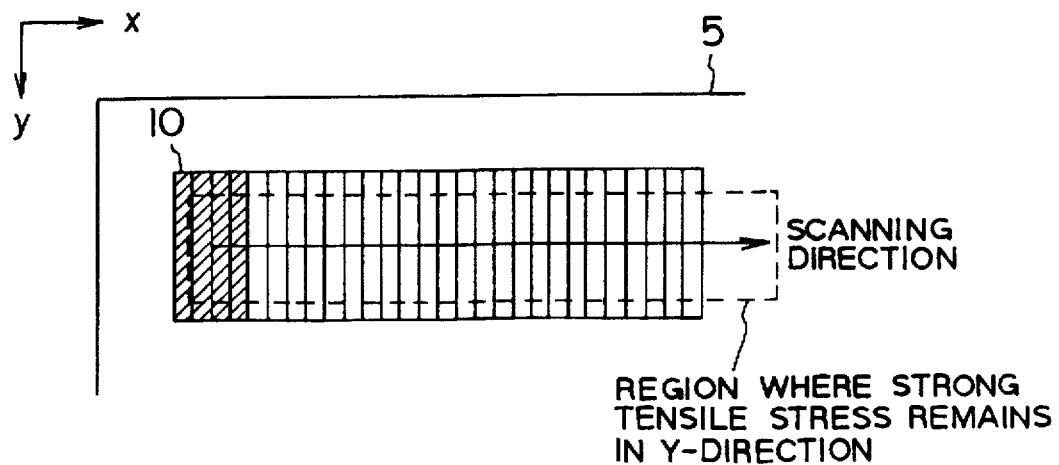

Next, a third modification of the embodiment will be described with reference to FIG. 5 and FIG. 6. This modification relates to an underwater laser processing method of shaping the configuration of the irradiated spots 10 of the laser beam 3 to an ellipse (FIG. 5) or a rectangle (FIG. 6).

That is, it is assumed, for example, that strong tensile stress remains, on the material surface of the reactor internal structure, in a y-direction in the drawing. In this case, a shock wave generated by ablation can be made homogeneous in the y-direction and strong compressive stress can be applied in the y-direction rather than in the x-direction so that residual stress in the y-direction can be changed from tensile stress to compressive stress in such a manner that the configuration of the irradiated spots 10 is shaped to an ellipse having a major axis in the y-direction or to a rectangle having long sides in the y-direction and the laser beam is continuously irradiated while scanning an irradiating position. Consequently, according to the third modification, residual stress in a particular direction can be improved.

Embodiment 2 (FIGS. 7A to 7D)

This embodiment relates to an underwater laser processing method of perfectly removing a fine crack generated on a surface of a reactor inner structure located in the water by sensing the fine crack and irradiating a laser beam having a pulse width of 100 nsec. or less and a visible length to the cracked portion under the conditions that a peak output (power) per 1 pulse is 0.1–10 GW/cm² while monitoring the state that the acute angle portion is removed by ablation.

Figure 7A:
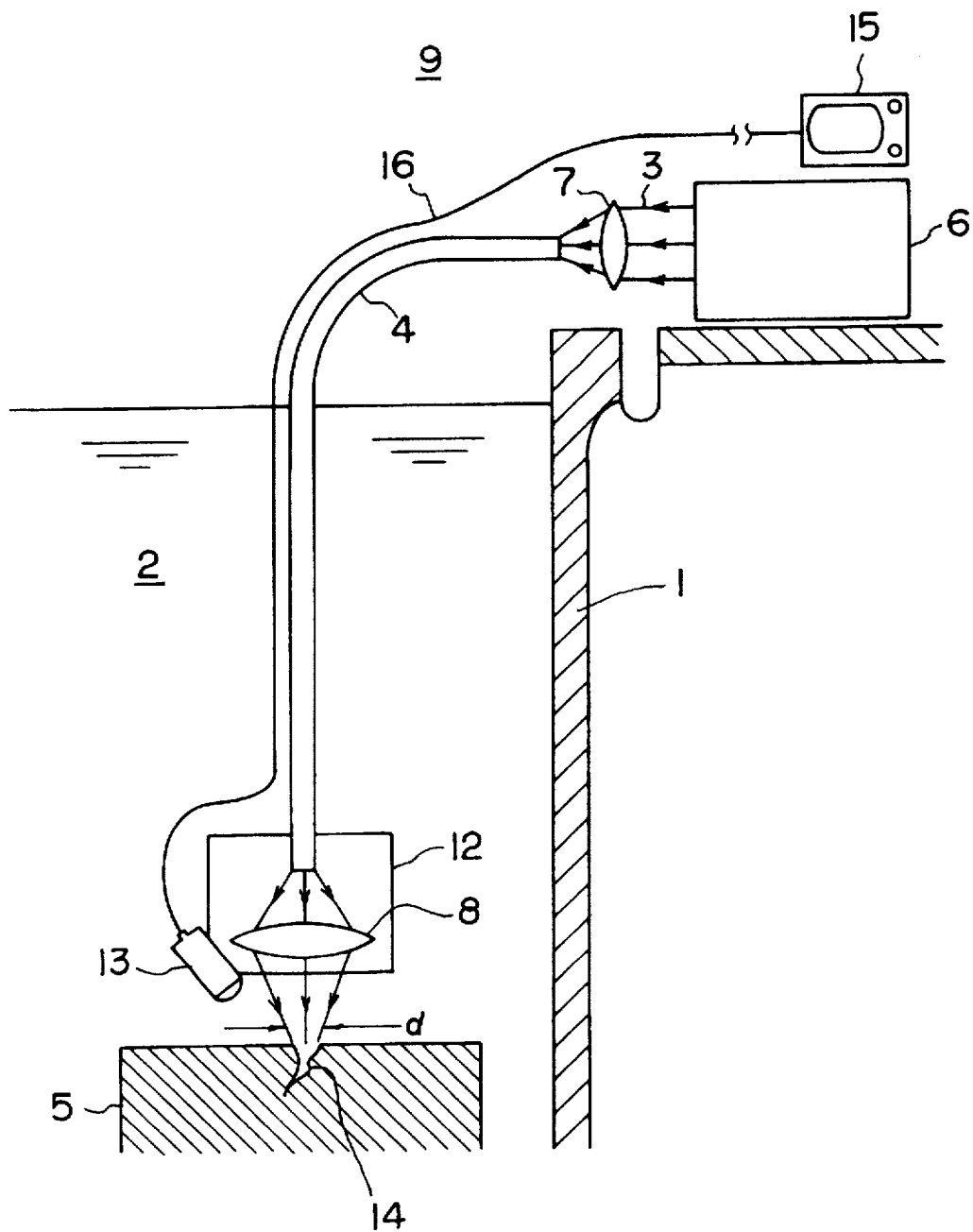
FIG. 7A is a schematic view showing a laser repairing device according to an embodiment 2 of the present invention.
Figure 7B:
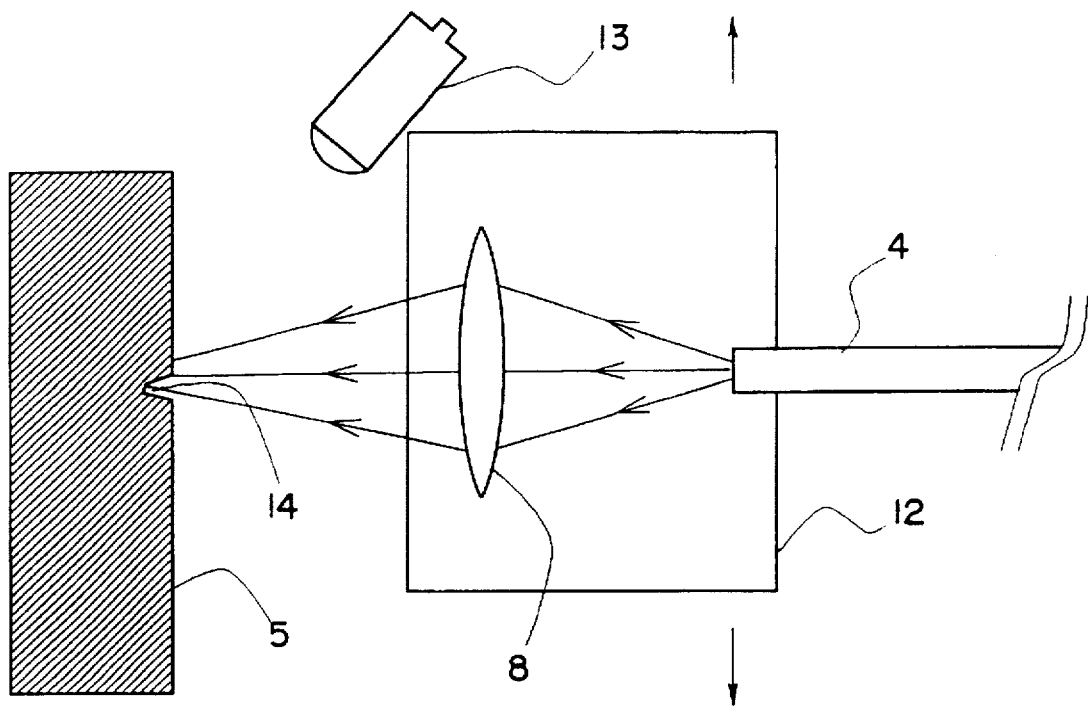
FIGS. 7B, 7C and 7D are views showing modifications of the embodiment 2.
Figure 7C:
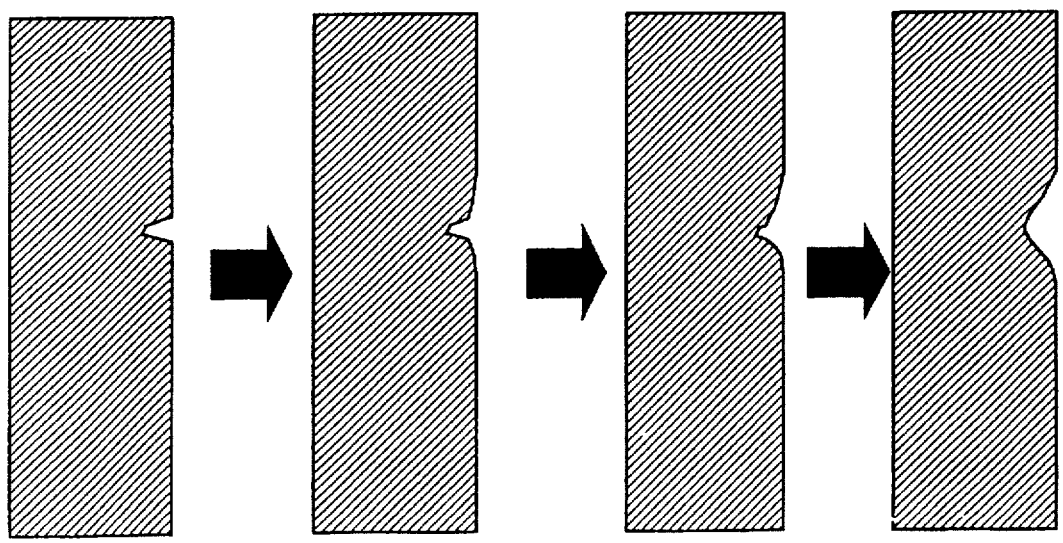

That is, a surface of a reactor internal structure 5 is investigated by a CCD (charge-coupled-device) camera 13 mounted to a processing head 12 and when the presence of a fine crack 14 is recognized by a monitor TV (television) 15, a laser beam 3 is irradiated to portions near the cracked portion as shown in FIG. 7A. The CCD camera 13 is connected to the monitor TV through a signal cable 16. The laser beam 3 is composed of a laser beam having a pulse width of 100 nsec. or less and a visible wavelength which is generated from a pulse laser device 6 for generating laser beam such as copper vapor laser, frequency doubled YAG laser and the like disposed externally of a reactor pressure vessel 1. The laser beam 3 is guided into the reactor pressure vessel 1 filled with water 2 through an incident lens 7 and an optical fiber 4 and converged by a converging lens 8 so that a peak output per 1 pulse of 0.1–10 GW/cm² is achieved. The laser beam 3 is repeatedly irradiated until the crack 14 is perfectly removed while how the crack 14 is removed by ablation is monitored by the CCD camera 13 mounted to the processing head 12. That is, as shown in FIG. 7B, the portion near the cracked portion is irradiated by the laser beam 3 while moving the same, whereby the material surface to which the cracks 14 are formed can be made gradually smooth as shown in FIGS. 7C(a) to (d).

According to the method of the embodiment 2, when the laser beam 3 having the visible wavelength, the pulse width of 100 nsec. or less and the peak output of 0.1–10 GW/cm² is irradiated to the surface of the material of the reactor inner structure 5 in the atmosphere of the cooling water 2, the uppermost surface layer of the material are instantly scattered. This phenomenon is called ablation. The material at the cracked portion can be gradually removed by the ablation by repeatedly irradiating the laser beam 3 to the portions near the cracked portion and finally the crack 14 can be perfectly removed.

According to the manner described above, the progress of cracking of the material due to the presence of such crack 14 can be prevented, which will be described hereunder with reference to FIG. 7D.

Figure 7D:
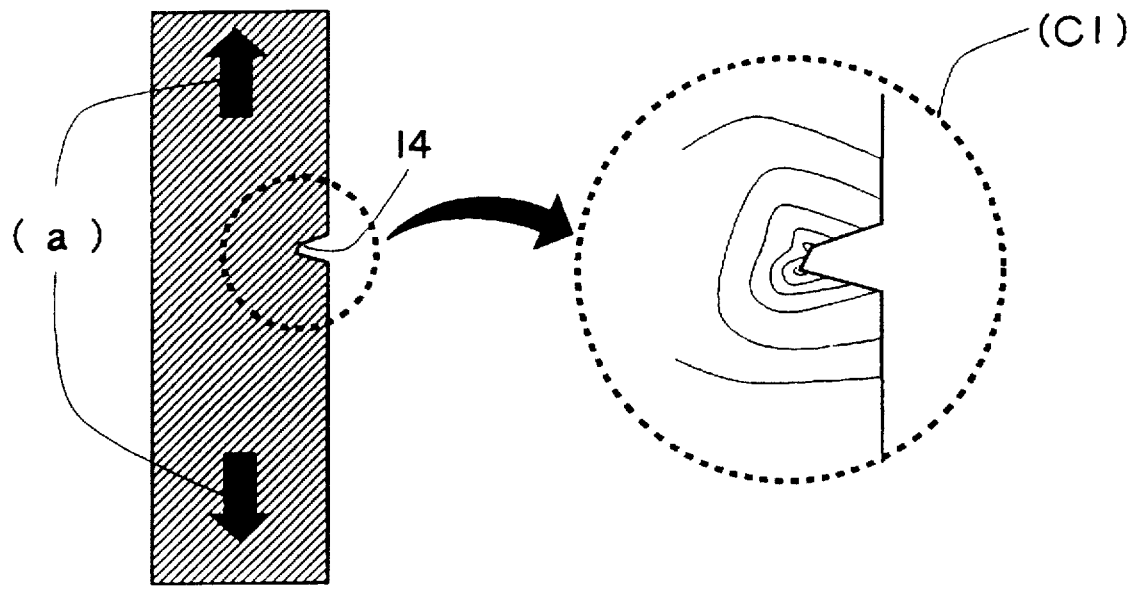
Figure 7D:
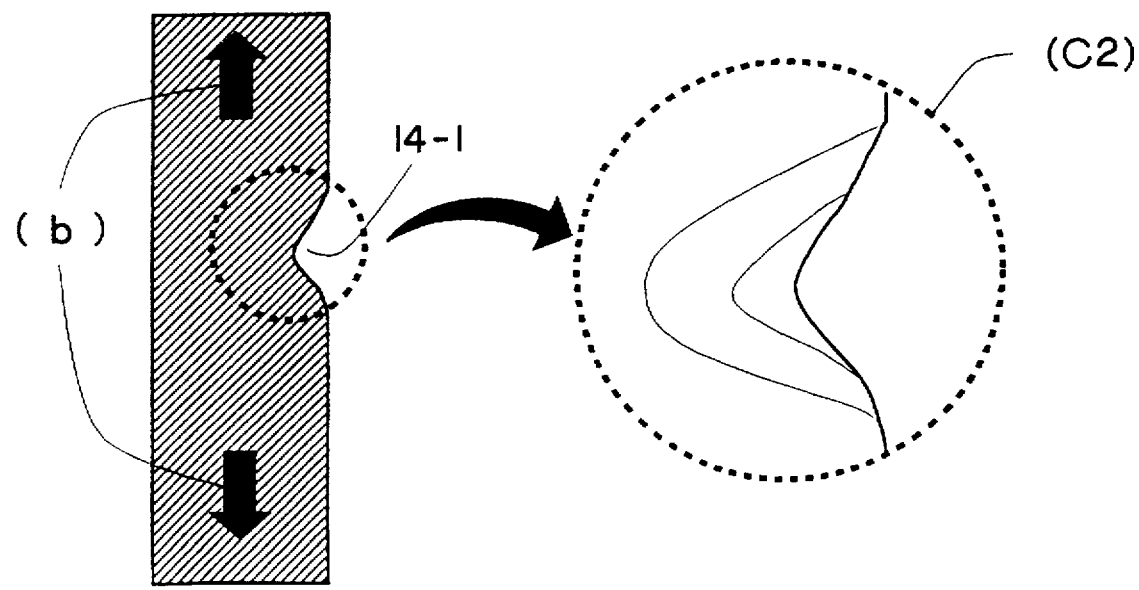

FIGS. 7D(a) and (b) show the condition that the stress is applied to the structure 5, and reference numeral 14-1 denotes a smooth surface from which the crack 14 is removed by the irradiation of the laser beam, which is shown by enlarged circled portions C1 and C2 and in which distributions of the stresses are illustrated by contour lines. As shown in C1, in a case where the crack is present, the stress is concentrated to a sharp portion of the crack at which the crack will likely progress, and on the other hand, as shown in C2, in a case where the crack is removed, the stress is not concentrated, and thus, the crack does not progress.

The reason why the laser beam 3 having the visible wavelength is used is that it is excellent in underwater permeability and suitable for processing to be carried out in water. The reason why the above pulse width is employed is that when the pulse width exceeds 100 nsec., there is a possibility that the corrosion resistance of the material is lowered because the laser beam applies a thermal influence on a material.

The reason why the peak output is set to 0.1%′3 10 GW/cm² is that when the peak output is less than 0.1 GW/cm², there is a possibility that the laser beam 3 removes the surface layer of the material by the ablation, whereas when the peak output exceeds 10 GW/cm², there is a possibility that the laser beam 3 is difficult to be converged because water is ionized by a strong electric field.

Since there is no mechanical reaction force in the processing carried out by the aforesaid laser irradiation, an apparatus can be easily controlled and processing can be carried out with a pinpoint accuracy. Further, since the visible laser can be directly transmitted in water, the processing can be directly carried out in water and it is not necessary to remove the water 2 in the reactor prior to working. Since water has a high radioactive ray shielding effect, it can be expected that an amount of exposure of workers to radioactivity is reduced.

Moreover, since the pulse width is shortened and the processing is performed in the ablation region, a heat-input amount is less and an amount of thermal influence on a material to be processed are reduced. Further, since the laser beam 3 is transmitted through the optical fiber 4, the processing head 12 can be reduced in size to thereby enable processing to be carried out in a narrow portion.

Consequently, according to the method of the embodiment 2, the processing can be carried out with high quality as well as applicability to a narrow portion can be improved.

Embodiment 3

This embodiment 3 relates to an underwater laser processing method of removing a fine crack generated on a surface of a material of a reactor inner structure and then applying a residual stress improving processing to the surface of the material from which the crack was removed.

That is, after a fine crack 14 generated on a surface of a reactor internal structure 5 is perfectly removed by using the method of the embodiment 2, the residual stress on the surface of the material from which the crack was removed is improved by using the method of the embodiment 1.

According to the method of the embodiment 3 as described above, when the method of the embodiment 2 is applied to the portion where the crack is generated and then the method of the embodiment 1 is applied thereto, the crack 14 can be removed and the progress of the crack 14 can be suppressed by relieving stress concentrated on a structural member. Further, compressive stress can be caused to sufficiently remain on the surface of the material after the crack is removed therefrom so as to prevent stress corrosion cracking.

Figure 8A:
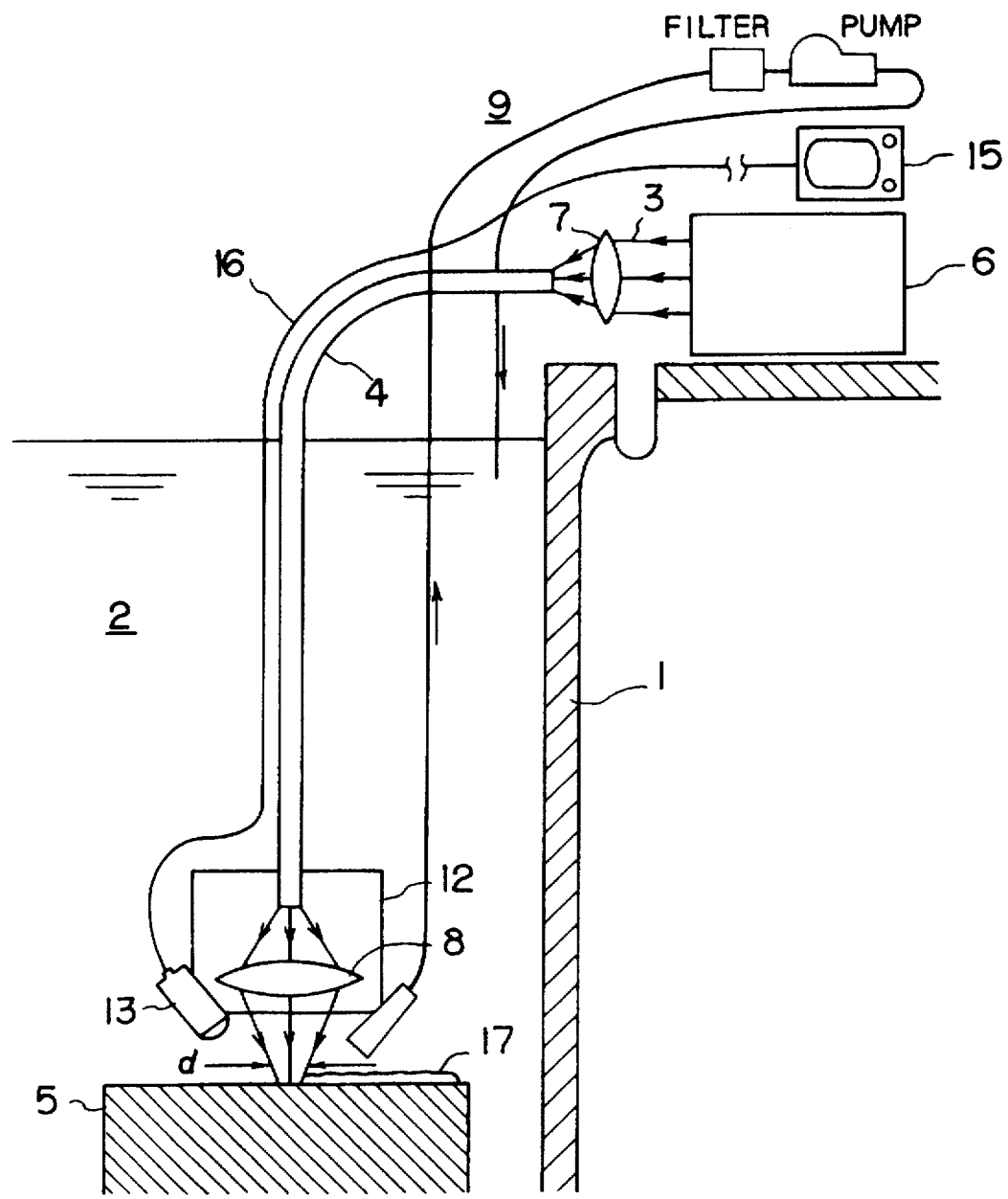
FIG. 8A is a schematic view showing a laser repairing device according to an embodiment 4 of the present invention.
Figure 8B:
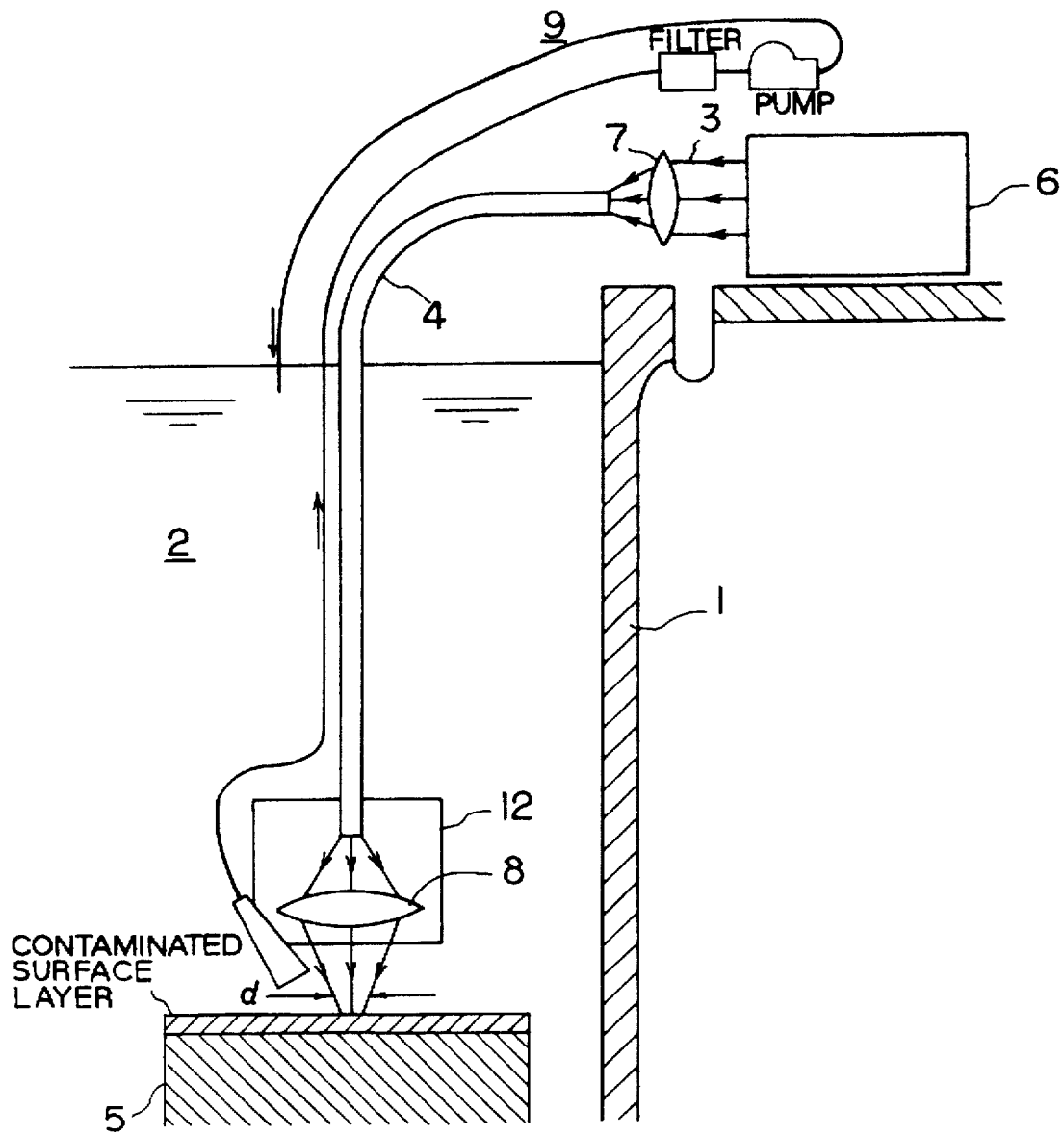
FIG. 8B is a view showing a modification of the embodiment 4.

Embodiment 4 (FIGS. 8A and 8B)

As shown in FIG. 8A, the embodiment 4 relates to an underwater laser processing method of removing a CRUD 17 accumulated on a surface of a material, discharging the CRUD externally of the reactor pressure vessel 1 by means of pump and recovering the clad by means of filter, by irradiating a laser beam 3 having a pulse width of 100 nsec. or less and a visible wavelength to a material surface of a reactor internal structure 5 which is filled with the water 2 and in which the CRUD 17 is accumulated under the conditions that a peak output per 1 pulse is 0.1–10 GW/cm$^2$ and a multiplexing ratio of an irradiated beam is 100% or higher and at the same time improving residual stress on the surface of the material.

The laser beam 3 is guided into a reactor pressure vessel 1 through an optical fiber 4 and removes the clad on the material surface of the reactor internal structure 5 while monitoring the CRUD and improves residual stress thereon.

In this case, the surface of the reactor internal structure 5 is investigated by the CCD camera 13 mounted to the processing head 12 and when the accumulation of the CRUD 17 is recognized, the laser beam 3 is irradiated to a portion where the clad is accumulated. The laser beam 3 is composed of a laser beam having a pulse width of 100 nsec. or less and a visible wavelength which is generated from a pulse laser device 6 for copper vapor laser, frequency doubled YAG laser and the like disposed externally of a reactor pressure vessel 1. The laser beam 3 is guided into the reactor pressure vessel 1 filled with the water 2 through then incident lens 7 and the optical fiber 4 and converged by the converging lens 8 so that a peak output per 1 pulse is 0.1–10 GW/cm$^2$ is achieved.

The laser beam 3 is continuously irradiated by scanning it likewise the aforesaid embodiment 1 also in the embodiment 4, and the processings are carried out so that the irradiated spots 10 of the laser beam 3 are overlapped each other. At the time, the laser beam 3 is irradiated to remain no region on a surface to be processed where it is not irradiated and the irradiation thereof is carried out to provide an irradiated beam with an average multiplexing ratio of 100% or more by changing the diameter of the irradiated spots 10. While the laser beam is irradiated, how the clad 17 is removed is monitored by the CCD camera 13, and portions near the effected portion are sucked to then discharge externally of the reactor pressure vessel 1 by means of pump and recover the same by means of filter. After the completion of the irradiation of the laser beam to a unit irradiating region, the region is checked by the CCD camera 13 and when the deposition of the CRUD 17 is recognized as a result of the check, the above irradiation is repeated to the unit irradiating region until the CRUD 17 is completely removed.

According to the method of the embodiment 4, when the laser beam 3 having the visible wavelength, the pulse width of 100 nsec. or less and the peak output of 0.1–10 GW/cm$^2$ is irradiated to the material surface of the reactor internal structure 5 where the CRUD 17 is accumulated, the CRUD 17 and the uppermost surface layer of the material of the structure are instantly scattered and plasma is then generated. The thus generated plasma has a very high pressure because its expansion is suppressed by the inertia of water in the atmosphere of the water 2 and reaches several hundreds of MPa to several tens of GPa. The CRUD 17 is exfoliated and removed from the surface of the material as well as the surface of the material is plastically deformed by the shock force generated at the time and compressive stress remains thereon.

The CRUD removed from the material surface is discharged externally of the reactor pressure vessel 1 by means of pump and then recovered by means of filter.

The stress corrosion cracking can be positively prevented from causing by changing the residual stress to the compressive stress, and by recovering the CRUD, the CRUD traps the radioactive substance, so that exposure dose to workers can be effectively prevented from increasing.

The reason why the laser beam 3 having the visible wavelength is used is that it is excellent in underwater permeability and suitable for the processing carried out in water. The reason why the pulse width is set to 100 nsec. or less is that when the pulse width exceeds 100 nsec., there is a possibility that the corrosion resistance of the material is lowered because the laser beam applies a thermal influence on a material. The reason why the above peak output is employed is that when the peak output is less than 0.1 GW/cm$^2$, there is a possibility that the laser beam 3 insufficiently scatters the surface layer of the material and insufficiently generates plasma, whereas when the peak output exceeds 10 GW/cm$^2$, there is a possibility that the laser beam 3 is difficult to be converged because water is ionized by a strong electric field.

The continuous irradiation of the laser beam 3 effected by scanning it to overlap the irradiated spots 10 of the laser beam 3 can remove the CRUD on the entire surface to be processed and improve residual stress thereon effectively and homogeneously. Further, since the embodiment also has an effect for preventing the portion being irradiated from being rapidly cooled, a crack produced to the material being processed by rapid cooling can be prevented.

In the processing using the laser beam as described above, since high energy is transmitted through the optical fiber 4 and a high pressure piping for transferring steel balls by high-pressure water or high-pressure air as in the case of shot-peening need not be used, the handling is simplified. Further, since the laser beam having the visible wavelength can be directly transmitted in water, the processing works can be directly carried out in the water 2. Thus, it is not necessary to remove the cooling water 2 in the reactor prior to the working. Since the water has a high radioactive ray shielding effect, it can be expected that an amount of the exposure of workers to radioactivity is reduced.

Moreover, since there is no reaction force when the laser beam is irradiated, an apparatus can be easily controlled and processing can be carried out with a pinpoint accuracy. Since the laser beam has a short pulse width, processing can be carried out with a small amount of thermal influence on a material to be processed. Further, since the laser beam 3 is transmitted through the optical fiber 4, the processing head 12 can be reduced in size to thereby enable works to be carried out in a narrow portion.

Consequently, the above method can also provide a maintenance method which is simple and has high quality and excellent applicability to the narrow portion.

Next, a first modification of the embodiment 4 will be described hereunder with reference to FIG. 8B. As shown in FIG. 8B, the first modification of the embodiment 4 relates to an underwater laser processing method of removing a material surface layer contaminated by the radioactivity, discharging the removed portion externally of the reactor pressure vessel 1 by means of pump and recovering the same by means of filter, by irradiating the laser beam 3 having a pulse width of 100 nsec. or less and a visible wavelength to a material surface of the reactor internal structure 5 which is filled with the water 2 and in which the CRUD 17 is accumulated under the conditions that a peak output per 1 pulse is 0.1–10 GW/cm$^2$ and a multiplexing ratio of an irradiated beam is 100% or higher, and at the same time, the residual stress on the surface of the material can be improved.

The laser beam 3 is guided into a reactor pressure vessel 1 through the optical fiber 4 and removes the material surface layer extremely contaminated by the radioactivity on the material surface of the reactor inner structure 5 while improving the residual stress of the material surface thereof.

In this case, the laser beam 3 guides the laser pulse generated from the laser device 6 such as copper-vapor laser or frequency doubled YAG laser disposed externally of the reactor pressure vessel and having a visible wavelength a pulse width of 100 nsec. or less into the reactor pressure vessel 1 filled with the water 2 through the incident lens 7 and the optical fiber 4, and the laser beam 3 is converged by the converging lens 8 so that a peak output per 1 pulse is 0.1–100 GM/cm$^2$.

According to this first modification of the embodiment 4, as like as in the former embodiment 1, the processing is carried out such that the laser beam 3 is continuously irradiated by scanning the surface of the reactor internal structure 5 so that the irradiated spots 10 of the laser beam 3 are overlapped each other. At the time, the laser beam 3 is irradiated to remain no region on a surface to be processed where it is not irradiated and the irradiation thereof is carried out to provide the irradiated spots 10 of the laser beam 3 with an average multiplexing ratio of 100% or higher by changing the diameter of the irradiated spots. During the irradiation, the portion near the processed portion is sucked by means of pump to thereby discharge the contaminated substance externally of the reactor pressure vessel 1 and then recover the same by means of filter.

The functions and effects attained by the first modification are essentially similar to those of the embodiment 4 but differ therefrom in the following points.

That is, by irradiating the laser beam 3 having the visible wavelength and a peak output of 0.1–100 GM/cm$^2$ at the pulse width of 100 nsec. or less to the material surface of the reactor internal structure 5 extremely contaminated at its surface by the radioactivity, the contaminated surface layer is instantly scattered and the plasma is then generated. The thus generated plasma provides an extremely high pressure through the suppression of volume expansion by the inertia force of the water under the environment of the water 2 and reaches several hundreds of MPa to several tens of GPa. According to such impact force, the material surface is plastically deformed and the compressive stress remains. The scattered contaminated substance is discharged externally of the reactor pressure vessel 1 by means of pump and then recovered by means of filter. Accordingly, the improvement in the residual stress of the material surface of the reactor internal structure 5 can be achieved together with the removal of the extremely contaminated substance of the material surface layer.

The stress corrosion crack can be also prevented from causing by positively changing the residual stress to the compressive stress. Furthermore, the exposure does to the workers can be prevented from increasing by peeling off the surface layer of the contaminated surface of the reactor inner structure 5 and then recovering the same.

A second modification of the embodiment 4 will be further described hereunder.

This second modification provides a method of controlling a thickness of the contaminated surface layer to be removed by adjusting condition of the energy density per 1 pulse of the laser beam 3 in the first modification mentioned above and the multiplexing ratio of the irradiated beam. That is, in this second modification, the energy density and the multiplexing ratio are adjusted for the purpose of controlling the thickness of the material surface layer to be removed of the reactor internal structure 5 which is contaminated by the radioactivity.

According to the second modification, the thickness of the scattered layer by the ablation depends on the substance of the material to be subjected to the ablation, the wavelength of the laser beam, the energy density per 1 pulse of the laser beam and the spot shot numbers of the laser beam. Accordingly, in a case where a laser beam having a specific wavelength with respect to a specific material is used, the thickness of the material surface layer to be removed can be controlled by adjusting the conditions of the energy density per 1 pulse of the laser beam and the multiplexing ratio of the irradiated laser beam. Thus, the thickness to be removed can be controlled in accordance with the contaminated thickness of the material surface layer.

Figure 9:
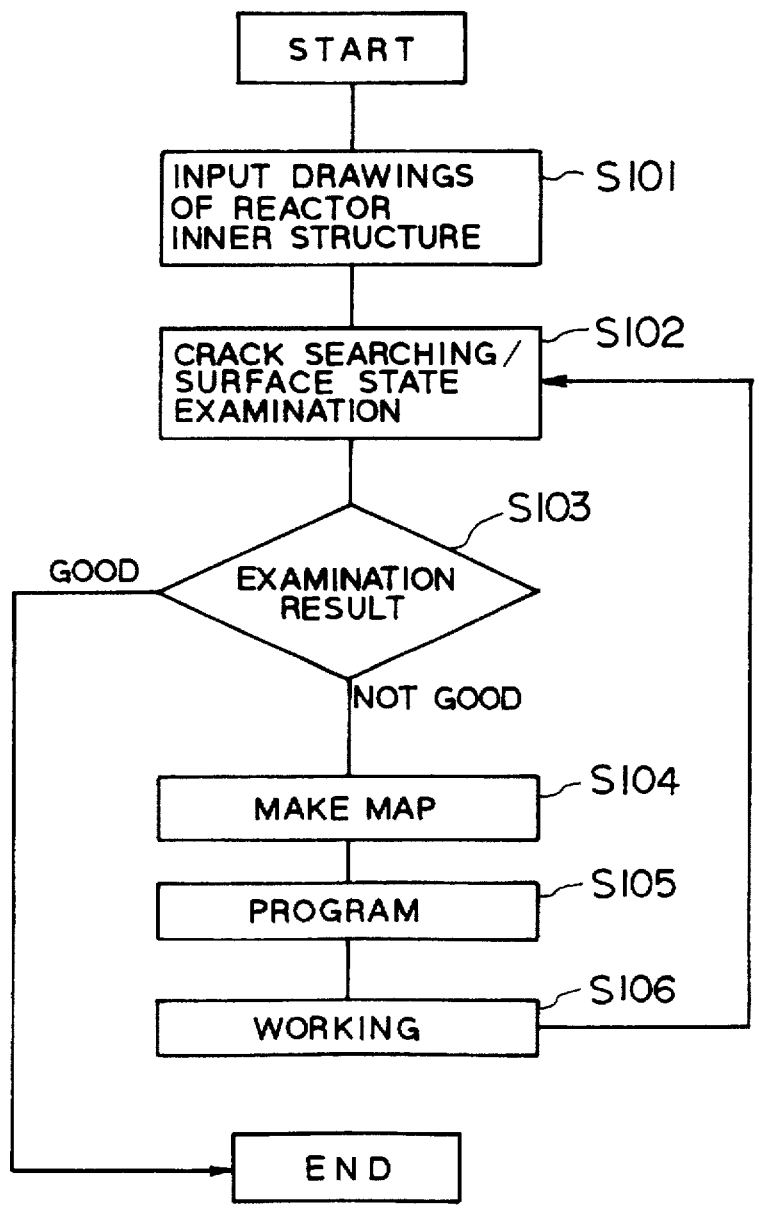
FIG. 9 is a flowchart showing an operation sequence according to an embodiment 5 of the present invention.
Figure 10:
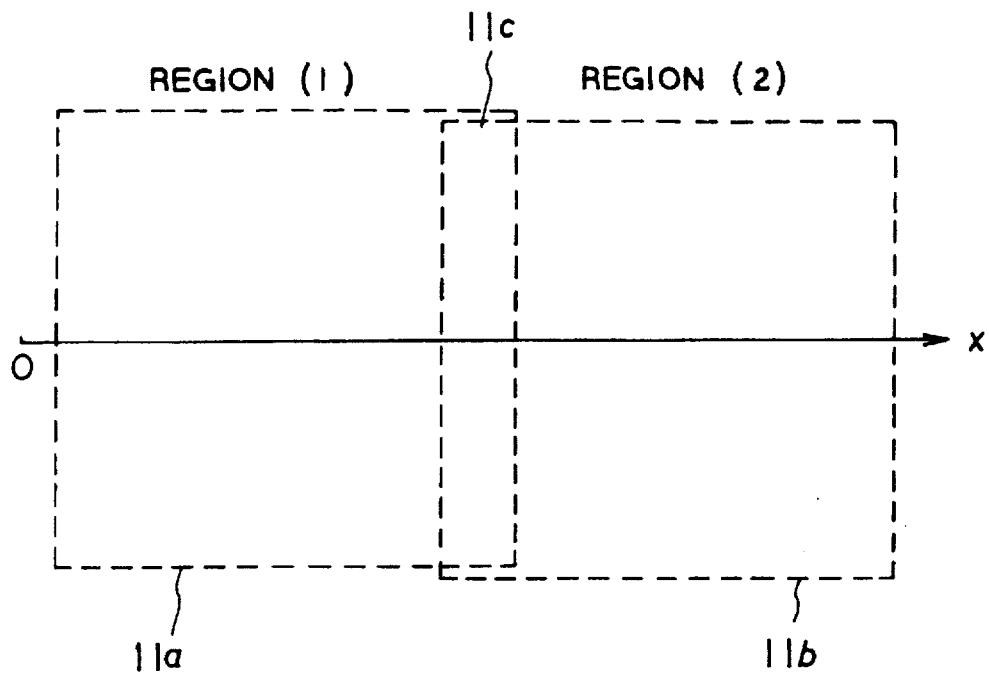
FIG. 10 is a view showing a distribution of a multiplexing ratio of irradiated beams according to the embodiment 5.
Figure 11:
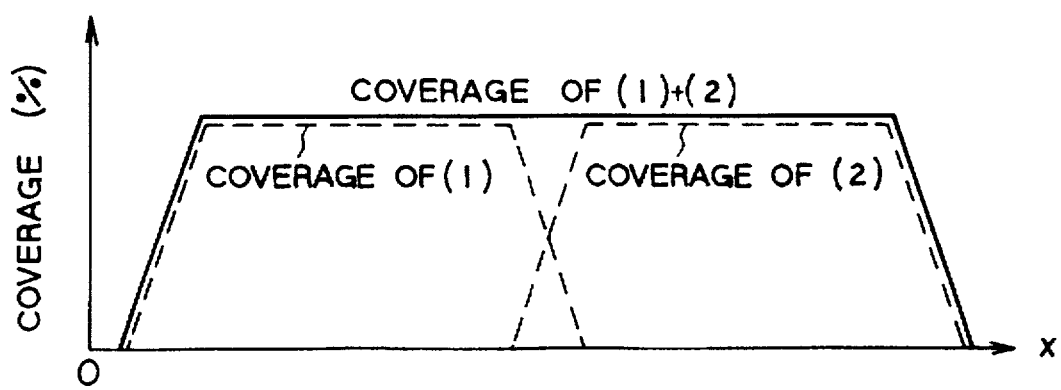
FIG. 11 is a view showing a state of a shroud inner surface which is repaired by irradiating a laser beam according to the embodiment 5.

Embodiment 5 (FIG. 9–FIG. 11)

This embodiment relates to an underwater laser processing method arranged such that when residual stress on a surface of a material is improved and a crack or a CRUD on the surface thereof is removed by irradiating a laser beam 3 to a material surface of a reactor internal structure 5 filled with water 2, a map is made based on a crack searching examination and a surface state examination which were previously carried out and drawings of the reactor internal structure and an entire working region, a unit working region 11, working conditions and the like of the structure 5 are automatically controlled using a computer programmed to carry out works according to the map.

FIG. 9 is a flowchart showing a processing sequence according to the embodiment 5.

First, the drawings of the reactor internal structure are input (step S101) and the crack searching examination and the surface state examination of the surface of the reactor internal structure 5 are carried out based on the drawings (step S102). The result of the examinations is judged (step S103) and when the result is good, the process is finished. When it is judged as the result of the examinations that residual stress on the surface of the material must be improved and the crack or the CRUD thereon must be removed (when the result is not good), the entire working region, unit working region 11 and working conditions needed for processing them are planed and a working map is made (step S104).

Then, a processing for improving the residual stress on the surface of the reactor internal structure 5 and removing the crack or the CRUD thereon is carried out (step S106) while automatically controlling the processing by the computer programmed to carry out works according to the working map. Thereafter, the crack searching examination and the surface state examination of the surface of the reactor internal structure 5 are carried out again (step S102) and the working routine is repeated until a good result is obtained.

According to the method of the embodiment 5, the residual stress of the material of the reactor internal structure 5 can be improved and the crack and the CRUD thereon can be removed by irradiating the laser beam 3 having a visible wavelength, a high output and a short pulse to the surface of the reactor inner structure 5 in the atmosphere of water in the reactor likewise the embodiments 1, 2 and 4.

The improvement of the residual stress of the structure and removal of the crack and the CRUD thereon can be effectively and comprehensively carried out to the interior of the reactor as a whole by carrying out the above processing based on the map made on the basis of the previous effected examination of the reactor internal structure 5 and based on the drawings of the reactor internal structure.

The processing can be more effectively carried out by being automatically controlled using the computer. Further, repair and preventive maintenance can be carried out with high reliability by repeating the processing and the examination.

FIG. 10 and FIG. 11 show a modification of the embodiment 5. The modification relates to an underwater laser processing method arranged such that a multiplexing ratio of an irradiated beam is gradually reduced in the vicinity of boundary portions 11c of two unit working regions 11a, 11b and a work is carried out to overlap the boundary portions so as to obtain a uniform distribution of the multiplexing ratio of the irradiated beam over an entire worked portion.

According to the method of this modification, the distribution of the multiplexing ratio of the irradiated beam is made uniform over the entire working portion including the vicinities of the boundary portions 11c of the unit working regions 11a, 11b, and thus, it is possible to cause compressive stress to uniformly remain over the entire working portion.

Embodiment 6 (FIG. 12–FIG. 25)

This embodiment relates to a case that an underwater laser processing is applied to an inner surface of a core shroud of a reactor pressure vessel.

That is, according to this embodiment 6, a remote repairing device including a laser irradiation unit at the extreme end of a link type arm is provided and suspended into the reactor pressure vessel by a wire from the upper side of the pressure vessel. Then, the remote repairing device is caused to pass through an opening of an upper latticed plate at the center of a core and installed on a core support plate and a visible light laser beam generated by a pulse laser device is irradiated to the core shroud by a laser irradiation position.

The embodiment 6 is provided with a mechanism for adjusting a power per 1 pulse and the laser beam is guided to the laser irradiation device at the extreme end of the link type arm through an optical fiber in a composite cable composed of the combination of a power cable, a signal cable and the optical fiber. Then, a spot diameter of the irradiated laser is adjusted by the processing head of the laser irradiation device as well as a multiplexing ratio of the irradiated laser beam is adjusted and the laser beam is irradiated while swingably scanning the laser beam for each predetermined range to thereby carry out processing of the inner surface of the core shroud.

Figure 12:
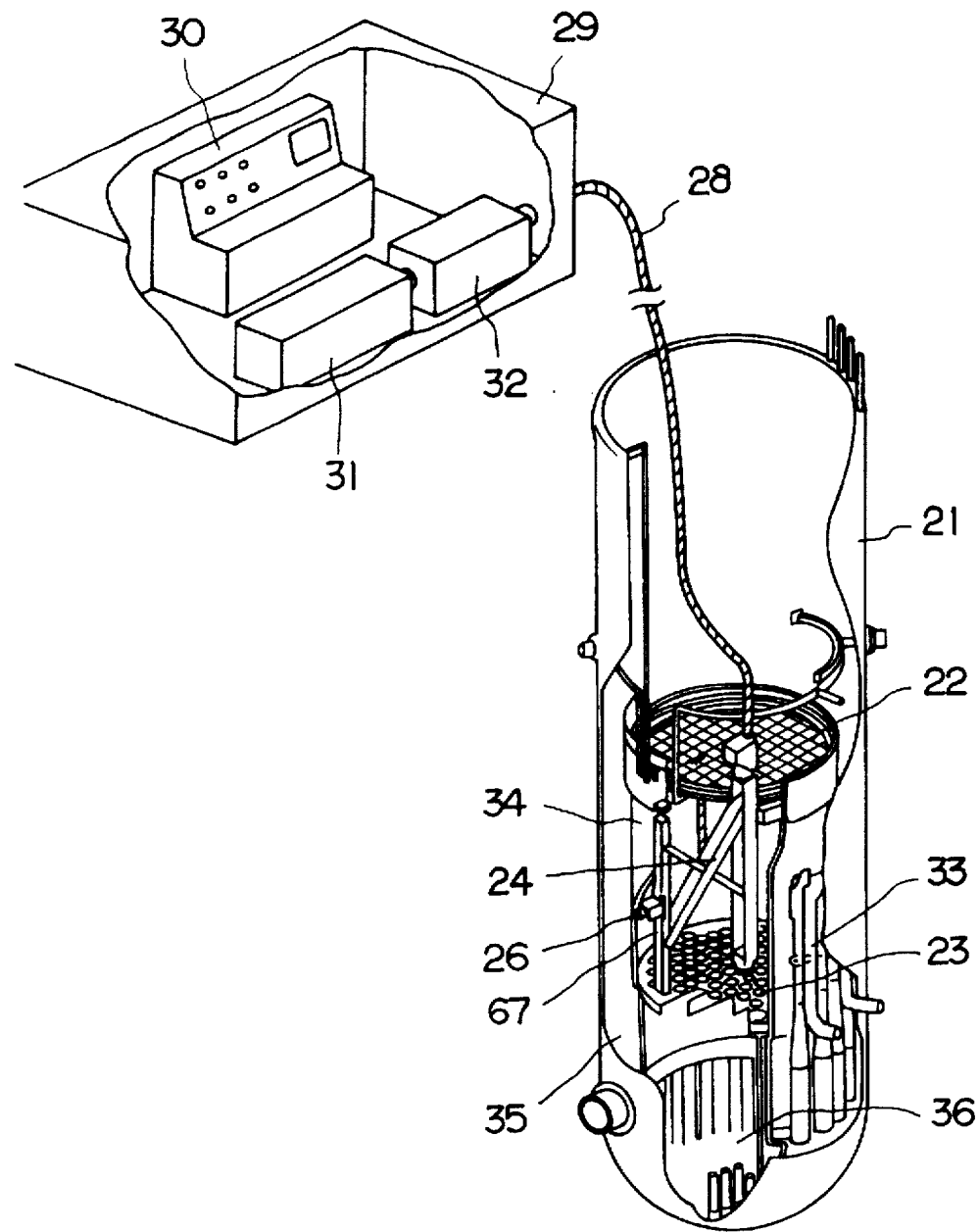
FIG. 12 is a view showing an apparatus for carrying out an embodiment 6.

FIG. 12 schematically shows an arrangement of the embodiment 6 and how operation is carried out.

That is, as shown in FIG. 12, a foldable type arm 24 is installed between the top guide 22 and the core plate 23 which are installed to the core portion of the reactor pressure vessel 21. A laser peening operation unit 26 as a processing head is mounted to a repairing operation unit mounting table 70 at the extreme end of the arm 24.

A composite cable 28, made by bundling a power cable for driving and controlling the foldable type arm 24 and the laser peening operation unit 26, a signal cable and a laser beam transmitting optical fiber, is guided from a control room 29 to the upper end of the foldable type arm 24 and a part of the composite cable 28 is extended up to the laser peening working unit 26 and coupled therewith.

An operator's console 30, a pulse laser device 31 for generating laser beam and a beam strength adjusting device 32 are installed in the control room 29. The operator's console 30 controls the pulse laser device 31, the laser peening operation unit 26 and the foldable type arm 24.

In FIG. 12, numeral 33 denotes a jet pump, numeral 34 denotes the core shroud, numeral 35 denotes an annular portion and numeral 36 denotes a reactor vessel lower chamber.

Figure 13:
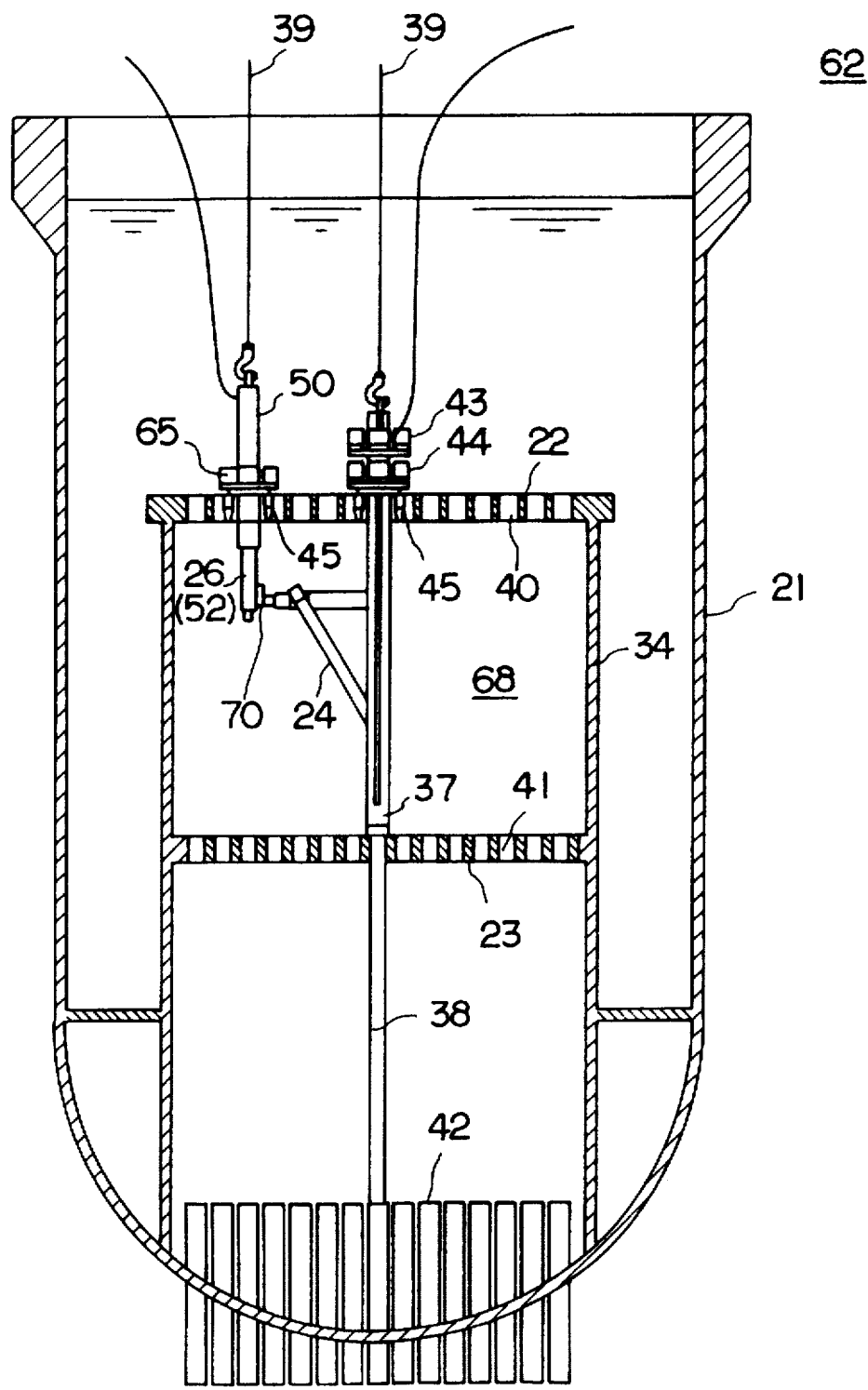
FIG. 13 is a view showing a state that jigs and tools are mounted to a shroud inner surface repairing robot in the embodiment 6.
Figure 14:
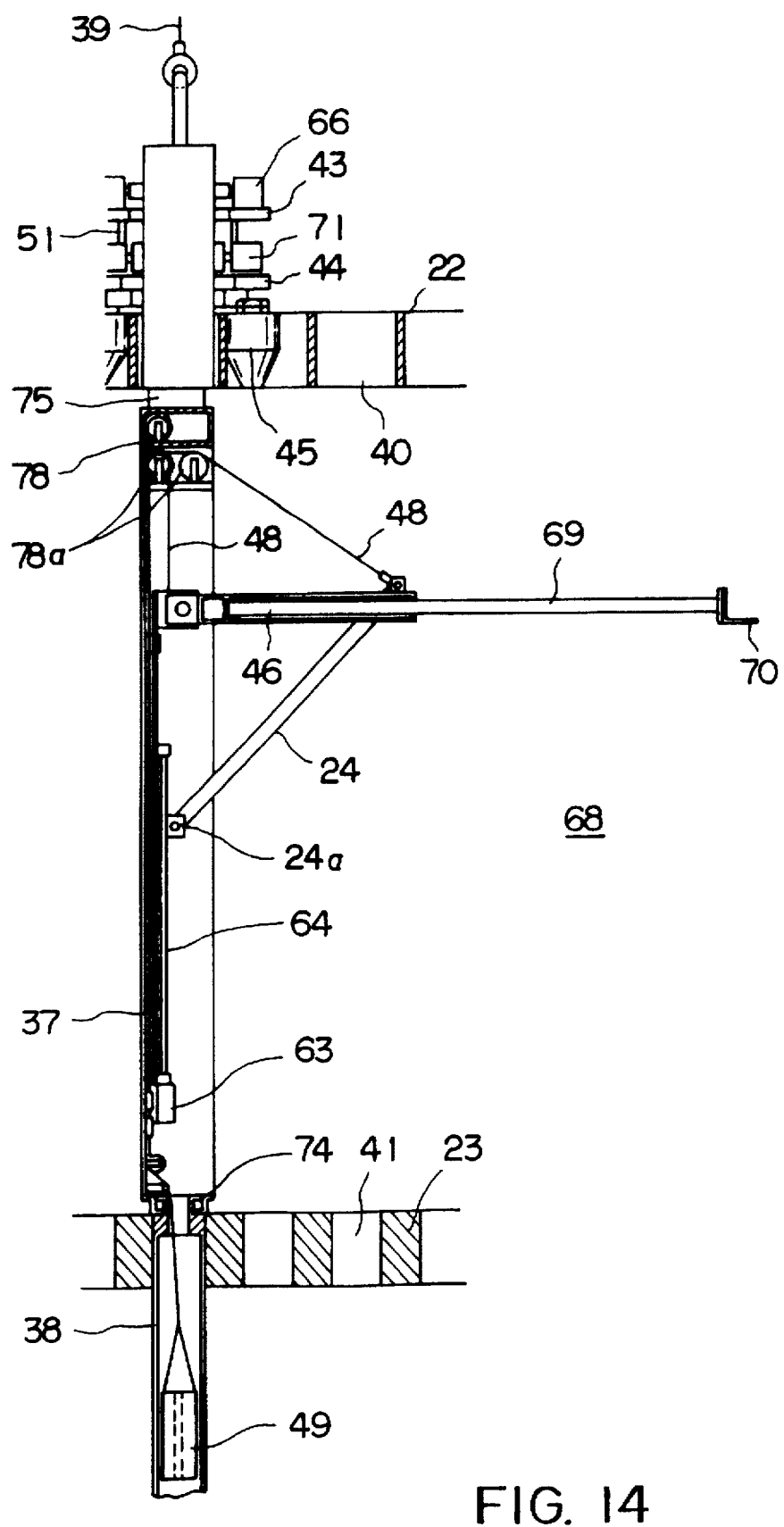
FIG. 14 is a view showing the shroud inner surface repairing robot according to the embodiment 6.

FIG. 13 and FIG. 14 show an arrangement and installed state of the foldable type arm 24, an arrangement for attaching accompanying jigs and tools, and the like. The foldable type arm 24 is accommodated in an upper case 37 and lower case 38 which are long in a vertical direction and arranged integrally so that it can be unfolded therein and both the cases 37, 38 are suspended from a ceiling crane (not shown) through a wire 39 in the accommodated state. The upper case 37 and the lower case 38 pass through the opening 40 of the top guide 22 and the opening 41 of the core plate 23 and installed in a control rod drive unit housing 42 and thereafter the foldable type arm 24 is unfolded. An upper case guide unit 43 and a lower case guide unit 44 are mounted on the upper case 37. The lower case guiding unit 44 is fixed to the top guide 22 by a fixing leg 45. The folding type arm 24 expands and contracts a rod 69 by an air cylinder 46. Further, the foldable type arm 24 is coupled with a balancer 49 by a wire 48 through a pulley 78a. Further, numeral 51 in the drawing denotes a coupling rod 66, numerals 66, 71 denote air cylinders and numeral 75 denotes a bearing.

The repairing operation unit mounting table 70 is attached to the extreme end of the foldable type arm 24. Further, a repairing operation unit transfer device 50 is suspended from a ceiling crane (not shown) by the wire 39 and fixed on the upper surface of the top guide 22 by a fixing leg 45a. A repairing operation unit 52 is mounted to the repairing operation unit transfer device 50 and delivered to the repairing operation unit mounting table 25 at the extreme end of the foldable type arm 24.

Figure 15:
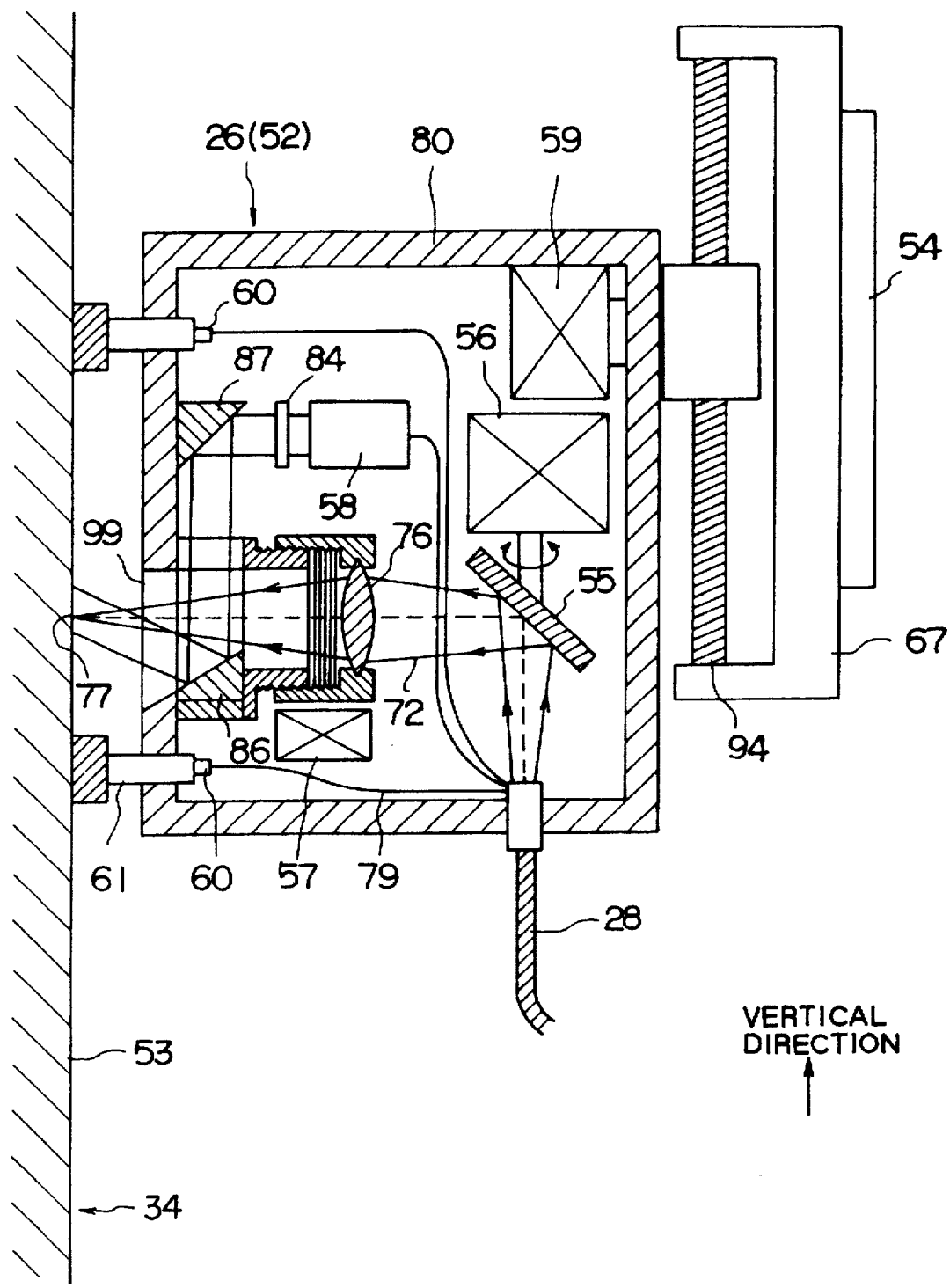
FIG. 15 is a view showing an arrangement of a laser peening operation unit according to the embodiment 6.

FIG. 15 shows the laser peening operation unit 26 which is in the state of repairing a wall 53 of the core shroud 34. The laser peening operation unit 26 is mounted by being engaged with the repairing operation unit mounting table 70 at the extreme end of the foldable type arm 24 by a mounting unit 54.

The laser peening operation unit 26 has the composite cable 28 guided thereto as well as a swing unit 56 for swinging a galvano-mirror 55, a spot diameter adjusting mechanism 57 for adjusting an irradiated laser spot diameter, a CCD camera 58 for monitoring a laser irradiated surface, a motor 59 for driving the laser peening operation unit 26 in a longitudinal direction and an ultrasonic sensor 60 each disposed therein. A shutter 84 is attached in front of the CCD camera 58.

Further, the laser peening operation unit 26 has a leg 61 attached thereto projecting toward the wall 53 and the extreme end of the leg 61 comes into contact with the wall 53. The ultrasonic sensor 60 is mounted in the leg 61. In the drawing, numeral 79 denotes the signal cable.

When pocessings such as inspection, repair and the like of a light water cooling reactor are to be carried out by the underwater laser processing apparatus of the embodiment 6 arranged as described above, a lid of the reactor pressure vessel 21 is first removed, a remote incore operation device handling unit (not shown) is installed on the floor of a reactor pit 62, and the upper case 37 accommodating the foldable type arm 24 therein and the lower case 38 connected to the lower end of the upper case are suspended above the reactor pressure vessel 21 by an inspection and repair unit suspending crane.

Then, the upper case 37 and the lower case 38 are caused to sequentially pass through the opening 40 of the top guide 22 and the opening 41 of the upper top guide 22 and installed by engaging the lower end of the lower case 38 with the control rod drive unit housing 42.

In order for the upper case 37 and the lower case 38 to easily pass through the opening 40 of the top guide 22, the upper case guide unit 43 and the lower case guide unit 44 are mounted so that they can move in the axial direction (upward/downward direction) of the upper case 37 and the lower case 38. When the upper case 37 and the lower case 38 pass through the opening 40 of the top guide 22, the rotational positions thereof are aligned on a plane. The upper case 37 and the lower case 38 are continuously suspended downward and the installation thereof is finished by fixing the lower case guide unit 44 to the top guide 22 by the fixing leg 45 and engaging the lower end of the lower case 38 with the control rod drive unit housing 42.

The foldable type arm 24 is unfolded from the upper case 37 in a lateral direction in a top guide lower chamber 68 and the air cylinder 46 in the upper case 24 to which the foldable type arm 24 is connected is driven by a motor 63 and a combination gear 64 disposed in the upper case 37. As a result, the rod 69 is lifted near to the top guide 22 and the air cylinder 46 is driven while rotating the upper case 37 about a vertical axis to thereby advance and retract the rod 69 to and from the core shroud 34 in the diametrical direction (lateral direction) thereof, so that the repairing operation unit mounting table 70 mounted at the extreme end of the rod 69 is moved downwardly of the predetermined opening 40 of the top guide 22.

The repairing operation unit 52 is suspended to the reactor pressure vessel 21 by an inspection and repair unit suspending crane (not shown) and installed to the predetermined opening 40 of the upper top guide 22 in a state that the repairing operation unit 52 is accommodated in the repair unit transfer device 50 to which an installation guide unit 65 is attached. Then, the repairing operation unit 52 is fixed to the top guide 22 by the fixing leg 45a attached to the installation and guide unit 65 in a downward direction.

The repairing operation unit 52 is pushed out below the repairing operation unit transfer device 50 and a connecting member 67 of the repairing operation unit 52 is coupled with the repairing operation unit mounting table 70 at the extreme end of the rod 69 of the folding type arm 24.

On the completion of the coupling, the repairing operation unit 52 held by the repairing operation unit transfer device 50 is released therefrom. When the repairing operation unit 52 is released, the foldable type arm 24 is three-dimensionally moved in the top guide lower chamber 68 and the repairing operation unit 52 is moved to a predetermined position of the core shroud 34 to thereby carry out a capturing operation.

An inspecting and examining operation unit, arc welding operation unit, EDM operation unit, grinder operation unit, laser cutting operation unit, laser welding operation unit, laser peening operation unit and the like are used as the repairing operation unit 52.

In the embodiment 6, the surface of a welded portion of the core shroud 34 is improved from a tensile stress state to as compressive stress state using the laser peening operation unit 26 or the like as the repairing operation unit 52.

A surface improving method using the laser spot swinging type laser peening operation unit 26 according to the embodiment 6 will be described below.

The engaging structural portion of the repairing operation unit mounting table 70 at the extreme end of the rod 69 of the foldable type arm 24 is coupled with the connecting member 67 as the engaging structural portion of the mounting unit 54 of the laser spot swinging type laser peening operation unit 26.

The rod 69 is extended to move the laser spot swinging type laser peening operation unit 26 to a position where tensile stress is generated on the surface of the walls 53 of the core shroud 34 by a welded line or the like of the core shroud 34 and the extending motion is stopped in a state that the leg 61 is in contact with the surface of the wall 53 of the core shroud 34 under pressure. With this operation, the laser spot swinging type laser peening operation unit 26 is installed.

Next, there will be described a case that the surface of a longitudinal welded line portion of the core shroud 34 is improved with reference to FIG. 15.

When the swing unit 56 is driven, the galvano-mirror 55 is swung so that the spot point 73 of the laser beam 72 scanned through an opening 99 of a case 80 in a certain width in a vertical direction on the paper plane of FIG. 15 (hereinafter, this is called sweep in a width direction).

The foldable type arm 24 is rotated by the motor 63 and the combination gear 64 mounted in the upper case 37 so that the welded portion is located within the scanning area.

Copper vapor laser with the number of times of repetition of 5 KHz is used as the laser beam 72. When an optical fiber having a diameter of about 0.3 $\phi$mm, the laser beam 72 can be converged to a spot diameter of about 0.3 $\phi$mm by the use of a converging combination lens 76. Since the copper vapor laser has a pulse width of about 40 nsec., a period of time during which it is irradiated is negligible as compared with the irradiating intervals 200 μsec. of the laser beam 72.

When sweeping operation is carried out in a width direction without overlapping laser beam spots, a sweeping speed must be set to 1.5 m/s in the width direction.

The swing unit 46 is controlled to set the sweeping speed to about 1.5 m/s in the width direction or to move the laser beam 72 through distance 0.3 mm at a speed of 1.5 m/s each 200 n(μsec.) so that the laser beam 72 is irradiated to the same point a plurality of times as the number of irradiation n.

When scanning is carried out in an upward/downward direction (longitudinal sweep) in FIG. 15 without overlapping laser beam spots, the sweep is carried out through distance of 0.3 mm in a longitudinal direction at a sweeping speed of about 1.5 m/s each time obtained by multiplying the number of times of irradiation N in the width-directional sweep by 200 μsec.

When the laser beam 72 is swept through distance of 0.3 mm in the longitudinal direction at a speed of about 1.5 m/s using a circular laser beam spot, a large non-uniform portion is made in the longitudinal direction each number of times of irradiation of the laser beam 72. To prevent the occurrence of the non-uniform portion, the sweeping speed is set to 1.5 m/s or less and laser beam spots 77 are partially overlapped in the longitudinal direction.

It is ideal to dispose an optical system for shaping the beam cross sectional shape of the laser beam 72 to rectangle at the outlet of the optical fiber to form laser beam spots each having with sides of 0.3 mm so that the laser beam 72 can be irradiated a plurality of times within an area of certain width and length.

Surface improving repair (repair for changing a tensile stress state to a compressive stress state) can be carried out in water by the use of an irradiating device of the laser beam 72 as described above together with copper vapor laser having an output of about 500 W which is available at present.

On the completion of the surface improving operation in the certain area, the rod 69 is somewhat retracted by the action of the air cylinder 46 and the wire 48 is operated by driving a drive unit 78 to thereby move the arm rod 69 in an upward/downward direction along the welded line so that the laser spot swinging type laser peening operation unit 26 is installed at a position where it can continuously carry out the surface improving operation in the area where the surface improving operation is finished.

During the movement, a cabinet 80 of the laser peening operation unit 26 is moved to an end of the operation unit connecting member 67 by driving a longitudinal direction drive motor 59.

Thereafter, the above operation is repeated to improve the surface of the longitudinal welded line portion of the core shroud 34. On the completion of the operation, the foldable type arm 24 is rotated about a horizontal fulcrum 24a through the motor 63 and the combination gear 64 mounted in the upper case 37 to thereby move the laser spot swing type laser peening operation unit 26 to a longitudinal welded line portion to which surface improvement is carried out next.

At the time, the rod 69 is moved upward and downward by operating the wire 48 by driving the drive unit 78 mounted in the upper case 37. When the laser peening operation unit 26 is set to the longitudinal welded line portion where operation is to be carried out, an operation for improving the surface of the welded portion is carried out likewise the above.

The irradiation of the laser beam 72 is controlled in association with the control of the opening/closing of a shutter 84 to open the shutter 84 just after the completion of irradiation of a pulse-shaped laser beam and a state of a surface improving operation is monitored by photographing an image of the vicinity of the spot point 73 by the CCD camera 58 through a first reflecting mirror 86 and a second reflecting mirror 87 in this order.

When the laser beam 72 is irradiated, since ultrasonic wave generated at the spot point 73 is transmitted to the leg 61 through the core shroud 34, the ultrasonic sensor 60 measures the ultrasonic wave. When an amount of the ultrasonic wave is outside of a predetermined area, it is determined whether a spot diameter must be adjusted or not also with reference to a result of observation by the CCD camera 58.

Next, there will be described a case of the surface improvement of a welded line in a peripheral direction of the core shroud 34. In this case, the laser peening operation unit 26 is engaged with the repair operation unit mounting table 70 in a direction perpendicular to the paper plane of FIG. 15 with the longitudinal direction of the mounting unit 54 set perpendicular to the paper plane of FIG. 15.

When the swing unit 56 is driven in this state, the galvano-mirror 55 is swung so that the spot point 73 of the pulse-shaped laser beam 72 is scanned in a certain width in a direction perpendicular to the paper plane of FIG. 15 (swept in a width direction). The drive unit 78 mounted in the upper case 37 is driven to cause the welded portion to be located within the scanning area and the rod 69 is set by being moved upward and downward by the operation of the wire 48.

Likewise the surface improvement of the longitudinal welded line portion, on the completion of the surface processing within a certain area, the foldable type arm 24 is rotated and moved through the motor 63 and the combination gear 64 mounted in the upper case 37 so that the laser spot swinging type laser peening operation unit 26 is installed at a position where it can continuously carry out a surface improving operation in the area where the surface improving operation is finished.

The longitudinal direction drive motor 59 is driven during the movement to thereby move the cabinet 80 to an end of the operation unit connecting member 67 along a threaded screw 94. Thereafter, the above operation is repeated to carry out the surface improvement of the peripheral welded line portion of the core shroud 34.

On the completion of the operation, the rod 69 is moved upward and downward by operating the wire 48 by driving the drive unit 78 mounted in the upper case 37 to thereby move the laser spot swing type laser peening operation unit 26 to a peripheral welded line portion to which surface improvement is carried out next. When the laser peening operation unit 26 is installed to the lateral welded line portion to which operation is to be carried out, the surface improvement operation of the welded portion is carried out likewise the above.

According to the embodiment 6, the following effects will be achieved.

That is, since surface improving processing including a repairing or maintaining process for changing a tensile stress state to a compressive stress state can be carried out in water using copper vapor laser of about 500 W which is available at present as visible light laser, the processing for changing a tensile stress state of a welded line and a surface of the core shroud 34 to a compressive stress state can be carried out in water, and since water acts as a shield member, an amount of exposure of workers to radioactivity can be reduced.

Since the occurrence of a reaction force can be ignored in a surface improving operation by the use of a laser beam, different from water-jet peening, the remote handling device can be arranged simply.

Further, no dust to be collected is generated, different from shot-blast peening. Since ultrasonic noise is generated in laser-shot peening, a working state can be monitored and a result of operation can be evaluated at the same time as a surface improving operation. Therefore, an instrument for measurement and evaluation need not be separately prepared, by which an operation efficiency can be improved.

Next, a first modification of the embodiment 6 will be described with reference to FIG. 16.

This modification has a nozzle 101 for forming a water flow 100 in parallel with a direction toward which the pulse laser beam 72 is irradiated from the aforesaid laser spot swing type laser peening operation unit 26, the nozzle 101 being mounted to an irradiation opening 99 from which the pulse laser beam 72 is irradiated, so that a surface of the shroud is processed by irradiating the laser beam through a water flow 100.

Figure 16:
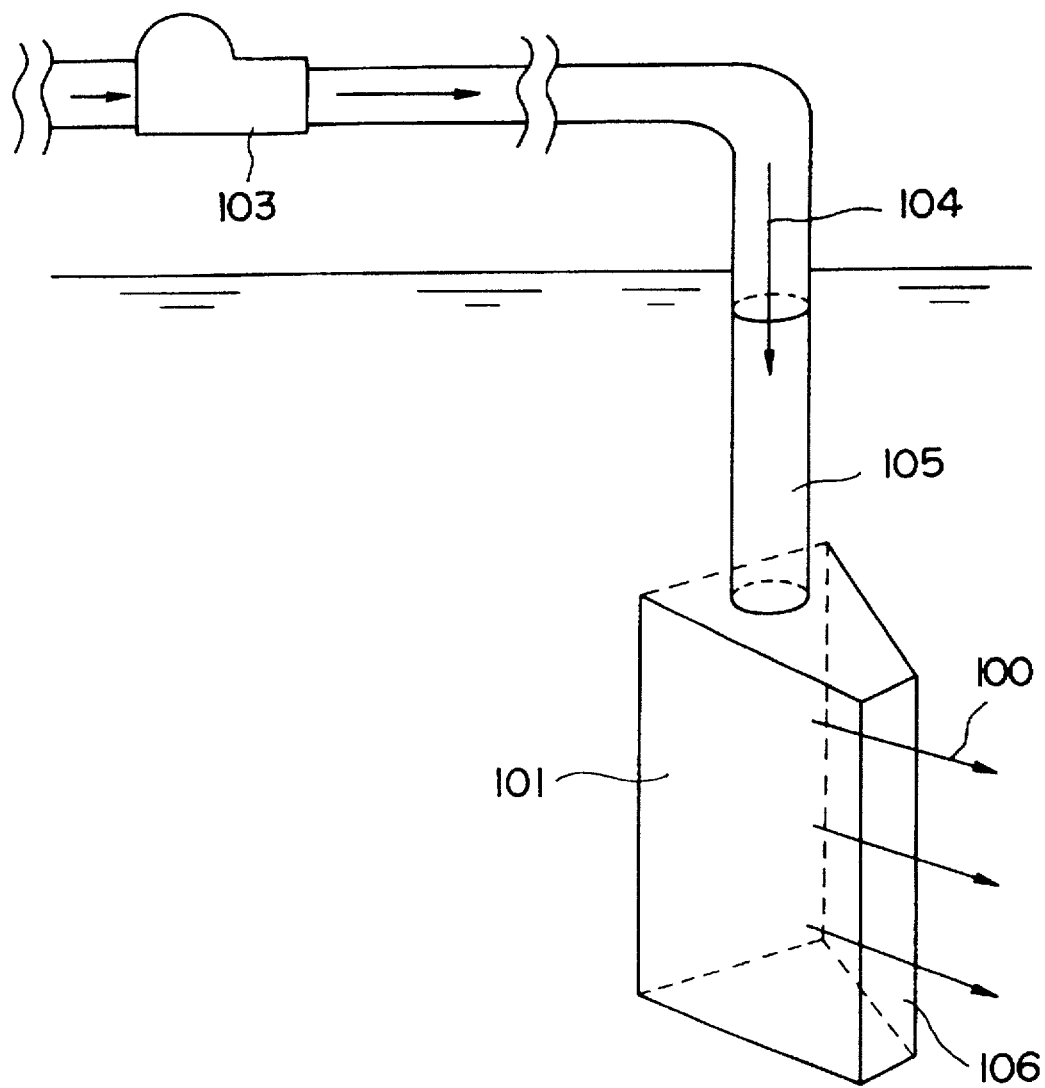
FIG. 16 is a view showing a first modification of the embodiment 6.

FIG. 16 is a view showing a structure of the nozzle 101 for forming the water flow 100 in parallel with the direction toward which the pulse laser beam 72 is irradiated and a concept of a water flow system.

The nozzle 101 is mounted to the irradiation opening 99 with the longitudinal direction of the structure of the nozzle 101 being perpendicular to the paper plane of FIG. 15. The nozzle 101 is coupled with a pump 103 installed in the control room 29 or the like through a hose 105 and a water flow 104 is generated therein.

The hose 105 may be contained in the composite cable 28. When the hose 105 is attached to the nozzle 101, the extreme end of the hose 105 is inserted up to the inside of the nozzle 101 so that the opening thereof is directed in the direction of the conversing combination lens 76. A method of mounting the hose 105 at a position nearest to the front surface of the conversing combination lens 76 may be also employed.

Operation of the first modification is essentially similar to that of the embodiment 6 except the following point.

That is, water pressurized by the pump 103 installed in the control room 29 flows as the water flow 104 in the hose 105, flows into the nozzle 101 and changes its direction passing along the front surface of the conversing combination lens 76. Then, the water flows out from the rectangular opening 106 of the nozzle 101 by being regulated therethrough and blown against the core shroud 34 (wall 53) as the water flow 100. The laser beam 72 is irradiated to the core shroud 34 while being converged and swung in the water flow 100. Thereafter, the laser beam 72 carries out a sweeping operation similar to that of the embodiment 6 to thereby improve a surface of a welded portion.

The first modification arranged as described above further achieves the following effects in addition to those achieved by the embodiment 6. That is, since this embodiment removes bubbles and fine metal particles, which are generated or removed when the laser beam 72 is irradiated to the surface of the core shroud 34 (wall 53), from the light path of the laser beam 72 through the water flow 100, it can be prevented that the laser beam 72 absorbs them or is scattered by them so that an amount of lights arriving at the surface of the core shroud 34 (wall 53) is reduced or varied. As a result, the surface improving processing can be stably carried out as well as a necessary capacity of laser equipment can be reduced.

Further, the conversing lens 76 can be prevented from being thermally deformed by the laser beam 72 by being blown with the fresh water flow, by which the surface improving operation can be carried out for a long time.

Next, a second modification of the embodiment 6 will be described with reference to FIG. 17. This modification is arranged such that the nozzle 101 for forming the water flow 100 in parallel with a direction toward which the laser beam 72 of the embodiment 6 is irradiated has another nozzle 111 attached thereto, the nozzle 111 forming a water flow 112 perpendicular to the irradiating direction of the laser beam 72 and a surface in the shroud is processed using these water flows 100 and 112.

Figure 17:
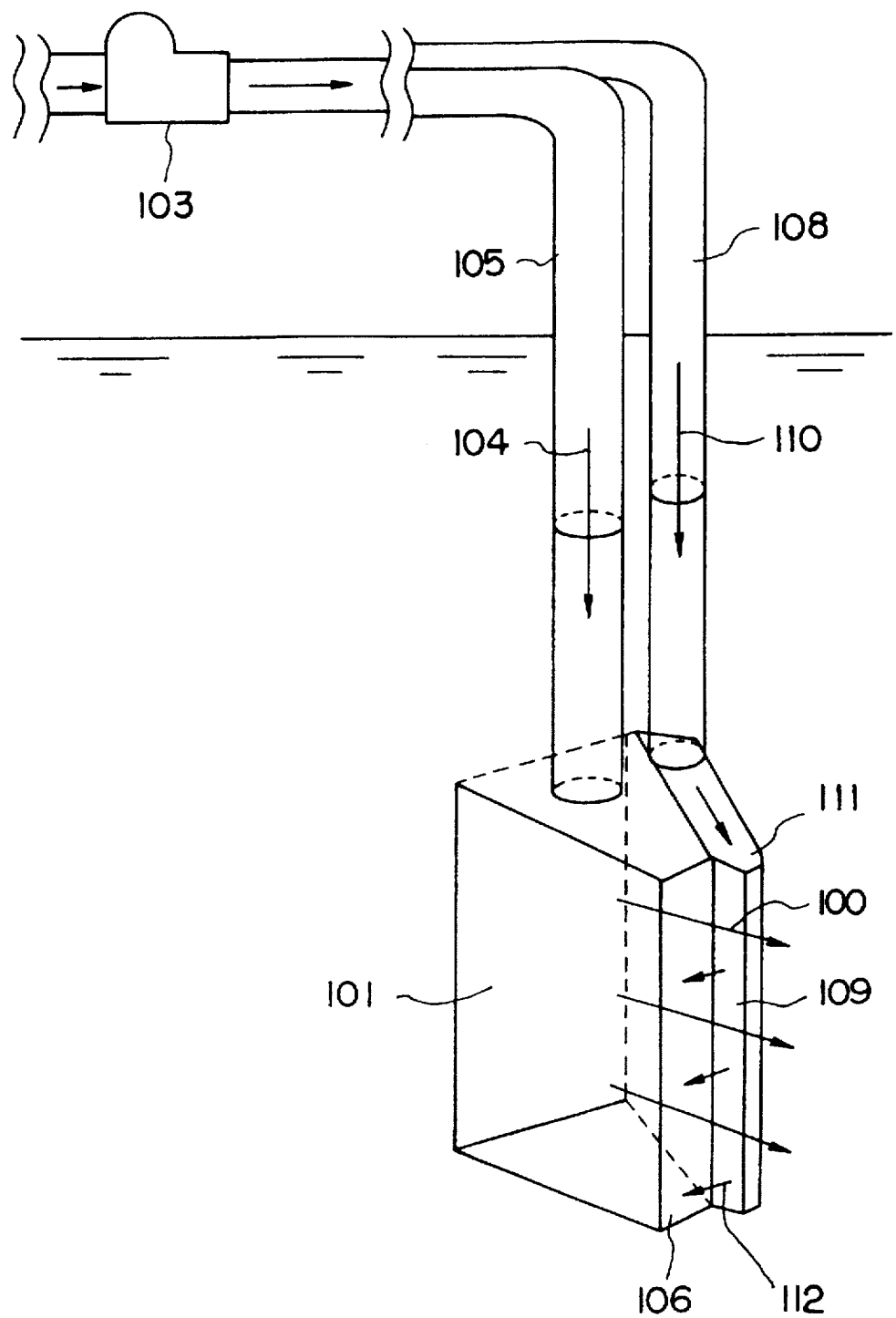
FIG. 17 is a view showing a second modification of the embodiment 6.

FIG. 17 is a view showing a concept of a water flow system and the another nozzle 111 for forming the water flow 112 perpendicular to the irradiating direction of the laser beam 72 with respect to the nozzle 101 for forming the water flow 100 in parallel with the irradiating direction of the laser beam 72.

The nozzle 101 is attached to the irradiation opening 99 with its longitudinal direction facing perpendicular to the paper plane of FIG. 15. The pump 103 installed in the control room 29 or the like is coupled with the nozzle 101 through the hose 105 and the water flow 104 is made therethrough. The openings 106, 109 of the respective nozzles 101, 111 are opened so that they intersect each other perpendicularly. Each of the hose 105 and a hose 108 may be contained in the composite cable 28. When the hose 105 is attached to the nozzle 101, the extreme end of the hose 105 is inserted up to the inside of the nozzle 101 so that the opening thereof is directed in the direction of the conversing combination lens 76. There is also a method of mounting the hose 105 at a position nearest to the front surface of the conversing combination lens 76.

Operation of the second modification arranged as described above is essentially similar to that of the embodiment 6 except the following point.

That is, water compressed by the pump 103 installed in the control room 29 or the like is branched to flow through the hose 108 as the water flow 110 and flows into the nozzle 111. The water flow 110 is regulated by the rectangular opening 109 of the nozzle 111 and flows out as the water flow 110 perpendicular to the water flow 100 flowing out from the opening 106 of the another nozzle 101.

One of the water flows 112 has a flow rate set to a degree to cause the core of the jet stream of the other water flow 100 to reach the surface of the core shroud 34 to which the laser beam 72 is irradiated. The laser beam 72 is irradiated to the core shroud 34 while being converged and swung in the water flow 100. Thereafter, the laser beam 72 carries out a sweep operation similar to that of the embodiment 6 to thereby improve a surface of a welded portion.

The second modification arranged as described above can achieve the following advantage in addition to that achieved by the embodiment 6. That is, since this embodiment more securely removes bubbles and fine metal particles, which are generated or removed when the laser beam 72 is irradiated to the surface of the core shroud 34 (wall 53), from the light path of the laser beam 72 through the water flow 112, it can be prevented that the laser beam 72 absorbs them or is scattered by them so that an amount of lights arriving at the surface of the core shroud 34 (wall 53) is reduced or varied. As a result, the surface improving operation can be stably carried out as well as a necessary capacity of laser equipment can be reduced more securely.

Next, a third modification of the embodiment 6 will be described with reference to FIG. 18. This modification has an arrangement such that the nozzle 101 shown in the modification 2 for forming the water flow 100 in parallel with a direction toward which the laser beam 72 is irradiated has another nozzle 114 which is attached thereto and forms a water flow 120 perpendicular to the irradiating direction of the laser beam 72 to thereby form a suction water flow system.

Figure 18:
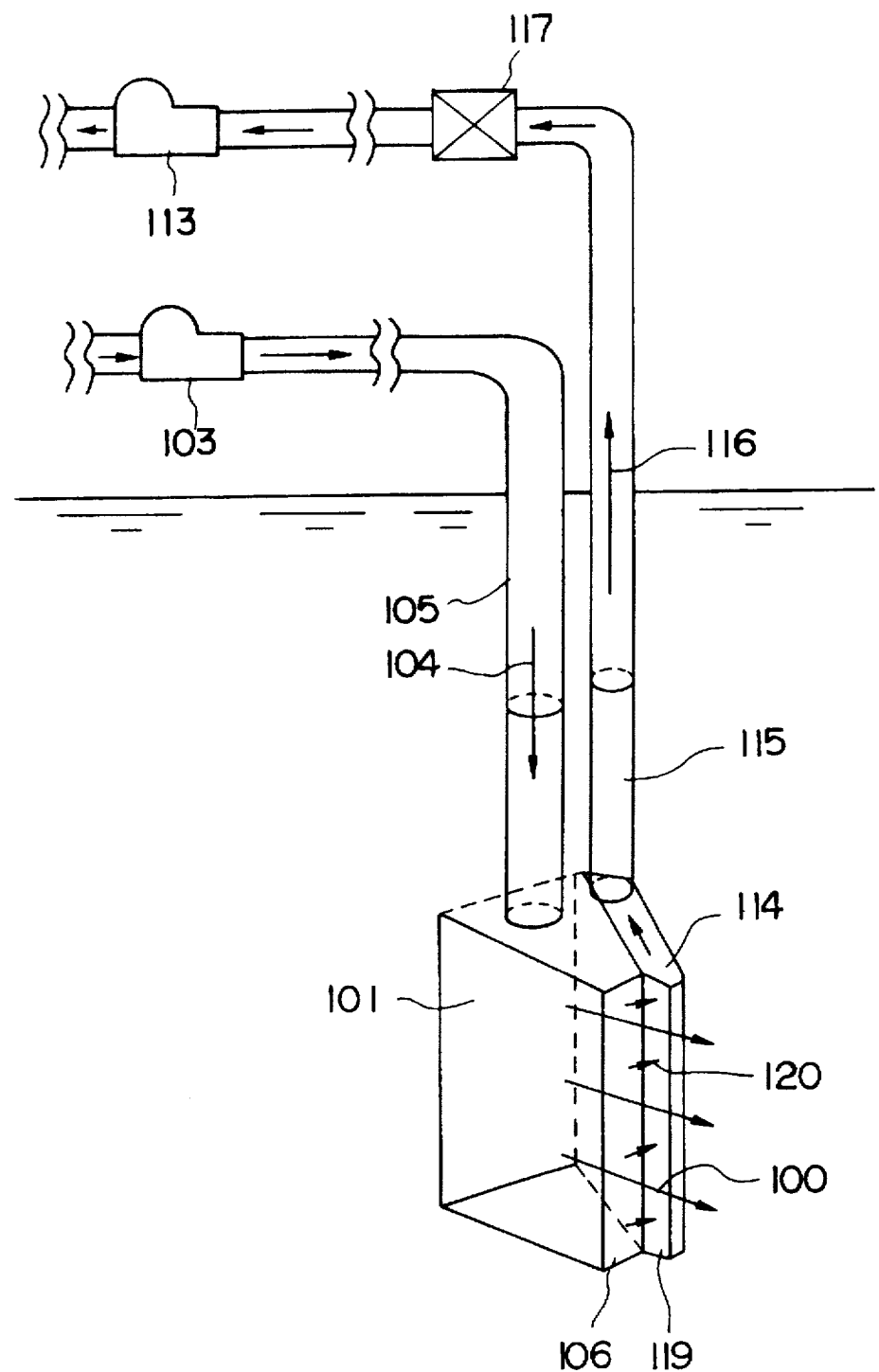
FIG. 18 is a view showing a third modification of the embodiment 6.

FIG. 18 is a view showing a concept of a water flow system and the nozzle 114 attached to the nozzle 101 which forms the water flow 100 in parallel with the irradiating direction of the laser beam 72, the nozzle 114 forming the water flow 120 perpendicular to the irradiating direction of the laser beam 72.

The nozzle 101 is attached to the irradiation opening 99 with its longitudinal direction facing perpendicular to the paper plane of FIG. 15. The pump 103 installed in the control room 29 or the like is coupled with the nozzle 101 through the hose 105 and the water flow 104 is made therethrough. A suction unit 113 installed in the control room 29 or the like is coupled with the nozzle 114 through a hose 115 a water flow 116 is made therethrough. A filter unit 117 is attached to the hose 115. The filter unit 117 may be attached to a piping portion coming from the suction unit 113.

The respective nozzles 101, 114 have openings 106, 119 opened in a vertical direction, respectively. The respective hoses 105, 108 may be contained in the composite cable 28. When the hose 105 is attached to the nozzle 101, the extreme end of the hose 105 is inserted up to the inside of the nozzle 101 so that the opening thereof faces to the direction of the conversing combination lens 76. The hose 105 may be mounted to a position nearest to the front surface of the conversing combination lens 76.

Operation of the third modification arranged as described above is essentially similar to that of the second modification except the following point.

That is, the suction water flow 116 is generated from the rectangular opening 119 of the nozzle 114 through the hose 115 coupled with the suction unit 113 installed in the control room 29 so that the water flow 120 is generated perpendicular to the water flow 100 flowing out from the opening 106 of the nozzle 101. Fine particles in the water flow 116 are removed by the filter unit 117 installed at some point midway through the hose 115. The laser beam 72 is irradiated to the core shroud 34 while being converged and swung in the water flow 100. Thereafter, the laser beam 72 carries out a sweep operation similar to that of the embodiment 6 to thereby improve a surface of a welded portion.

The second modification can achieve the following advantage in addition to an advantage similar to that of the first modification. That is, since the modification removes bubbles and fine metal particles, which are generated or removed when the laser beam 72 is irradiated to the surface of the core shroud 34 (wall 53), from the light path of the laser beam 72 through the water flow 100, it can be prevented that the laser beam 72 absorbs them or is scattered by them so that an amount of lights arriving at the surface of the core shroud 34 (wall 53) is reduced or varied. As a result, the surface improving operation can be stably carried out as well as a necessary capacity of laser equipment can be reduced more securely. Further, the contamination of a reactor inner structure can be also prevented by collecting the removed fine metal particles so as not to be diffused in the pressure vessel of the reactor.

Next, a fourth modification of the embodiment 6 will be described with reference to FIG. 19. This modification has an arrangement such that a light distributor 121 is disposed at the irradiating port of the beam strength adjusting device 32 shown in the embodiment 6 to divide the laser beam 72 into a plurality of laser beams 122. Then, the respective laser beams 122 are guided to optical fibers 123 and a plurality of the optical fibers 123 are bundled to form an optical fiber bundle 124 which is connected to the laser beam peening operation unit 26.

In the laser beam peening operation unit 26, the optical fibers 123 are connected to a converging box 125 by being disposed in a train, the laser beams 122 are converged to the wall 53 by a lens system at the outlet of the optical fibers 123 to thereby form a train of spots. The laser beam is irradiated by being multiplexed in a certain area by sweeping the converging box 125 in X-axis and Y-axis directions.

Figure 19:
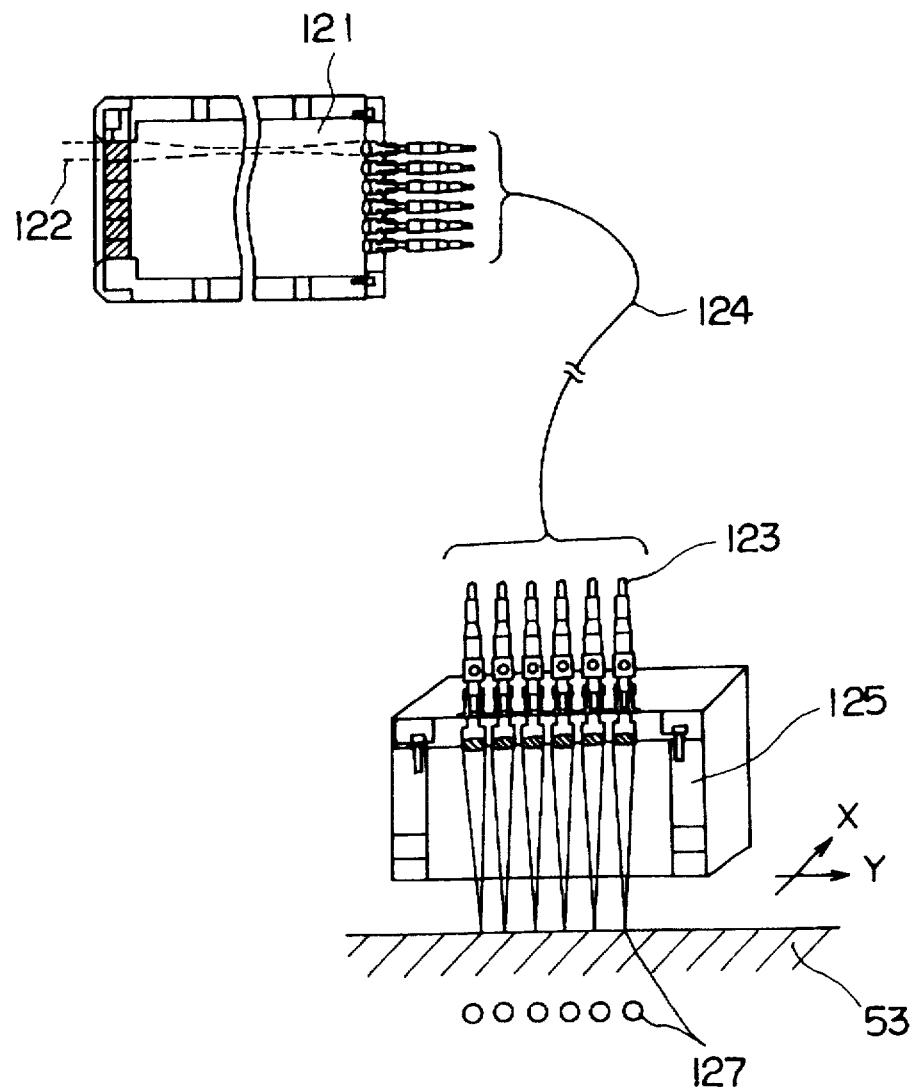
FIG. 19 is a view showing a fourth modification of the embodiment 6.

FIG. 19 shows a conceptual view of a system of the modification. The light distributor 121 is disposed at the irradiating port of the beam strength adjusting device 32 to divide the laser beam 72 into a plurality of the laser beams 122. Then, the respective laser beams 122 are guided to the optical fibers 123 and a plurality of the optical fibers 123 are bundled to form the optical fiber bundle 124 which is connected to the converging box 125 of the laser beam peening operation unit 26, so that the shroud inner surface is repaired in water by forming the train of the spots by converging the laser beams 122 on the wall 53.

The laser beam 72 output from the beam strength adjusting device 32 is divided by the light dividing optical system into a plurality of the laser beams 122 which are incident on the optical fibers 123 through the optical system, respectively.

The optical fibers 123 are arranged as the optical fiber bundle 124 and move to the position of the converging box 125 of the laser peening operation unit 26. The optical fibers 123 are connected to the light conversing box 125 disposed thereon as a train, a converging optical system is disposed at the outlet of each of the optical fibers 123, and the laser beams 122 are converged on the wall 53 to form a train of laser spots 127.

The converging box 125 is swept in a longitudinal direction in the embodiment making use of a threaded screw, a motor and the like with the train direction of the laser spots 123 set to a welded line direction and an amount of movement in the longitudinal direction in the embodiment set as intervals between the laser spots 127. Sweep in a width direction in this case is not carried out by swing but carried out as sweep of the converging box 125 in the width direction which makes use of the threaded screw, the motor and the like.

Operation of the fourth modification arranged as described above is essentially similar to that of the embodiment 6 except the following point.

That is, the operation of the fourth modification is different from that of the embodiment 6 in that since the train of the laser spots 127 is formed in the direction of the welded line (lengthwise direction), a sweep area in the longitudinal direction is distances between the laser spots 127, the sweep of the welded line in the width direction is not carried out by the use of the galvano-mirror but carried out by sweeping the converging box 125 in the width direction making use of the threaded screw, motor and the like. Thereafter, a sweeping operation similar to that of the embodiment 6 is carried out to improve a surface of a welded portion.

The fourth modification arranged as described above can achieve an advantage similar to that of the embodiment 6.

Next, a fifth modification of the embodiment 6 will be described with reference to FIG. 20. This modification has an arrangement such that a converging lens 128 is installed to the converging box 125 shown in the fourth modification of the embodiment 6 and a plurality of the laser beams 122 irradiated through the optical fibers 123 are formed as a laser spot 129 at a point on the surface of the wall 53. A laser beam is irradiated by multiplexing it in a certain area by sweeping the converging box 130 in X- and Y-directions.

Figure 20:
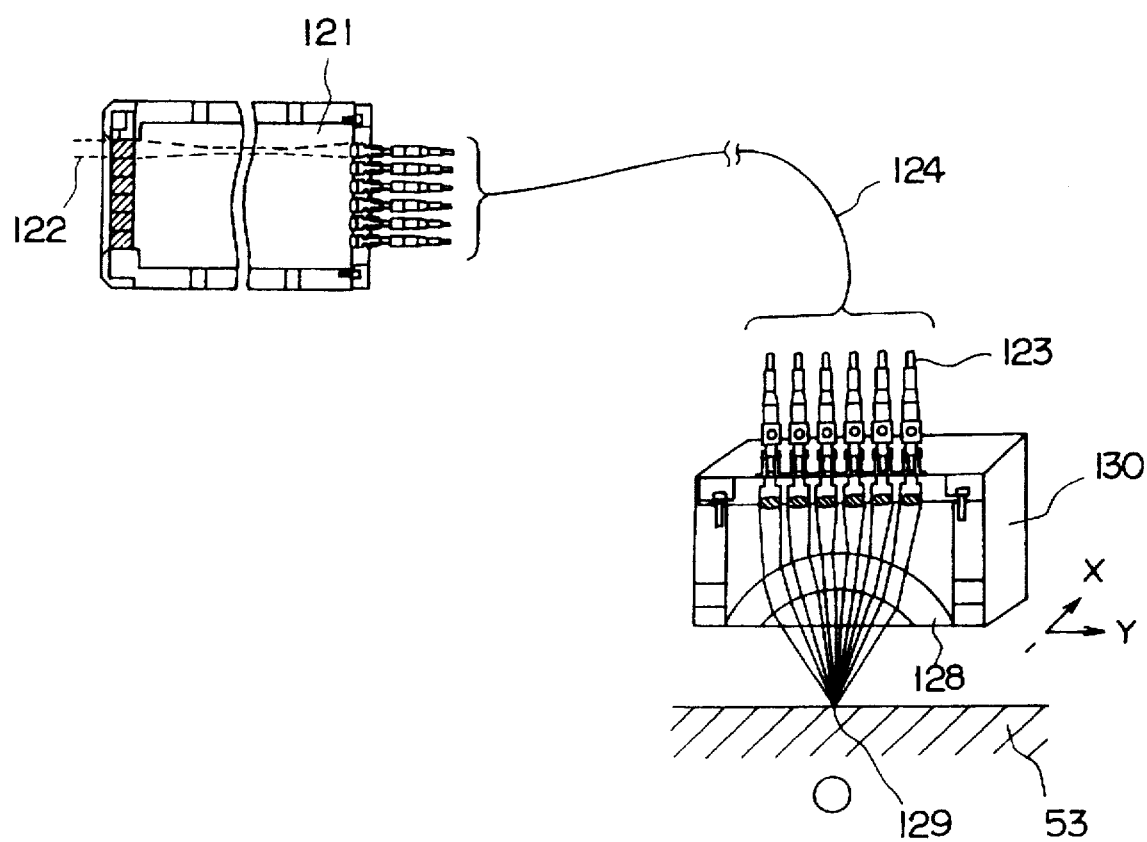
FIG. 20 is a view showing a fifth modification of the embodiment 6.

FIG. 20 is a conceptual view of a system of the modification, wherein the light distributor 121 is disposed at the irradiation port of the beam strength adjusting device 109 and the laser beam 72 is divided into a plurality of the laser beams 122 which are guided to the optical fibers 123.

respectively. In this case, a plurality of the optical fibers 123 are bundled to form the optical fiber bundle 124 which is connected to the converging box 130 of the laser beam peening operation unit 26. A plurality of the laser beams 122 irradiated from the optical fibers 123 are formed as a laser spot 129 at a point on the surface of the wall 53 to thereby repair a core shroud inner surface in water by the laser beam.

The laser beam 72 output from the beam strength adjusting device 32 is divided by a light dividing optical system into a plurality of the laser beams 122 which are input to the optical fibers 123 through an optical system. The optical fibers 123 are bundled as the optical fiber bundle 124 and moved to the position of the converging box 130 of the laser peening operation unit 26. The optical fibers 123 are connected to the conversing box 130 by being disposed as a train, a converging optical system is disposed at the outlet of each of the optical fibers 123, and a plurality of the laser beams 122 irradiated from the optical fibers 123 are converged to a point on the surface of the wall 53 by the converging lens 128 and form a laser spot 129. The laser spot 129 is swept in the direction of a welded line and the converging box 130 is swept in a width direction making use of the threaded screw, motor and the like.

Operation of the sixth modification arranged as described above is essentially similar to that of the embodiment 6 except the following point.

That is, the laser beam is irradiated to the laser spot 129 a plurality of times and the sweeping operation is carried out in the direction of a welded line through distance of a laser spot diameter (0.3 φmm) during pulse intervals. Optical fibers with a different length are prepared to provide a time lag between a plurality of irradiations. Since a laser irradiating time (40 nsec.) can be ignored as compared with a sweeping time in the width direction (200 μsec.), the sweeping operation in the width direction is carried out at a certain speed and a timing of irradiation need not be taken into consideration.

The sweeping operation in the direction of the welded line (longitudinal direction) is carried out at respective intervals of a sweeping time in the width direction of the welded line through distance equal to or less than the laser spot diameter (0.3 φmm) at a speed equal to or less than 1.5 m/sec. These sweeps are carried out by the converging box 130 making use of the threaded screw, motor and the like. Thereafter, a sweeping operation similar to that of the embodiment 6 is carried out to improve a surface of a welded portion.

The modification 6 can achieve an advantage similar to that of the embodiment 6.

Next, a seventh modification of the fourth modification of the embodiment 6 will be described. This modification has an arrangement such that a plurality of the laser beams 122 irradiated from the optical fibers 123 shown in FIG. 6 are formed to laser spots on the surface of the wall 53 by the converging lens 128 so that all the laser spots are formed linearly (in the width direction of the welded line). Different from the embodiment 6, the optical fibers 123 of the modification 7 have the same length. Since the laser beam is irradiated to a point a plurality of times, sweeping operation is carried out in the width direction of the welded line in through distance of the laser spot diameter (0.3 φmm) during pulse intervals. The laser beam is irradiated by being multiplexed in a certain area by carrying out the sweeping operation in the direction of the welded line similarly to the sixth modification.

Operation of the seventh modification as described above is essentially similar to that of the embodiment 6.

The seventh modification can achieve an advantage similar to that of the embodiment 6.

Figure 21:
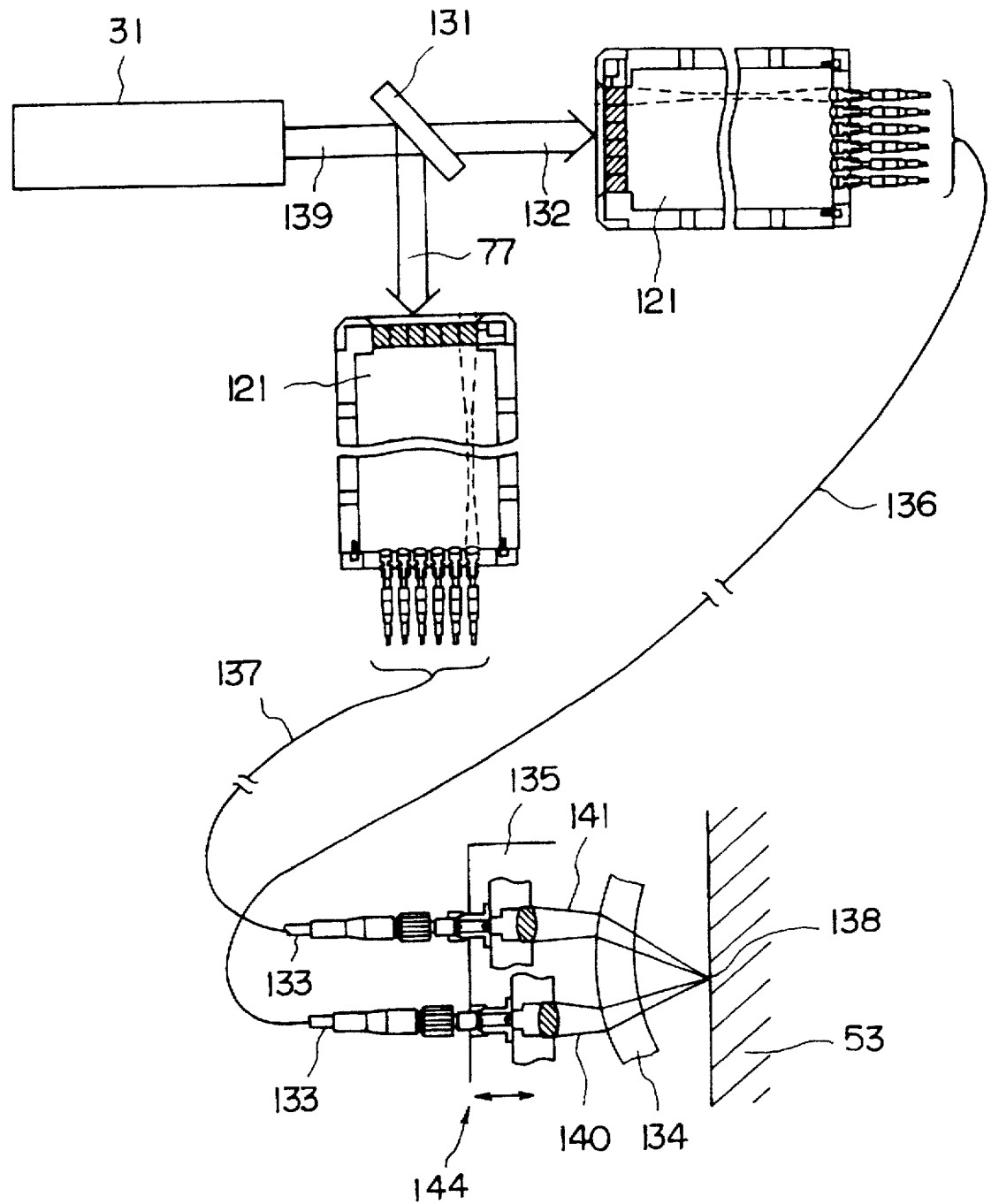
FIG. 21 is a view showing a eighth modification of the embodiment 6.

Next, an eighth modification of the embodiment 6 will be described with reference to FIG. 21. This modification is arranged such that a dichroic mirror 131 is disposed at the irradiating port of the pulse laser device 31 shown in the embodiment 6 and two types of laser beams 132, 77 are guided to a plurality of optical fibers 133 by the light distributors 121, the optical fibers are formed to optical fiber bundles and connected to the converging box 135 of the laser peening operation unit 144 so that the laser beams 132, 77 are formed to a laser spot 138 at a point on the surface of the wall 53 through the converging lens 134. The laser beams are irradiated by being multiplexed in a certain area by sweeping the converging box 135 in X- and Y directions.

The dicroic mirror 131 is disposed at the irradiating port of the pulse laser device 31, a laser beam 139 is divided into a plurality of the laser beams 132, 77 and guided to the light distributors 121, respectively and further divided and guided to a plurality of the optical fibers 133. In this case, a plurality of the optical fibers 133 are bundled as the optical fiber bundles 136, 137 and connected to the converging box 135 of the laser peening operation unit 26 with the length of the optical fiber bundle for guiding the laser beam having a longer wavelength set longer. A plurality of laser beams 140, 141 irradiated through the optical fibers 133 are formed to the laser spot 138 at the point on the surface of the wall 53 by the converging lens 134 installed on the converging box 135 to thereby repair the core shroud inner surface in water.

The laser beam 139 irradiated from the laser pulse device 31 is divided into the laser beams 132, 77 by the dichroc mirror 131 and the respective beams are guided to the light distributors 121. Further, the respective beams are divided and incident on a plurality of the optical fibers 131 through the optical systems.

The optical fibers 133 are bundled as the optical fiber bundles 136, 137, the optical fiber bundle for guiding the laser beam having the longer wavelength has a longer length and these optical fiber bundles 136, 137 move to the position of the converging box 135 of the laser peening operation unit 26.

The optical fibers 133 are connected to the conversing box 135 by being disposed as a train, a converging optical system is disposed at the outlet of each of the optical fibers 133 and a plurality of the laser beams 140, 141 irradiated from the optical fibers 133 are converged to the point on the surface of the wall 53 by the converging lens 134 to thereby form the laser spot 138. The laser spot 138 is swept in the direction of a welded line and the converging box 135 is swept in a width direction making use of the threaded screw, motor and the like.

Operation of the eighth modification arranged as described above is essentially similar to that of the embodiment 6 except the following point.

That is, the laser beams are irradiated to the laser spot 138 a plurality of times and the laser spot 138 is swept in the direction of the welded line through distance of a laser spot diameter (0.3 m) during pulse intervals. When the laser beams are irradiated a plurality of times, a time lag is provided in such a manner that the laser beam having a short wavelength is irradiated first and then the laser beam having the long wavelength is irradiated after a predetermined period of time.

For this purpose, the longer optical fibers are used for the laser beam having the longer wavelength. That is, the longer optical fibers are used to delay a timing of irradiation even if the laser beams having the same wavelength are used.

Since a laser irradiating time (40 nsec) can be ignored as compared with a sweeping time (200 μsec.) in the width direction, the sweeping operation in the width direction is carried out at a certain speed and a timing of irradiation need not be taken into consideration. Sweeping operation in the direction of the welded line (longitudinal direction) is carried out at respective intervals of sweeping time in the width direction of the welded line through distance equal to or less than the laser spot diameter (0.3 φmm) at a speed equal to or less than 1.5 m/sec.

The above sweeping operation is carried out by the converging box 135 making use of the threaded screw, motor and the like. Thereafter, a sweeping operation similar to that of the embodiment 6 is carried out to improve a surface of a welded portion.

According to the eighth modification, a laser beam utilizing ratio can be improved in addition to an advantage similar to that of the embodiment 6. That is, since the laser beam with the short wavelength has a higher laser light absorbing ratio than that of the laser beam having the long wavelength, the light absorbing ratio of the former laser beam is increased as a temperature increases. Thus, when the laser beam with the short wavelength is irradiated first to increase a surface temperature and, then, the laser beam with the long wavelength is irradiated, a laser beam utilizing effect can be improved, by which a capacity of laser equipment can be reduced.

Next, a ninth modification of the embodiment 6 will be described with reference to FIG. 22–FIG. 25. This modification is arranged such that a remote repairing device having a link type arm is suspended into a reactor pressure vessel from the upper side thereof by a wire, caused to pass through the opening of an upper latticed plate at the center of a core and installed on a core support plate. Then, a pulse laser beam having a visible wavelength is irradiated by a laser irradiating unit mounted at the extreme end of the link type arm while scanning a laser spot using a polygon mirror for each of certain areas to thereby process a core shroud inner surface.

Figure 22:
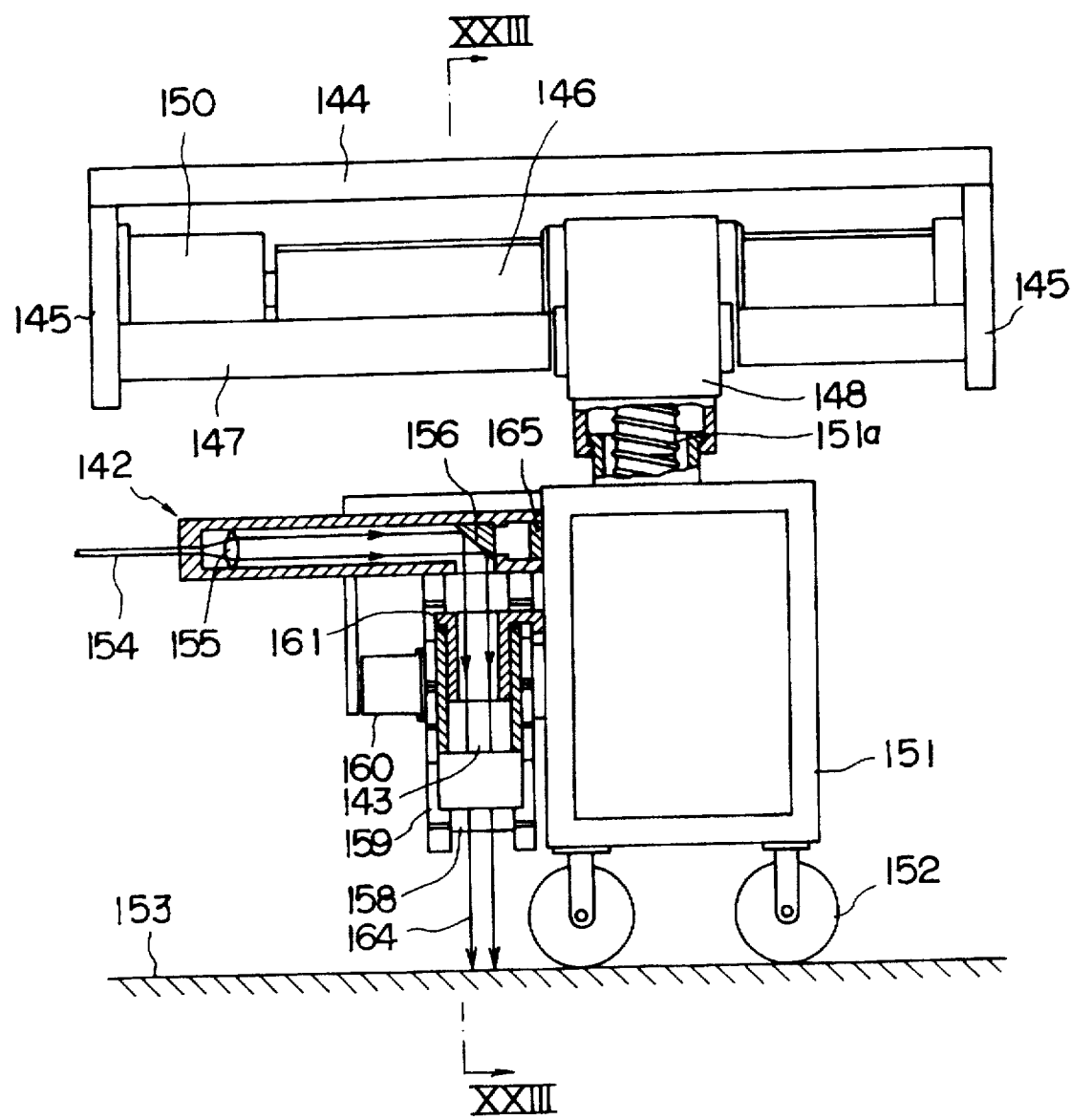

FIG. 22 is a front elevational view of a laser spot scanning type laser peening operation unit 142 using a polygon mirror. The laser peening operation unit 143 is coupled with a repairing operation unit mounting portion 70 at the extreme end of the rod 69 of the foldable type arm 24 at a mounting structural portion 144.

The mounting structural portion 144, a threaded screw 146 and a sliding rod 147 are coupled between two end plate structural portions 145 disposed at intervals. The sliding rod 147 passes through a moving plate 148 and the threaded screw 146 is coupled with the moving plate 148 through the ball screw 149 thereof. A drive unit 150 is driven to rotate the threaded screw 146 to slide the moving plate 148 using the sliding rod 147 as a guide. A mounting table 151 is coupled with the moving plate 148 through a spring 151a.

Wheel type legs 152 mounted on the mounting table 151 are pressed against a wall surface 153 to install the laser peening operation unit 142. A laser beam guided by an optical fiber 154 is made to parallel lights by a combination lens 155, guided to a polygon mirror 158 through a polarizing mirror 156 and a mirror 157 and focused on the wall surface 153 by being reflected.

The polygon mirror 158 and a claw 159 are rotated by an actuator 160 to cause the respective claws 162, 159 of a cylinder 161 to come into contact with each other and the cylinder 161 is moved until the contact between the respective claws 159 is released against the elastic force of a spring 163 to thereby sweep the irradiation of a laser beam 164 to the wall surface 153 in a width direction. Sweeping operation in a longitudinal direction is carried out by rotating and moving the legs 152 with wheels on the wall surface 153 by rotating the threaded screw 146 by the drive unit 150 and moving the moving plate 148.

Figure 23:
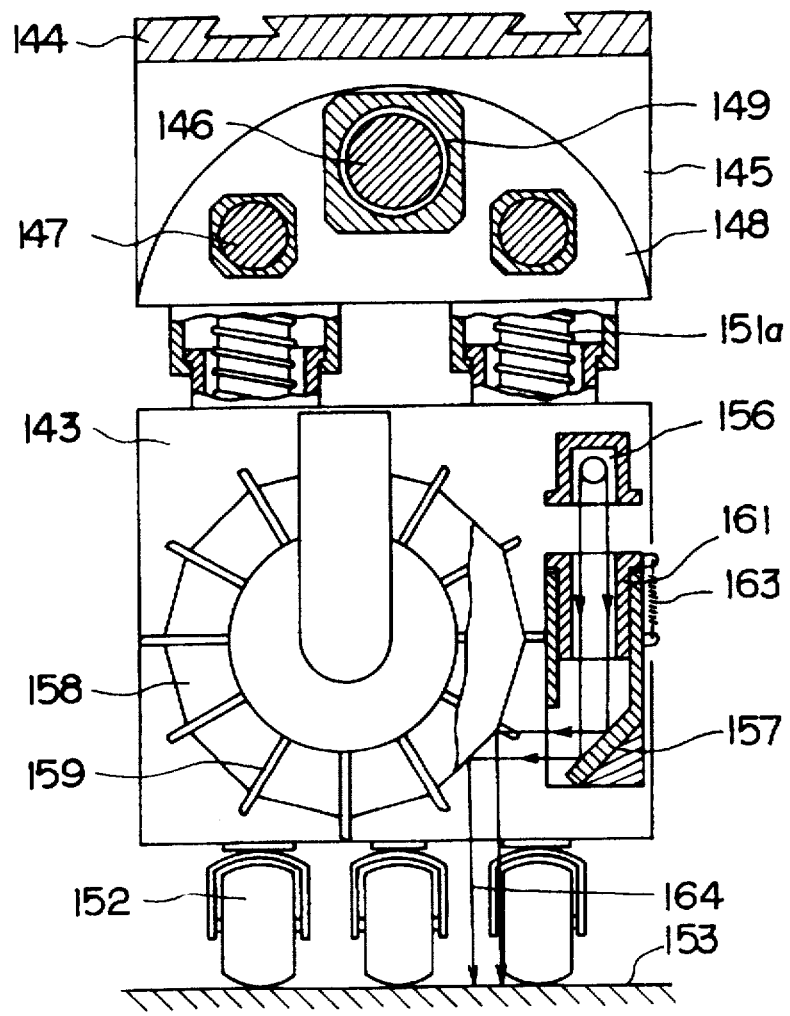
Figure 24:
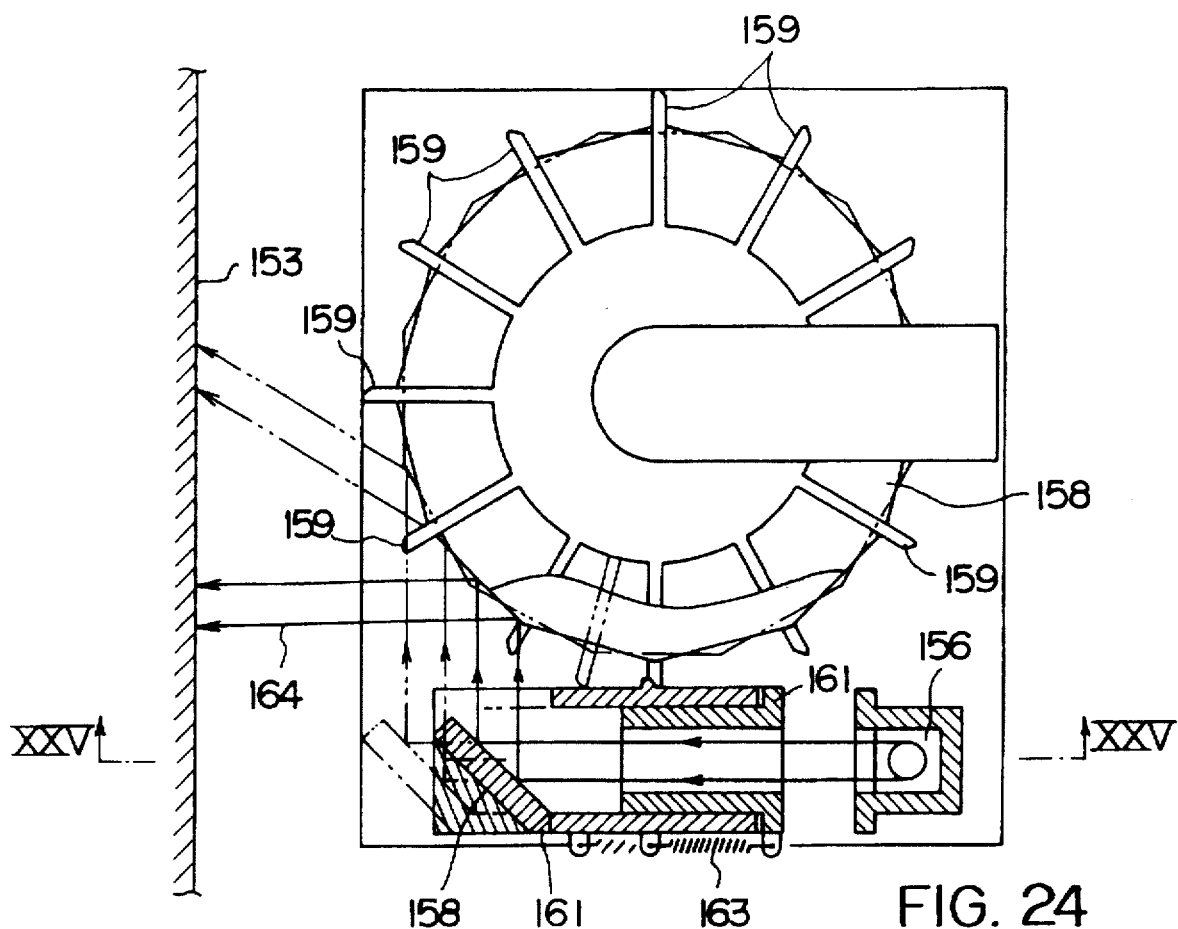
Figure 25:
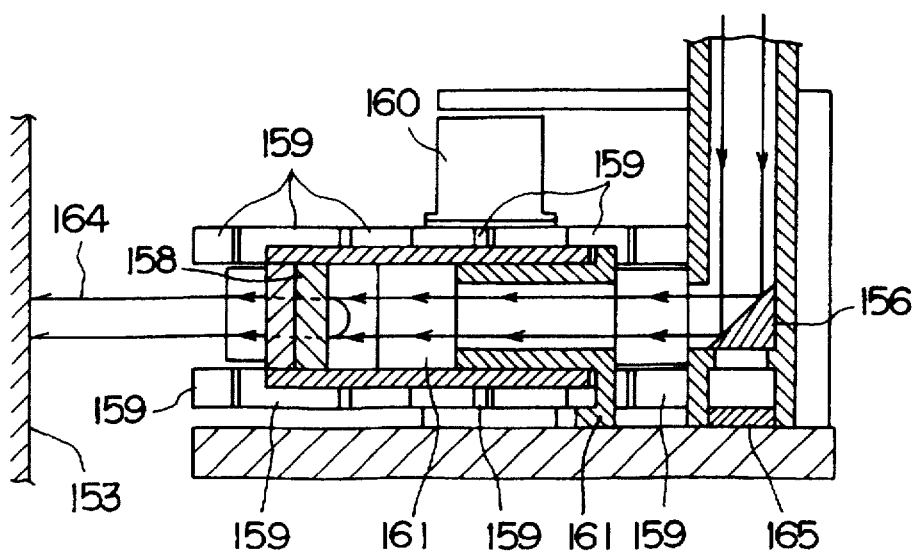

FIG. 23 is a side elevational view of the laser spot scanning type laser peening operation unit 142 using the polygon mirror and FIG. 24 and FIG. 25 are detailed conceptual views of a laser spot scanning mechanism using the polygon mirror.

The polygon mirror 158 and the claw 159 are rotated by the actuator 160. The cylinder 161 is arranged that it is lifted up by the rotation while the claws 159 are in contact with each other, whereas when the claw 159 is separated from the claw, the cylinder 161 is returned to its original position by the spring 163.

On the other hand, the laser beam 164 can be switched between an ON state and OFF state on a not shown light source side by a Faraday's rotator, a shutter and the like, and the laser beam 164 is reflected by the polarizing mirror 156, mirror 157 and polygon mirror 158 and irradiated the wall surface 153.

Further, the laser beam 164 which is not reflected by the polarizing mirror 156 is absorbed by a beam damper 165. Although not shown, the beam damper 165 is cooled by a cooling unit at all times.

Although the operation of the modification 9 arranged as described above is essentially similar to that of the embodiment 6, the modification is different from the embodiment 6 in that saw-tooth-like sweeping is carried out by rotating the polygon mirror at a certain angular speed and the mirror 157 carries out a high speed operation for returning to its original point in synchronism therewith.

Since the ninth modification as described above can make the sweeping speed in the width direction of a welded line (rotational angular speed of the polygon mirror) constant by the use of the polygon mirror and improve a surface by carrying out the sweeping operation at a sweeping speed along the welded line (sweeping speed in a longitudinal direction) and irradiating the laser beam to a certain area a plurality of times, in addition to an advantage similar to that of the embodiment 6. As a result, a control system is simplified and a large change of moment is not necessary to devices, which is advantageous to the strength of the devices. Although a train of laser-irradiated points is inclined with respect to the welded line in the above sweeping method, this causes no problem in operation.

Embodiment 7 (FIGS. 26–34)

This embodiment 7 concerns a case where an inner surface of a fine tube or pipe secured through welding process to the reactor container vessel is processed such as repairing or maintaining.

That is, with reference to FIGS. 26 to 34, this embodiment relates to an apparatus and method for processing, such as inspecting, repairing or maintaining, residual stress in a predetermined region of an inner surface of a fine tube or pipe, in which a visible pulse laser beam 204 projected from an optical fiber 202 is converged through a converging lens unit 203, a laser repairing device 213 is disposed so as to irradiate the laser beam to the inner surface of the fine pipe 201 through a half-transparent rotational mirror 205 which is driven by a driving motor 207 for causing rotation disposed in front of the irradiated portion, an an outer cylindrical portion 262 of the driving motor 207 and a laser beam projecting portion of the optical fiber 202 are coupled through a partially transparent cylindrical laser projecting window 206, the driving motor 207 is driven by a battery 208 attached to the front end portion thereof, and the apparatus is withdrawing in the axial direction of the fine pipe 201 by an insertion/withdrawal device 215 of the laser repairing device 213.

Figure 26:
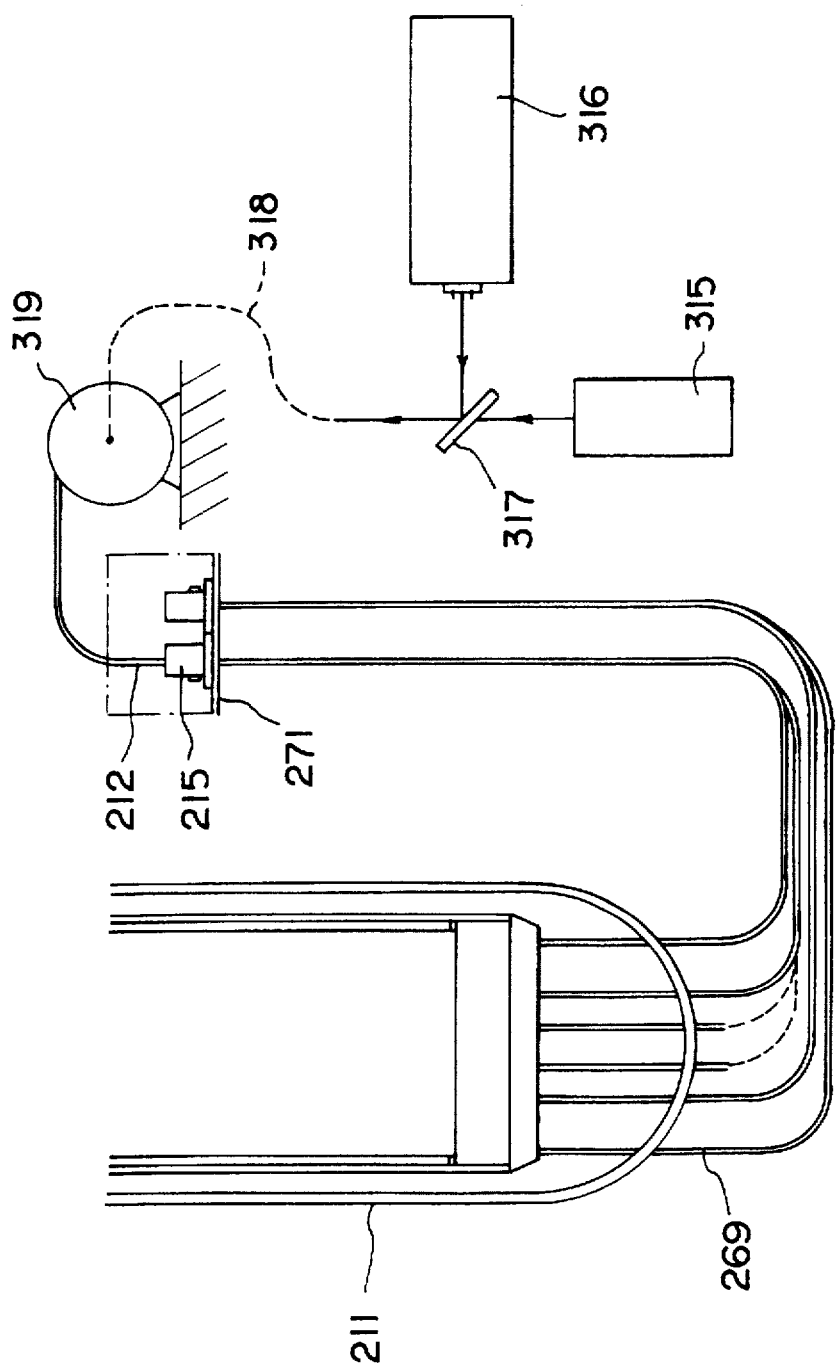
FIG. 26 is a schematic view showing an operation system including a laser repairing apparatus according to an embodiment 7 of the present invention.

With reference to FIG. 26, showing an operational system diagram according to the present embodiment, an insertion/withdrawal device 215 of the laser repairing device 213 is disposed to a device 271 which inserts a detector 270 into an instrumentation pipe 269, i.e. fine pipe 201, and is connected to a wind-up device 219 for winding up a composite cable 212. A laser beam device 316 particularly for generating a blue visible pulse, a laser beam generator 315 particularly for generating a red visible pulse and a half-transparent pulse laser oscillator 317 are coupled through a laser transmission system, and the composite laser beam is induced into an optical fiber 318 having one end connected to the wind-up device 319.

Figure 27:
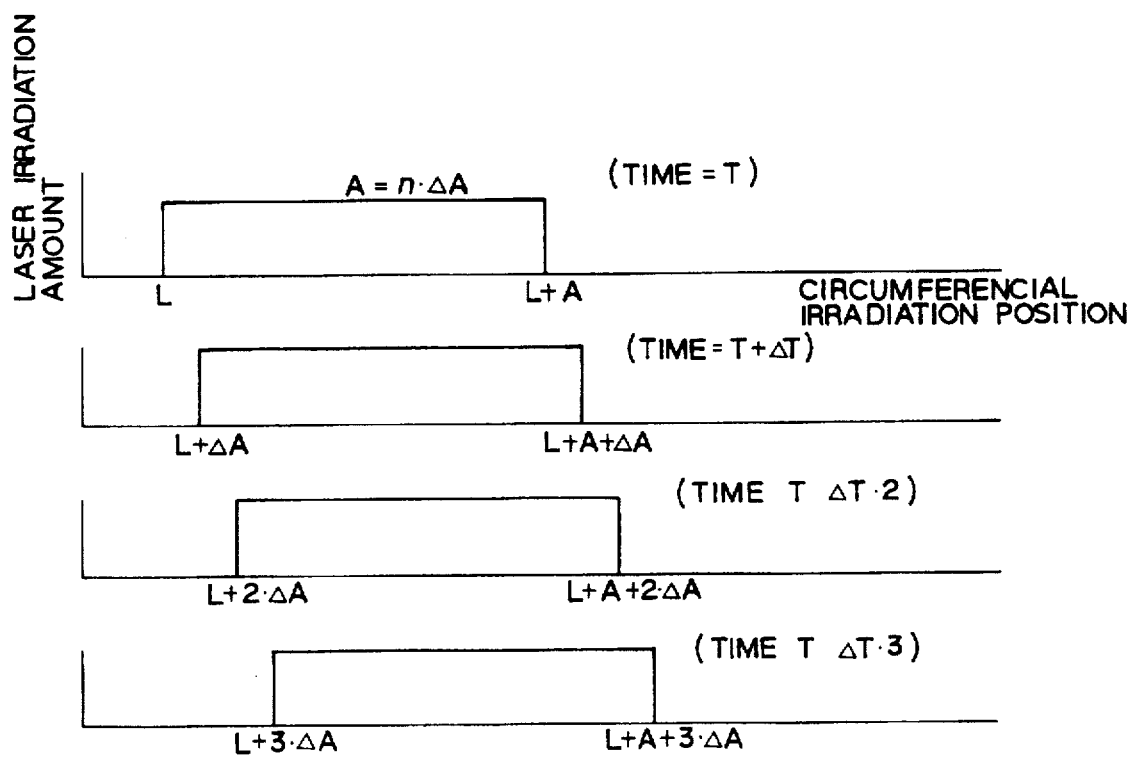
FIG. 27 is a view showing movements of irradiated spots of the laser beam irradiated on an inner surface of a pipe according to the embodiment 7.

FIG. 27 is a view spot points of the visible laser beam 204 irradiated on the inner surface of the fine pipe 201 are moved in accordance with the time elapsing, in which reference character A is a spot diameter, n is number of overlapped irradiation on the same spot, ΔA is a distance shifted on the inner surface of the fine pipe 201 during the time interval ΔT, which corresponds to the irradiation interval time of the visible pulse laser beam 204.

Figure 28:
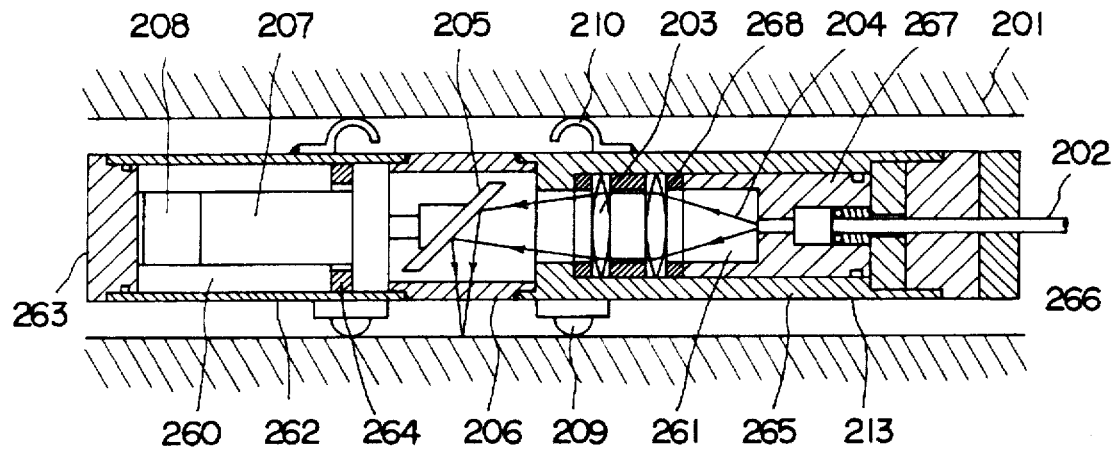
FIG. 28 is a schematic sectional view showing the laser repairing apparatus of the embodiment 7.

FIG. 28 is a schematic view showing the laser repairing device 213 for irradiating the laser beam 204 through the optical fiber 202 on the inner surface of the fine pipe 201. The laser repairing device 313 is composed of a front end structure 260, a cylindrical laser irradiation window 206 and an optical system coupling structure 261. The front end structure 260 is composed of an outer cylindrical member 262, an end plug 263, a buttery 208 and a rotation driving motor 207. The driving motor 207 is fixed to the end face of the cylindrical laser irradiation widow 206 through a screw engagement of a fixing ring 264 and the cylindrical member 262 so that the axial distance thereof accords with a design value. To the driving motor 207 is coupled the half-transparent rotational mirror 205 which is subjected to surface treatment so that the laser beam having a wavelength particularly of blue color (blue laser beam) is reflected and the laser beam having a wavelength particularly of red color (red laser beam) passes.

An optical controller 214 is provided for the driving motor 207 for controlling the start or stop of the driving upon receiving the red laser beam passing through the half-transparent rotational mirror 205.

A contact terminal 209 and a spring 210 are attached to the outer surface of the outer cylindrical member 262 so that the contact terminal 209 serves as reference for calculating a focusing distance with the condition contacting the inner surface of the pipe 201 and the spring 210 is for making contact the contact terminal 209 to the inner surface thereof. More than three contact terminals 209 and the springs 210 are mounted in point symmetric manner within a cross sectional area. The end plug 263 and the cylindrical member 262 are coupled with each other, and the cylindrical member 262 is coupled with the laser irradiation window 206. The optical system coupling structure 261 is composed of an outer cylindrical member 265, a connection member 266 such as cable, an optical fiber 202, an optical fiber projection end structure 267, a converging combination lens unit 203 and a fixing ring 268, and a contact terminal 209 and a spring 210 are attached to the outer surface of the cylindrical member 265. The cylindrical member 265 is coupled with the laser irradiation window 206 and also connected to the connection member 266.

This embodiment 7 will operates as follows.

The insertion/withdrawal device 215 for inserting or withdrawing the laser repairing device 213 into or from the fine pipe 201 in place of the device 271 is disposed at a portion at which the device 271 for inserting the detector 270 by selecting a predetermined number of instrumentation pipes 269 from a plurality of pipes 269 welded to a reactor pressure vessel 211. The device 215 is mounted to the end of the predetermined instrumentation pipe 269, i.e. fine pipe 201, the laser repairing device 213 is mounted to the insertion/withdrawal device 215, the composite cable 212 is forcibly inserted into the pipe 269, and when it reaches a portion over the portion, by some degree of distance, at which the residual stress on the inner surface of the pipe 201 is improved, the insertion is stopped.

The blue laser beam having a less attenuation in water generated by the pulse laser device 215 and the continuous red laser beam for controlling generated by the laser device 316 are combined through the half-transparent mirror 317, introduced into the optical fiber 318 through the converging lens unit 203 so as to converge the laser beam to have a diameter of about 0.5 mm, and then is guided into the optical fiber 318 of the composite cable 312 through the wind-up device 319.

The laser device 316 is first energized, and the red laser beam is then guided to the optical fiber projecting end structure 319 of the laser repairing device 213 through the half-transparent mirror 317, the optical fiber 218, the wind-up device 219 and the optical fiber 202. The red laser beam is projected from the end of the optical fiber 202 of the optical fiber projecting end structure 267 of the laser repairing device 213, and then, the laser beam is converged by the converging lens unit 203 and irradiated on the half-transparent rotational mirror 205. The thus irradiated laser beam penetrates the mirror 205 and is guided to the optical controller 214 attached to the driving motor 207. In one example, the driving motor 207 is provided with a hollow shaft formed as a laser transmission pipe for guiding the laser beam to a laser receiving portion of the controller 214. When the red laser beam is detected by the controller 214, the controller 214 instructs to drive the driving motor 207 so that the driving motor 207 starts the rotation at the predetermined revolution number and also drive the half-transparent rotational mirror to rotate at the predetermined rotating speed.

After the predetermined time elapsing of the rotation starting of the rotational mirror 205, the pulse laser device 315 is driven to generate laser beam which is then guided to the optical fiber projecting end structure 267 of the laser repairing device 213 through the optical fiber 318, the wind-up device 319 and the optical fiber 202. The blue laser beam is then projected from the end of the optical fiber 202 of the optical fiber projecting end structure 267, collected by the converging lens unit 203, irradiated on the half-transparent rotational mirror 205, reflected thereby, passes the cylindrical laser beam irradiation window 206 and propagates in water to thereby focus on the surface of the fine pipe 201. When the irradiation of the blue pulse laser beam on the surface of the instrumentation pipe 269 starts, the insertion/withdrawal device 215 is operated simultaneously to thereby withdraw the composite cable 212 together with the optical fiber 202 at a predetermined speed.

The revolution number N of the half-transparent rotational mirror 205 and the withdrawing speed V of the laser repairing device 213 are controlled so as to satisfy the following equation.

$$N = Z/N_2 \, (\Delta A/\pi D + N_0) \quad (1)$$

$$Z = 1/\Delta T \quad (2)$$

$$\Delta A = A/n \quad (3)$$

$$V = A \times N \quad (4)$$

in which:
N: revolution number of half-transparent rotational mirror
Z: pulse laser frequency
$N_2$: laser pulse distribution number
$\Delta A$=irradiation spot displacement amount
D: inner diameter of instrumentation pipe
$N_0$: integer
$\Delta T$: pulse interval
A: irradiation spot diameter
n: irradiation spot multiplexed number
V: withdrawing speed When the withdrawing length of the composite cable reaches the predetermined length, the pulse laser device 315 for the blue laser beam is stopped and the red laser beam is again introduced from the laser device 316 into the optical fiber 318, passes the half- transparent rotational mirror 205 and is then guided to the optical controller 214 to thereby perform the control for stopping the driving of the driving motor 207.

Thereafter, the composite cable 212 is withdrawn from the instrumentation pipe 269 together with the optical fiber 202 through the operation of the insertion/withdrawal device 215, and the laser repairing device 213 attached to the front end of the cable is taken out of the pipe 269. When the laser repairing device 213 has been taken out completely therefrom, the battery attached to the front end thereof is charged or is exchanged with a charged new one. After the completion of this operation, it is again inserted into another instrumentation pipe 269 to repeatedly perform the operation mentioned above. According to this embodiment 7, since the laser repairing device 213 for repairing the inner surface of the fine pipe is utilized the inspection or maintenance of the inner surfaces of the fine instrumentation pipes 269 welded to the pressure vessel 211 can be performed in the water, thus shortening the working time and hence elongating the life time thereof. In an application to a nuclear power plant, the working in the water is performed under remotely controlled manner, so that the exposure dose to the workers can prevented from increasing.

Figure 29:
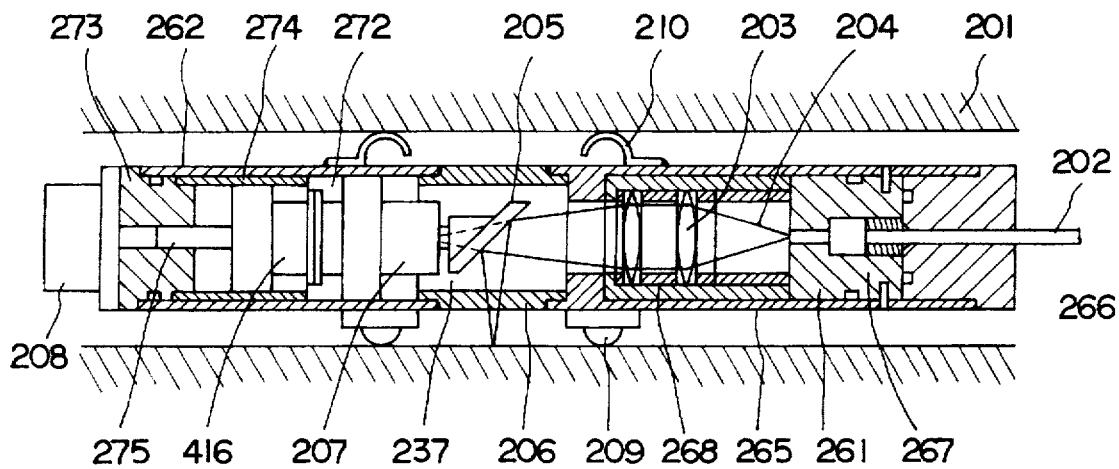
FIGS. 29 to 34 are schematic sectional views, similar to that of FIG. 28 and representing first to sixth modifications of the embodiment 7, respectively.

FIG. 29 represent a first modification of the embodiment 7, which relates to an apparatus and method for processing, such as inspecting, repairing or maintaining, the residual stress improvement in a predetermined region of an inner surface of a fine pipe 201 by moving in the axial direction the driving motor 207 by a linear driving motor 416 attached to a portion in front thereof.

FIG. 29 is a schematic view of a laser repairing device 237 in which the half-transparent rotational mirror 205 is rotated by the driving motor 207 driven by the battery 208 and moved in the axial direction by the linear driving motor 416 so that the laser beam 204 generated from the optical fiber 202 is irradiated on the inner surface of the fine pipe 201.

This modification differs from the above embodiment 7 in the following points.

In this first modification, the front end structure 272 is composed of the outer cylindrical member 262, the end plug 273, the battery 208, the linear driving motor 416 and the rotation driving motor 207. The linear driving motor 416 has a structure such that it performs relative movement with respect to the end plug 273 through a gear means 274 such as rack-pinion assembly and a guide rod 275. The rotation driving motor 207 is coupled with the linear driving motor 416 so as to be axially movable.

The operation and function of the first modification essentially similar to those of the embodiment 7 except the following points.

When the irradiation of the blue pulse laser beam on the surface of the fine pipe 201 starts, the linear driving motor 416 is simultaneously operated to move the half-transparent rotational mirror 205 in its axial direction at a predetermined speed by a distance corresponding to the irradiated spot diameter during one rotation of the mirror 205. When the linear driving motor 416 is axially moved by the allowable amount, the generation of the blue laser beam is stopped and the insertion/ withdrawal device 215 is then operated to withdraw the composite cable 212 including the optical fiber 202 by a length corresponding to the axial movement distance of the rotational mirror 205. During this withdrawal, the linear driving motor 416 is returned to the initial position. The blue laser beam is again irradiated to improve the inner surface of the fine pipe 201. Such operation is repeated and after the residual stress on the inner surface in the predetermined region is completed, the laser repairing device 237 is withdrawn from the fine pipe 201 and then inserted into another fine pipe 201 to carry out substantially the same operation.

According to this modification, substantially the same effects as those of the embodiment 7 may be expected. In addition, the inner surface of the fine pipe 201 can be improved in its residual stress in the predetermined region by axially moving the half-transparent rotational mirror 205 by means of the linear driving motor 416, and hence, the working involved thereby can be made easy.

A second modification of the embodiment 7 will be described hereunder with reference to FIG. 30.

This second modification relates to an apparatus and method for processing, such as inspecting repairing or maintaining, the residual stress improvement in a predetermined region of an inner surface of a fine pipe 201 by relatively moving the converging lens unit 203 in the embodiment 7 by means of an ultrasonic linear motor 417 to thereby adjust the focusing distance.

Figure 30:
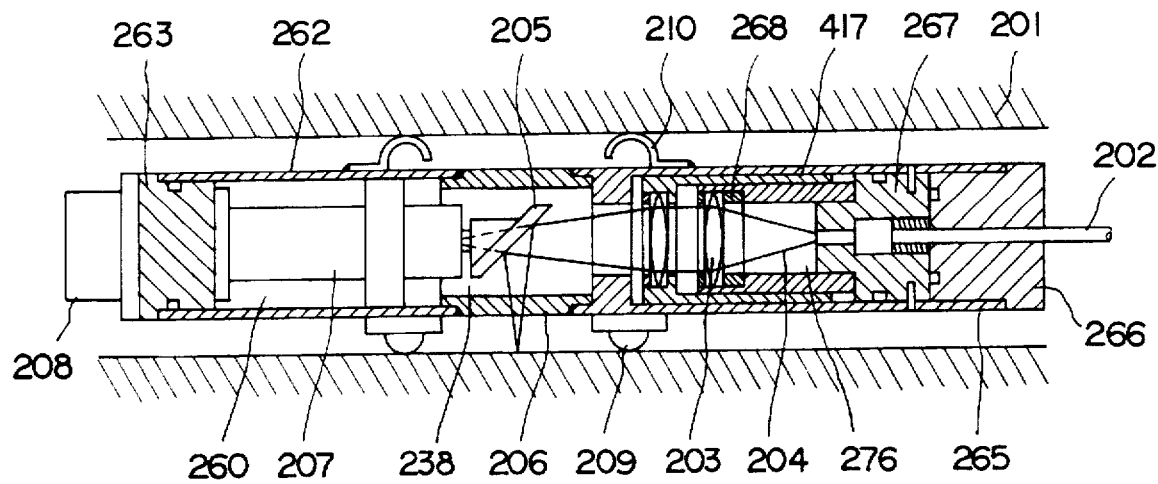

FIG. 30 shows a schematic view of a laser repairing device 238 for the inner surface of a fine pipe in which the half-transparent rotational mirror 205 is rotated by the rotational driving motor 207 driven by the battery 208, and the focusing distance of the laser beam 204 projected from the optical fiber 202 is adjusted by the ultrasonic linear motor 417 to thereby irradiate the predetermined region of the inner surface of the fine pipe 201. The laser repairing device 238 is composed of the front end structure 260, the laser irradiation window 206 and the optical system coupling structure 276.

This second modification differs from the embodiment 7 in the following points.

The optical system coupling structure 276 is composed of the outer cylindrical member 265, the connection member 266 such as cable, the optical fiber 202, the optical fiber projecting end structure 267, the ultrasonic linear motor 417, the converging lens unit 203 and the fixing ring 268, and the contact terminal 209 and the spring 210 are mounted to the outer surface of the cylindrical member 265. The laser irradiation window 206 is coupled with the outer cylindrical member 265, which is also connected to the connection member 266. Inside the cylindrical member 265, the lens distance of the converging lens unit 203 can be adjusted by the ultrasonic linear motor 417.

The operation and function of the second modification are essentially similar to those of the embodiment 7 but differs therefrom in the following points.

When the half-transparent rotational mirror 205 is rotated, the blue pulse laser beam is irradiated from the pulse laser device 316 and guided to the optical fiber 202. The blue pulse laser beam is then projected out of the end portion of the the optical fiber projecting end structure 167 and focused with the focusing distance of the converging lens unit 203 being adjusted by the ultrasonic linear motor 417 and then reflected therefrom. The laser beam then passes the laser irradiation window 206 and propagates in the water to thereby focus on the surface of the fine pipe 201. The adjustment of the focusing distance of the converging lens unit 203 is carried out by detecting the intensity of the reflected laser beam.

According to this second modification of the embodiment 7, substantially the same effects as those of the embodiment 7 will be expected, and in addition, since the laser beam 204 is irradiated on the surface of the fine pipe 201 with the focusing distance of the converging lens unit 203 being adjusted by the ultrasonic linear motor 417, the optimum irradiation condition can be set even in a case where the inner diameter of the file pipe 201 differs from the design value, thus achieving the residual stress improvement with high accuracy.

A third modification of the embodiment 7 will be described hereunder with reference to FIG. 31. This modification relates to an apparatus and method for processing such as inspecting or repairing the residual stress improvement in a predetermined region of the inner surface of the fine pipe 201 by making expandable the laser repairing device 138 of the second modification by an ultrasonic linear motor 320.

Figure 31:
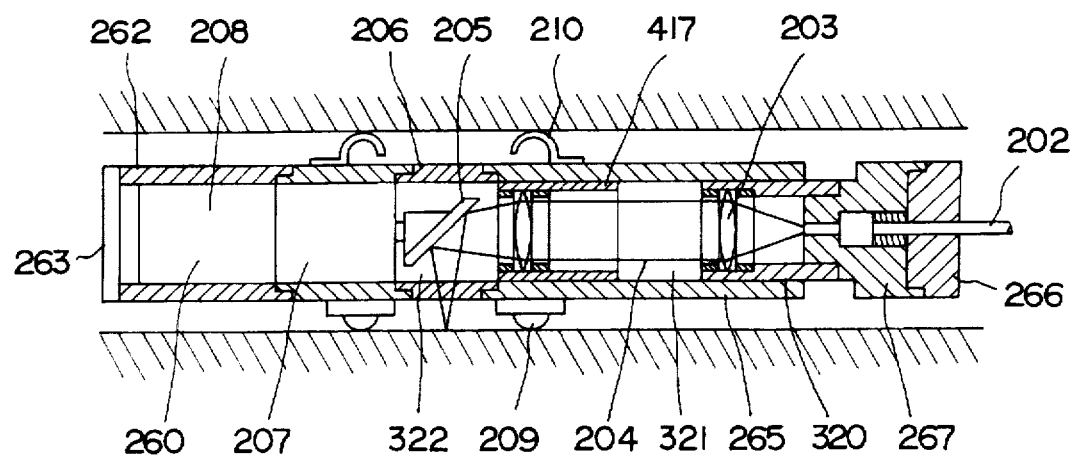

That is, FIG. 31 shows a schematic view of the laser repairing device 322 in which the half-transparent rotational mirror 205 rotated by the driving motor 207 driven by the battery 208 and a structure for adjusting the focusing distance of the laser beam 204 projected from the optical fiber 202 by the ultrasonic linear motor 417 are axially expanded by means of the ultrasonic linear motor 320 to thereby irradiate the laser beam on the constant region in the inner surface of the fine pipe 201. The laser repairing device 322 is composed of the front end structure 260, the cylindrical laser irradiation window 206 and the optical system coupling structure 321.

This structure differs from that of the second modification in that the optical system coupling structure 321 is composed of the connection member 266 such as cable, the optical fiber 202, the optical fiber projecting end structure 267, the ultrasonic linear motor 417, the ultrasonic linear motor 320 and the converging lens unit 203.

The operation and function of this third modification are essentially similar to those of the second modification but differs therefrom in the following points.

When the irradiation of the blue pulse laser beam on the surface of the fine pipe 201 starts, the ultrasonic linear motor 320 is operated to move the half-transparent rotational mirror 205 in its axial direction at a predetermined speed by a distance corresponding to the irradiated spot diameter during one rotation of the mirror 205. When the linear driving motor 416 is axially moved by the allowable amount, the generation of the blue laser beam from the pulse laser beam device 316 is stopped and the insertion/withdrawal device 215 is then operated to withdraw the composite cable 212 including the optical fiber 202 by a length corresponding to the axial movement distance of the rotational mirror 205. During this withdrawal, the ultrasonic linear motor 320 is returned to the initial position. The blue laser beam is again irradiated to improve the residual stress on the inner surface of the fine pipe 201. Such operation is repeated and after the residual stress on the inner surface in the predetermined region is completed, the laser repairing device 237 is withdrawn from the fine pipe 201 and then inserted into another fine pipe 201 to carry out substantially the same operation.

In accordance with this third modification, substantially the same effects as those of the second modification will be expected. In addition, the residual stress improvement on the surface of the fine pipe in the predetermined region can be performed by axially moving the half-transparent rotational mirror 205 by utilizing the ultrasonic linear motor 320, thereby easily carrying out the working.

Next, a fourth modification of the embodiment 7 will be described hereunder with reference to FIG. 32. The fourth modification relates to an apparatus and method for processing, such as inspecting, repairing or maintaining, the residual stress on the inner surface in a predetermined region of the fine pipe 201 by relatively moving the converging lens unit 203 in the first modification by the ultrasonic linear motor 417.

Figure 32:
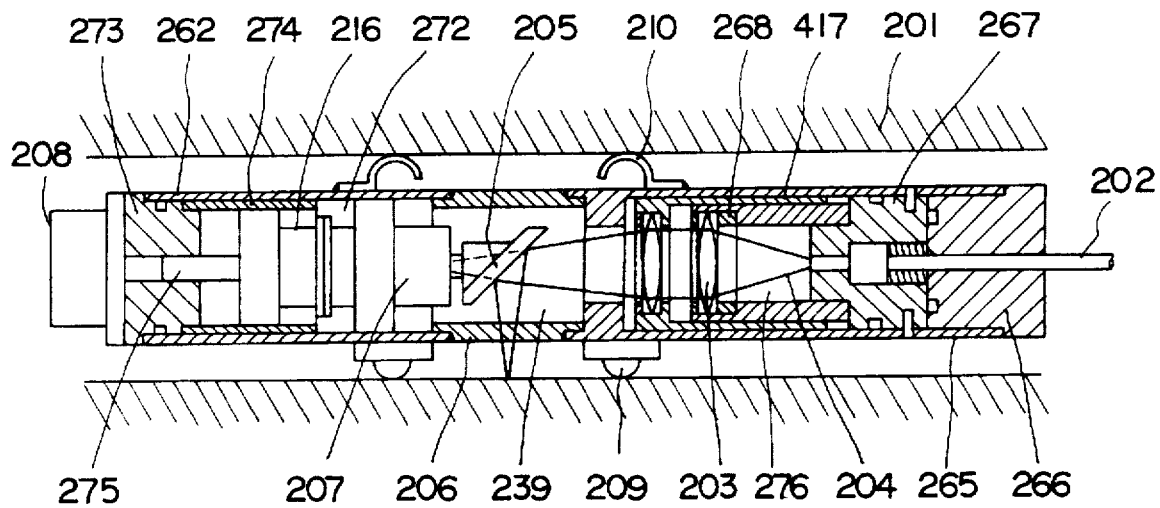

FIG. 32 is a schematic view of a laser repairing device 239 for irradiating the laser beam 204 from the optical fiber 202, with the focusing distance being adjusted by the ultrasonic linear motor 417, by rotating the half-transparent rotational mirror 205 rotated by the driving motor 207 driven by the battery 208 and moving the same in the axial direction by the linear driving motor 416. The laser repairing device 239 is composed of the front end structure 272, the laser irradiation window 206 and the optical system coupling structure 276.

This fourth modification differs from the first modification in that the optical system coupling structure 276 is composed of the outer cylindrical member 265, the connection member 266 such as cable, the optical fiber 202, the optical fiber projecting end structure 267, the ultrasonic linear motor 417, the converging lens unit 203 and the fixing ring 268, and the contact terminal 209 and the spring 210 are fixed to the outer surface of the cylindrical member 265. The laser irradiation window 206 is coupled to the outer cylindrical member 265, which is connected to the connection member 266.

The operation and function of the fourth modification is essentially similar to those of the first modification but differs therefrom in the following points.

When the half-transparent rotational mirror 205 starts to rotate, the blue pulse laser beam is irradiated from the pulse laser device 316 and guided to the optical fiber 318. The blue pulse laser beam is then projected out of the end portion of the optical fiber projecting end structure 267 and focused on the rotational mirror 205 with the focusing distance of the converging lens unit 203 being adjusted by the ultrasonic linear motor 417 and then reflected therefrom. The laser beam then passes the laser irradiation window 206 and propagates in the water to thereby focus on the surface of the fine pipe 201. The adjustment of the focusing distance of the converging lens unit 203 is carried out by detecting the intensity of the reflected laser beam.

According to this fourth modification of the embodiment 7, substantially the same effects as those of the first modification of the embodiment 7 will be expected, and in addition, since the laser beam 204 is irradiated on the surface of the fine pipe 201 with the focusing distance of the converging lens unit 203 being adjusted by the ultrasonic linear motor 417, the optimum irradiation condition can be set even in a case where the inner diameter of the file pipe 201 differs from the design value, thus achieving the residual stress improvement with high accuracy. Furthermore, even if a staged portion be present on the surface of the pipe 201, the residual stress improvement can be achieved according to this modification, and accordingly, the processing can be done to a wide region of the surface with high efficiency. The residual stress improvement on the surface of the fine pipe in the predetermined region can be performed by axially moving the half-transparent rotational mirror 205 by utilizing the linear driving motor 216, thereby easily carrying out the processing.

Figure 33:
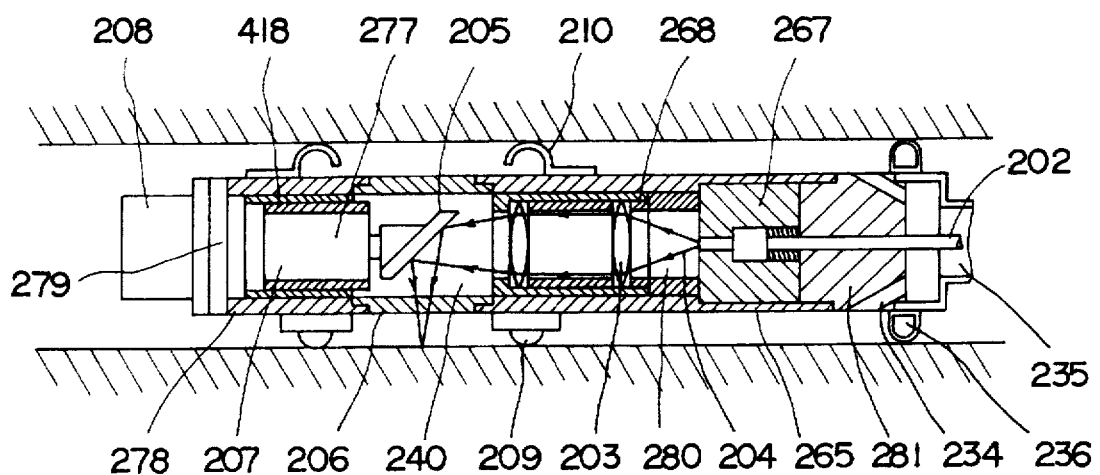

A fifth modification of the embodiment 7 will be further described hereunder with reference to FIG. 33. This modification relates to an apparatus and method for processing such as inspecting, repairing or maintaining, the residual stress improvement on a predetermined region of the inner surface of the fine pipe 201 by utilizing an ultrasonic linear motor 418 in place of the linear driving motor 316 of the first modification of the embodiment 7.

FIG. 33 shows a schematic view of a laser repairing device 240 for irradiating the laser beam 204 from the optical fiber 102 on the inner surface of the fine pipe 201 by rotating the half-transparent rotational mirror 205 rotated by the driving motor 207 driven by the battery 208 and moving the same in the axial direction by the ultrasonic linear motor 418. The laser repairing device 240 is composed of the front end structure 277, the laser irradiation window 206 and the optical system coupling structure 280.

This fifth modification differs from the first modification in that the optical system coupling structure 277 is composed of the outer cylindrical member 278, the end plug 279, the battery 208, the ultrasonic linear motor 418 and the driving motor 207. The ultrasonic linear motor 418 has a structure capable of causing the end plug 279 and the driving motor 207 to relatively move in the axial direction.

The operation, the function and the effects of the fifth modification are essentially similar to those of the first modification of the embodiment 7.

Figure 34:
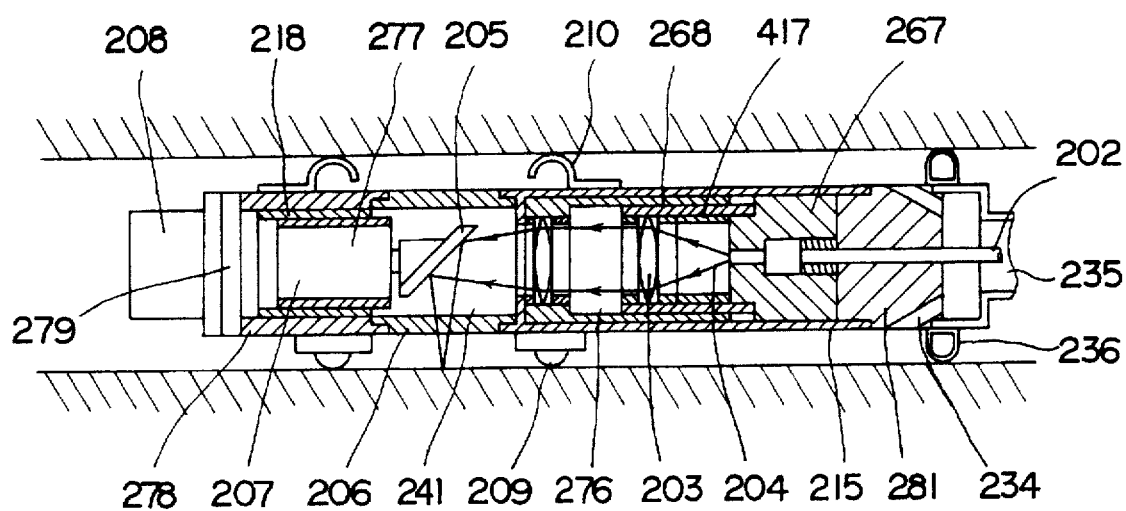
Figure 35:
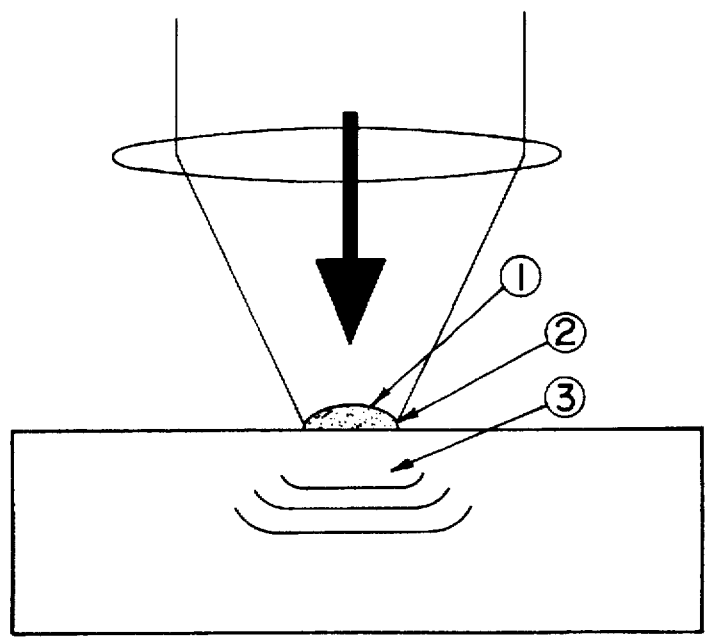
FIG. 35 is an illustration showing a condition of irradiating a laser beam.
Figure 36:
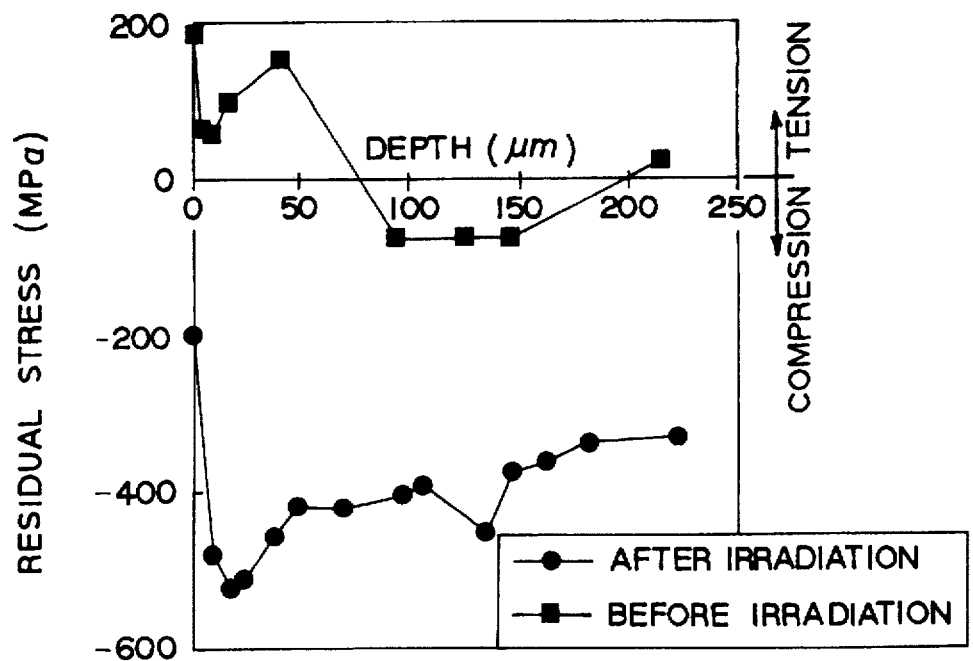
FIG. 36 is a graph showing a result of measuring a distribution in the residual stress depth direction before and after the irradiation of the laser beam.

A sixth modification of the embodiment 7 will be still further described hereunder with reference to FIG. 34. This sixth modification relates to an apparatus and method for processing, such as inspecting, repairing or maintaining, the residual stress improvement on a predetermined region of the inner surface of the fine pipe 101 by relatively moving the converging lens unit 203 in the fifth modification by the ultrasonic linear motor 417 to thereby adjust the focusing distance of the lens unit 203.

FIG. 34 is a schematic view showing a laser repairing device 241 for irradiating the laser beam 204 from the optical fiber 202 on the inner surface of the fine pipe 201 by rotating the half-transparent rotational mirror 205 rotated by the driving motor 207 driven by the battery 208 and moving the same in the axial direction by the ultrasonic linear motor 418 with the focusing distance being adjusted by the ultrasonic linear motor 417. The laser repairing device 241 is composed of the front end structure 277, the laser irradiation window 206 and the optical system coupling structure 276.

This sixth modification differs from the fifth modification in that the optical system coupling structure 276 is composed of the outer cylindrical member 265, the connection member 281 such as cable, the optical fiber 202, the optical fiber projecting end structure 267, the ultrasonic linear motor 417, the converging lens unit 203 and the fixing ring 268. The connection terminal 209 and the spring 210 are fixed to the outer surface of the cylindrical member 265. The laser irradiation window 206 is coupled to the outer cylindrical member 265, which is connected to the connection member 281.

The operation and function of the sixth modification is essentially similar to those of the first or fifth modification but differs therefrom in the following points.

When the half-transparent rotational mirror 205 starts to rotate, the blue pulse laser beam is irradiated from the pulse laser device 316 and guided to the optical fiber 202. The blue pulse laser beam is then projected out of the end portion of the the optical fiber projecting end structure 267 and focussed on the rotational mirror 205 with the focussing distance of the converging lens unit 203 being adjusted by the ultrasonic linear motor 417 and then reflected therefrom. The laser beam then passes the laser irradiation window 206 and propagates in the water to thereby focus on the surface of the fine pipe 201. The adjustment of the focusing distance of the converging lens unit 203 is carried out by detecting the intensity of the reflected laser beam.

According to this sixth modification of the embodiment 7, substantially the same effects as those of the first modification of the embodiment 7 will be expected, and in addition, since the laser beam 204 is irradiated on the surface of the fine pipe 201 with the focusing distance of the converging lens unit 203 being adjusted by the ultrasonic linear motor 417, the optimum irradiation condition can be set even in a case where the inner diameter of the fine pipe 101 differs from the design value, thus achieving the residual stress improvement with high accuracy. Furthermore, even if a staged portion be present on the surface of the pipe 201, the residual stress improvement can be achieved according to this modification, and accordingly, the processing can be done to a wide region of the surface with high efficiency. The residual stress improvement on the surface of the fine pipe in the predetermined region can be performed by axially moving the half-transparent rotational mirror 205 by utilizing the linear driving motor 416, thereby easily carrying out the processing.

According to this sixth modification of the embodiment 7, substantially the same effects as those of the first or fifth modification of the embodiment 7 will be expected, and in addition, since the laser beam 204 is irradiated on the surface of the fine pipe 201 with the focussing distance of the converging lens unit 203 being adjusted by the ultrasonic linear motor 417, the optimum irradiation condition can be set even if the inner diameter of the fine pipe 201 differs from the design value and even in the the presence of the staged portion on the inner surface of the file pipe 201, the irradiation can be done easily with high accuracy, thus being advantageous in processing, and hence, achieving the residual stress improvement with high accuracy by moving the rotational mirror 105 in the axial direction by utilizing the ultrasonic linear motor 418.

As described above in detail through various embodiments and their modifications, according to the present invention, the residual stress on a surface of a material of a structure, and a crack and a CRUD formed thereon, which relate to the preventive maintenance and repair of a reactor inner structure, can be improved or removed. Further, the present invention can provide a processing method and apparatus which are simple, has high quality and applicable to a narrow portion without adversely affecting peripheral equipment.

What is claimed is:

1. An underwater laser processing method, comprising:

providing a laser beam having a visible wavelength;

forming said laser beam into laser beam pulses of a duration of 100 nanoseconds or less and a peak power output of 0.1–10 GW/cm$^2$;

irradiating said laser beam pulses onto a surface of a structure immersed in water; and controlling a diameter of the laser beam pulses irradiated on the surface and providing a multiplexing ratio of 100% or greater so as to improve residual stress on a material forming said surface while also providing for the removal of an unwanted deposit from the surface.

2. The method according to claim 1, wherein the structure is an internal structure of a reactor.

3. The method according to claim 2, wherein the irradiating step is performed using an optical fiber.

4. The method according to claim 2, further comprising:

sensing a crack on the surface;

applying said laser beam pulses to a portion of the surface near the crack; and monitoring removal of the crack by the laser beam pulses.

5. The method according to claim 1, further comprising the step of removing a crack on the surface using the laser beam pulses.

* * * * *